(12) United States Patent
Stipek, Sr. et al.

(10) Patent No.: US 11,432,919 B2
(45) Date of Patent: Sep. 6, 2022

(54) PHYSICAL AND VIRTUAL SYSTEMS FOR RECORDING AND SIMULATING DENTAL MOTION HAVING 3D CURVILINEAR GUIDED PATHWAYS AND TIMING CONTROLS

(71) Applicants: John P. Stipek, Sr., Wellington, FL (US); John P. Stipek, Jr., Royal Palm Beach, FL (US)

(72) Inventors: John P. Stipek, Sr., Wellington, FL (US); John P. Stipek, Jr., Royal Palm Beach, FL (US)

( * ) Notice: Subject to any disclaimer, the term of this patent is extended or adjusted under 35 U.S.C. 154(b) by 652 days.

(21) Appl. No.: 15/675,627

(22) Filed: Aug. 11, 2017

(65) Prior Publication Data

US 2018/0110603 A1 Apr. 26, 2018

Related U.S. Application Data

(60) Provisional application No. 62/373,789, filed on Aug. 11, 2016.

(51) Int. Cl.
*A61C 19/045* (2006.01)
*A61C 11/02* (2006.01)
(Continued)

(52) U.S. Cl.
CPC .......... *A61C 19/045* (2013.01); *A61C 9/0046* (2013.01); *A61C 11/025* (2013.01);
(Continued)

(58) Field of Classification Search
CPC ... A61C 19/045; A61C 9/0046; A61C 11/025; A61C 11/06; A61C 11/08; A61C 11/082;
(Continued)

(56) References Cited

U.S. PATENT DOCUMENTS 3,643,332 A 2/1972 Lee
3,694,919 A 10/1972 Lee
(Continued)

OTHER PUBLICATIONS

Lee, Robert L., "Jaw Movements Engraved in Solid Plastic for Artriculator Controles, Part I" Journal of Prosthetic Dentistry, Aug. 1969, pp. 513-527, St. Louis, MO.
(Continued)

*Primary Examiner* — Heidi M Eide
*Assistant Examiner* — Drew S Folgmann

(57) ABSTRACT

One embodiment of the apparatus and method comprises a physical recording instrument (2000) for forming a right and a left side engraved analog (150), the analogs (150) being subsequently attached to a physical articulating instrument (3000), the analogs (150) with timing controls then serving as guides for simulating the motion of mounted patient dental models (142). Another embodiment comprises a digital recording system (4000) for generating the right and left side virtual engraved analogs (150), the analogs (150) being subsequently milled or digitally formed in a CNC rapid prototyping machine, the analogs (150) then being attached to the physical articulating instrument (3000), the analogs (150) with the timing controls serving as guides for simulating the motion. Some of the foregoing embodiments facilitate production of technologist fabricated dental restorative and orthodontic treatments. Another embodiment comprises the digital recording system (4000) for generating the right and left side virtual engraved analogs (150) and a virtual articulating instrument (5000) for virtual simulating of mandibular jaw motion. Some of these digital workflow embodiments facilitate production of milled or digitally fabricated dental restorative and orthodontic treatments.

5 Claims, 23 Drawing Sheets

(51) Int. Cl.
*G09B 23/28* (2006.01)
*A61C 13/34* (2006.01)
*A61C 9/00* (2006.01)
*A61C 13/00* (2006.01)
*A61C 11/08* (2006.01)
*A61C 11/06* (2006.01)

(52) U.S. Cl.
CPC .............. *A61C 11/06* (2013.01); *A61C 11/08* (2013.01); *A61C 11/082* (2013.01); *A61C 13/0004* (2013.01); *A61C 13/34* (2013.01); *G09B 23/283* (2013.01)

(58) Field of Classification Search
CPC ..... A61C 13/0004; A61C 13/34; A61C 11/00; A61C 11/006; A61C 11/02
See application file for complete search history.

(56) References Cited

U.S. PATENT DOCUMENTS

| | | |
|---|---|---|
| 4,681,539 A | 7/1987 | Kaap |
| 7,412,298 B2 | 8/2008 | Presswood |
| 2004/0172150 A1* | 9/2004 | Perot ................. A61C 9/004 700/98 |
| 2009/0305185 A1* | 12/2009 | Lauren ............... A61C 9/0053 433/29 |
| 2015/0132718 A1* | 5/2015 | Kerschensteiner .. A61C 13/082 433/196 |
| 2015/0209123 A1 | 7/2015 | Presswood |
| 2017/0273762 A1* | 9/2017 | Fisker ................ A61C 19/045 |

OTHER PUBLICATIONS

Lee, Robert L., "Jaw Movements Engraved in Solid Plastic for Atriculator Controles, Part II" Journal of Prosthetic Dentistry, Nov. 1969, pp. 513-527, St. Loius, MO.

Lundeen, Harry D., et al, "Condylar Movement Patterns Engraved in Plastic Blocks," Journal of Prosthetic Dentistry, Dec. 1973, pp. 866-875, St. Louis, MO.

Balch, Joshua Heath, "Verification of the Accuracy of Electronic Mandibular Movement Recording Devices," Dec. 2012, pp. V-76, Univ. Of Tenn. (Historic to current overview).

Stipek, John P. Sr., Prepublished Paper, "Dental Articulation: State-of-the-Art," Oct. 29, 2017, Seventh draft (Historic to current overview).

\* cited by examiner

PHYSICAL AND VIRTUAL SYSTEMS FOR RECORDING AND SIMULATING DENTAL MOTION HAVING 3D CURVILINEAR GUIDED PATHWAYS AND TIMING CONTROLS

CROSS REFERENCE TO RELATED APPLICATION

This non-provisional patent application claims priority and benefit under 35 U.S.C. § of the U.S. Provisional Application Ser. No. 62/373,789 entitled "Physical and Virtual Recording and Articulating System Having Right and Left Side 3D Curvilinear Guides with Right and Left Side Timing Controls," filed Aug. 11, 2016, all of which is herein incorporated by reference.

BACKGROUND

Prior Art

The following is a tabulation of some prior art that presently appears relevant:

U.S. Patents

| Patent Number | Kind Code | Issue Date | Patentee |
|---|---|---|---|
| 3,643,332 | | 1972 Feb. 22 | Lee |
| 3,694,919 | | 1972 Oct. 3 | Lee |
| 4,681,539 | | 1987 Jul. 21 | Kaap |
| 7,412,298 | B2 | 2008 Aug. 12 | Presswood |

U.S. Patent Applications

| Publication Nr. | Kind Code | Publ. Date | Applicant |
|---|---|---|---|
| 20090305185 | A1 | 2009 Dec. 10 | Lauren |
| 20150209123 | A1 | 2015 Jul. 30 | Presswood |

Nonpatent Literature Documents

Lee, Robert L., *Journal of Prosthetic Dentistry*, "Jaw movements engraved in solid plastic for articulator controls. Part I. Recording apparatus" (August 1969).

Lee, Robert L., *Journal of Prosthetic Dentistry*, "Jaw movements engraved in solid plastic for articulator controls. Part II. Transfer apparatus" (November 1969).

Lundeen, Harry D., et al, *Journal of Prosthetic Dentistry*, "Condylar Movement Patterns Engraved in Plastic Blocks," (December, 1973).

FEDERALLY SPONSORED RESEARCH OR DEVELOPMENT

None.

TECHNICAL FIELD

The present invention relates generally to the field of dental articulation, and more particularly, to any apparatus and method for recording patient-specific mandibular jaw motion, which apparatus and method transfers the recorded information to a 3D curvilinear guided, rotation-center controlled, dental articulator selected from the groups comprising; a physical dental articulator; and a virtual dental articulator. The invention relates specifically to systems and methods for recording jaw motion in the form of real-time patient-generated pathways and static digital model generated pathways. 3D curvilinear pathways are formed by tracking or generating the motion of right and left side engrave pins or virtual points being in fixed spatial relation to the occlusal plane and the Bonwill triangle, the pins and points being on the Bonwill-axis or hinge-axis. After the pathways have been physically or virtually formed, they serve as guides for right and left side guide pins in the physical or virtual articulator. In the physical articulator, the pathways and the pins are respectively fixed on upper and lower articulator frames, the frames having adjustable vertical rotation-centers or genuine centers of rotation for controlling the timing of the pins as they move in the pathways. In the virtual articulator, the motion is simulated using the same systems and methods in a virtual reality. Physical and virtual simulating of patient-specific jaw motion are applied to aid diagnostic evaluations and treatment planning and to facilitate both traditional nonautomated and new digital automated fabricating of functional restorative and orthodontic treatment devices.

BACKGROUND

Dental articulators are well-known and used in both practice and laboratory settings. Articulators are used for dental diagnostic evaluations, treatment planning, and dental restorative treatment fabricating. Restorative treatments are designed and constructed in relation to articulated upper and lower dental models. Constructions, whether digital automated or traditional nonautomated, require some form of dental model articulation.

The adjustable articulator is a rigid instrument capable of producing motion patterns by means of adjustable mechanical guides, whereas the natural mandible is guided by a complex neuromuscular system, ligaments, and non-rigid temporomandibular joint (TMJ) surfaces. The teeth are suspended in jaw bone sockets lined with ligaments that respond to stresses in an adaptable, elastic manner. Nature designs the biting surfaces of teeth to chew food, efficiently applying stresses in just the right places so as not to "overload" any particular part of the "gnathostomatic system." The component parts of this system, comprising teeth, gum tissue, ligaments, muscles, bone, and jaw joints, are susceptible to disease and breakdown when a "bad bite" is present. When treatment devices are fabricated, articulators are used to assist in developing compatible, functionally contoured dental arch forms and biting surfaces. Great care is taken to design and contour precision biting surfaces that are well-suited for a particular patient, because small defects can cause pain and dysfunction, as well as gum, bone, and tooth loss.

For cases involving only a few teeth to be restored, small nonadjustable articulators are used. Small, flexible plastic and spring instruments are guided mostly by the patient's existing biting surfaces, including wear facets (acquired occlusion). Using similar methodologies, today's digital (computer aided design/computer aided manufacturing or CAD/CAM) fabricating systems generate virtual motion guided by the patient's occlusion. For more extensive restorative treatments, involving many teeth, a mechanical articulator is adjusted and set according to static and dynamic patient records. Over time, dentistry has developed recording devices and articulators having more and more features and adjustability with a view to reproducing mandibular jaw motion with increasingly greater degrees of accuracy.

Research and development concerning mandibular jaw motion and its influence on dental health has produced more theories, vocabulary, and instrumentation than any other field of dental study. The virtual rabbit hole of investigation is a testament to the fact that a practical, effective device for accurately recording and simulating patient-specific mandibular jaw motion has yet to be discovered and commercialized. Today, it is commonly accepted, (1) that more sophisticated adjustable articulating instruments, when correctly used, can produce better, more functional restorative treatments, (2) that such instruments are too complicated for most dental people to understand and use, and (3) that the more sophisticated instruments tend to introduce human errors. For the most part, clinicians try to avoid getting caught up in too much dental articulating hardware and science. They prefer to do arbitrary corrective grinding (equilibration) of each tooth comprising the restorative treatment device at the final delivery appointment and thereafter, in response to patient feedback and complaints.

However, it must be said that ongoing equilibration and bite related problems can cause significant and protracted discomfort and expense for the unfortunate patient. Although skillfully done equilibrations can ease symptoms, these are arbitrary corrections made on elastic-supported hard-surface objects (the teeth), rooted in non-rigid and highly-responsive, dynamic structures. Hence, equilibrations can not be expected to address all bite related problems. The gnathostomatic system involves extremely adaptable structures that morph again and again to compensate and overcompensate for biomechanical stress. Each new bite related issue and correction can produce new problems, often causing a cascade of deteriorating affects. Commonly occurring trauma generated by ongoing equilibrations, tooth repositioning, and proprioceptive responses does often lead to endodontic (root canal) treatment, bone loss, gum disease, tooth loss, implant loss, headaches, and TMJ (chewing) pain and dysfunction. But because maladies manifest slowly, a bad bite may not be identified as causing "this fracture" or "that disease." Truth be told, most nonhygiene-related dental problems are caused by a bad bite. Widespread periodontal disease, tooth/implant loss, and systemic health issues incurred among longer living patient populations are putting pressure on the dental profession to come up with better mandibular jaw motion recording and simulating systems.

By the year 2020, it is estimated that 38 million adults in the U.S. will be in need of one or two complete arch (fixed bridge or removable denture) dental treatments, and many of those treatments will involve dental implants. Most patients deem complete arch dental implant treatment to be expensive, even beyond anything they can afford without making significant financial arrangements. Moreover, such implant treatments can fail if bite related problems are not addressed. Today, many of these complete arch treatments are implant-supported "zirconia" devices. Zirconia is the new CAD/CAM produced dental material that is the toughest dental restorative material yet developed. Because of its unforgiving hardness, zirconia dental devices amplify bite related problems, fracturing implants and breaking down the patient's bone support before the zirconia device ever shows any sign of weakening or wearing. Most clinicians agree that today's complete arch dental treatments require more capable instrument-oriented fabricating. For decades many dental opinion leaders have ardently declared, "Occlusion is THE most important factor in the long-term success of restorative dental treatments."

The three traditional components of planning and fabricating extensive and complete arch restorative treatments are, (1) recording real-time patient-specific jaw motion with extraoral and intraoral devices (pantograph, digital motion-tracking, and gothic arch tracing devices), (2) making static facebow and interocclusal records (check-bites and bite-wafers), and (3) utilizing mechanically adjustable articulating instruments (articulators).

Still commonly used in clinical practice are static interocclusal records and adjustable articulators. Emerging CAD/CAM systems now use static digital data from model scans to generate computer simulated jaw motion, thereby forming computer generated biting surfaces similar to the biting surfaces formed when using a flexible plastic or spring dental articulator. More advanced, optoelectronic jaw motion-tracking systems can now provide basic adjustable articulator settings, e.g., "condylar angulation" and "progressive Bennett shift," some systems claiming to provide "immediate Bennett shift" settings. Leading fabricators of dental restorative treatment devices do however admit that modern articulating methods, both physical and digital, are not yet fully facilitating production of functional treatment devices. Most of today's restorative treatments are delivered with functionally flawed occlusions, often requiring much chair-side corrective grinding Today's commercialized digital jaw motion recording systems can be divided into three groups or systems:

Jaw motion data is generated by physically attaching extraoral motion-tracking sensors on the patient's teeth and thereby recording (real-time) mandibular jaw motion. Subsequently, the acquired data is utilized for prescribing basic angulation settings on an adjustable mechanical articulator and for physically mounting upper and lower models on the instrument. The physically articulated models are then utilized in a traditional dental laboratory fabricating process whereby treatment devices, having intentionally designed biting surfaces, are produced. Some extraoral digital jaw motion recording systems are, the ARCUS-DIGMA system (KaVo Dental GmbH of Biberach, Germany), the ZEBRIS JMA system (Schutz Dental GmbH of Rosbach vor der Hohe, Germany), the CADIAX GAMMA system (GAMMA Medizinischwissenschaftliche Fortbildungs GmbH of Klosterneuburg, Austria), the SICAT system (Sirona Dental GmbH of Salzburg, Austria), the FREECORDER BLUEFOX cone beam system (Dentron GmbH of Hochberg, Germany), and the PLANMECA 4D Jaw Motion Tracking cone beam system (Planmeca Oy, Helsinki, Finland).

Jaw motion data is generated by physically attaching extraoral motion-tracking sensors on the patient's teeth and thereby recording (real-time) mandibular jaw motion. Subsequently, the acquired data is utilized for setting basic angulation on a virtual adjustable articulator and for virtual mounting of upper and lower virtual models on the virtual instrument. The virtually articulated models are then utilized in a CAD/CAM milling or printing process whereby treatment devices, having intentionally designed biting surfaces, are fabricated. Hence, the copied motion of the mandible is converted to adjustable angles on a basic mechanical articulator, and then the resulting motion of the articulator, so adjusted, is copied in virtual reality.

Scanning upper and lower patient models and generating a digital analysis of existing (static) occlusion—subsequently, the acquired data is converted into a mock jaw motion and utilized in a CAD/CAM milling or printing process whereby treatment devices, having intentionally designed biting surfaces, are fabricated.

In addition to restorative applications, the new digital systems are being applied to orthodontic applications, given that many of these are now produced by digital means. Virtual articulating solutions have become important in recent years, since CAD/CAM fabricating is now seen as the preferred new direction for many dental laboratories (treatment device fabricators). Some older "digital articulating systems" developed by Gibbs et al in 1981, WASEDA-YAMANASHI series of robot introduced by Niigata University in 2002, WY-5RVI series of robot introduced by Niigata University in 2004, HEXAPOD robot jaw movement simulator reported by Nishigawa et al in 2007, JSN/2 autonomous jaw movement simulator developed by Hayashi Laboratory in 2008, to more recent cone beam tracking systems of FREECORDER BLUEFOX (Dentron GmbH of Hochberg, Germany), and PLANMECA 4D (Planmeca Oy, Helsinki, Finland), employ specialized hardware and software that produce patient-specific robotic jaw motion. These systems require a significant investment in robotic hardware or cone beam radiographic hardware. Robotic constructs consume a lot of computer file space. Looking at and considering the options for recording and simulating mandibular jaw motion, one fact is evident—there is not a preponderance of evidence to suggest that any particular system can conveniently and effectively produce patient-specific jaw motion.

Since adjustable mechanical articulators are still the principal means of articulating dental models, today's digital recording systems have been, are being, developed to codify and simulate mechanical articulating systems. Accordingly, digital systems may prescribe angle and distance settings for adjusting mechanical articulator guides such as those on the traditionally popular WHIP MIX articulator, Whip Mix Corp., Louisville, Ky. This articulator has right and left side "condylar angulation," "progressive Bennett shift," and "immediate Bennett shift" adjustments. The generated motions of the mechanical articulators, so adjusted, are then copied and digitally simulated in dental CAD/CAM systems for producing digitally fabricated crown, bridge, denture and orthodontic appliances. Adjustable mechanical articulators have been shown over decades of use, to produce deficient jaw motion simulation, and for that reason, functionally defective treatment devices. Looking at and facing up to current technologies strengths and limitations, it is apparent that dentistry is very much in need of an uncomplicated, affordable system and method for recording and simulating jaw motion. One method that has been advanced for decades is to engage the patient in forming right and left side 3D free-form carved or engraved analogs that can be conveniently and effectively used as guides in a simpler, more straightforward dental articulating instrument.

The concept of creating and utilizing engraved analog guides in a dental articulator is not new. Dental professionals have been hypothesizing about and attempting to do this for more than 100 years (Wamekros 1892, Luce 1889, Needles 1922, House 1931, Swanson 1965, Lee 1969, and Sandhaus 2010). And when engraved guides were actually produced, no one knew how to conveniently and effectively control the timing of right and left side condylar elements (guide pins) as the pins moved independently in the engraved guides. That is, when one pin was moved into a particular position in its analog, the pin on the other side of the instrument can wonder into any number of positions in its respective analog. In natural jaw motion, however, the condyles maintain a specific timed association to each other and this timed relationship is repeatable. To make a workable concept, the developers of engraved analog-guided articulating systems needed to employ a feature sometimes, but not often found on adjustable mechanical articulators—a feature known as the "intercondylar distance" or the "frontal or vertical centers of rotation" adjustments. As we shall discuss however, employing the "genuine" vertical centers of rotation to control the timing of the guide pins moving in engraved analogs was not and is not known.

Some adjustable mechanical articulators have intercondylar distance adjustments, but by contrast, these are often arbitrarily set according to patient head width and hence, are always equidistant from the midsagittal plane. Using a pantograph linear tracing process, some complex fully adjustable mechanical articulators do have a provision for setting the herein distinguished "genuine right and left side vertical centers of rotation." Since the late twentieth century, how-ever, the trend has been to eliminate vertical centers of rotation adjustments from articulators. This trend ensued when a number of published studies produced evidence that the centers actually had little or no verifiable affect on an the instrument's capacity to simulate mandibular jaw motion. Accordingly, instruments having genuine vertical centers of rotation are older and more complex adjustable articulators that rely primarily on guide angulation and distance settings and produce mainly "linear patterns of motion." Adjustable mechanical instrument systems feature all or some of the following right and left side adjustments; "condylar angulation;" "progressive Bennett shift;" "immediate Bennett shift;" "intercondylar distance;" "axis inclination;" and "axis rotation." Mechanical articulators operate on entirely different principals than engraved analog-guided articulators. Mechanical articulators simulate jaw motion by means of adjustable mechanical guides located in the vicinity of the vertical centers of rotation or jaw joints. Engraved analog articulators simulate jaw motion by means of patient-formed engraved analogs or guides having "functionally generated paths" and "curvilinear envelopes-of-motion." These analogs or guides are not located on the genuine centers of rotation.

Engraved analog system proponents recognize that nature doesn't operate on straight lines, that most every natural construction and motion is highly curvilinear. Accordingly, if precision guides are to be produced for a dental articulator, these guides will be more accurately formed by the patient himself/herself. The resulting guides will be 3D curvilinear right and left side envelopes-of-motion or pathways in engraved analogs.

Because 3D curvilinear guides function better in simulating mandibular jaw motion, Robert L. Lee, DDS, may have come closest to simulating this motion with the instrument system that he developed and presented in the August and November 1969 *Journal of Prosthetic Dentistry*, Vol. 22, No. 2, pp. 209-224 and No. 5, pp. 513-527, see U.S. Pat. No. 3,452,439 (1969), U.S. Pat. No. 3,593,424 (1971), U.S. Pat. No. 3,643,332 (1972), U.S. Pat. No. 3,694,919 (1972), U.S. Pat. No. 3,896,550 (1975), U.S. Pat. No. 3,947,964 (1976), U.S. Pat. No. 4,034,474 (1977), U.S. Pat. No. 4,126,938 (1978), U.S. Pat. No. 4,209,909 (1980), RE31615 (1984), RE31716 (1984), U.S. Pat. No. 4,543,062 (1985), U.S. Pat. No. 4,693,683 (1987), all to Lee. Here he describes a 3D block-cutting pantograph. Three plastic blocks are concurrently engraved with three high speed air turbines as the patient executes right lateral, left lateral, and protrusive mandibular jaw motion. He then transfers the acquired 3D information, using the original three blocks to engrave two articulator analogs, which analogs subsequently serve as guides for the articulated models. The system does not however, locate the vertical centers of rotation. According to Lee, "In many patients' records tested, the translated axis line did not intersect the centric relation line . . . [although] . . . . In some of those tested, the translated axis did intersect the centric axis line at some point." Lee concluded (1) that the genuine vertical centers of rotation are not always locatable (on his instrument), and (2) that the intercondylar distance can, without obvious problems, be arbitrarily set at 110 mm or 120 mm (equidistant). Taking into account Lee's findings, it is evident that he did not consider that the illusive "intersection" can occur only at a point where the translated axis and the coronal plane (as defined herein) intersect, the coronal plane not being represented on Lee's instrument. Accordingly, the centers of rotation will rarely intersect the centric axis line, or for that mater, any axis or vector connecting the condylar elements. Operating in a 3-dimensional system, genuine jaw motion rotation-centers are often transposed above or below said axis or vector and can be consistently located only on the coronal plane. Lee claimed that he recorded and simulated exact mandibular jaw motion, though subsequent investigations, by H. D. Lundeen and C. G. Wirth, December 1973 Journal of Prosthetic Dentistry, Vol. 30, No. 6, pp. 866-875, found his system to be, (1) disruptive for the patient (having three high-speed air turbines), and (2) complicated for the dentist, and accordingly, the system could incorporate human errors. Regrettably, Lee's hardware was onerous and the process was too complex and difficult to implement in clinical practice and, knowing this, he decided to simply design and sell an articulator having 10 statistically averaged or archetypal analogs. These analogs are preformed, 3D curvilinear condylar guides (5 right guides and 5 left guides)—part of the popular commercialized system know as the PANADENT articulator, Panadent Corp. of Colton, Calif. As a statistically averaged system, the PANADENT articulator can not produce patient-specific mandibular jaw motion.

Considering the divers instrumentation and methodologies currently in use, it can reasonably be construed that, for hundreds of years, patient-specific jaw motion still eludes the dental field.

In light of the above deficiencies in the prior art, what is needed are mandibular jaw motion recording and simulating instruments that can efficiently and effectively facilitate physical, digital, and virtual dental diagnostic evaluations, treatment planning, and dental restorative treatment fabricating.

SUMMARY

Articulators are routinely used by dentists and dental fabricators to facilitate diagnostic and fabricating procedures in designing and constructing dental treatment devices. Cases involving only a few teeth to be restored often utilize small flexible articulators, while more extensive and complete arch cases utilize rigid adjustable mechanical articulators that are intended to simulate patient-specific jaw motion.

While dental articulators are needed to avoid catastrophic occlusion failures, articulators do not simulate patient-specific jaw motion. Articulators have never been capable of consistently facilitating fully functional biting surfaces on fabricated treatment devices. Accordingly, at delivery and thereafter, device occlusion must be "ground in" or "equilibrated" until the patient is pain free, Moreover, too much equilibration often creates a need for additional fabricating time, material costs, chairtime, and appointments to revise and remake the treatment device. Occlusion defects on delivered lab work, often cause lost chairtime for dentists, business troubles for device fabricators, and frustration and suffering for patients.

In the computer age, some progress in digital dental "motion capture" has been made. Sophisticated jaw motion data has been used, (1) to produce patient-specific dental motion video, and (2) to program adjustable mechanical articulators. However, this use of the data has not successfully produced treatment devices having functional biting surfaces.

Digital systems developers are just beginning to recognize what so many clinicians have been complaining about for decades; although adjustable mechanical articulators are needed to fabricate extensive cases, these instruments do not effectively simulate patient-specific jaw motion.

Advantages

Accordingly, several advantages of one or more aspects are as follows: To provide an easy to understand and effective system for recording and simulating patient-specific mandibular jaw motion. To provide a physical and a virtual system; that is in fixed spatial relation to the upper dental arch; that can be rapidly and conveniently used at chairside; that can be used to produce precision right and left side 3D curvilinear guides having a centric start position and controlled timing for simulating protrusive, right lateral, and left lateral jaw motion; that can be used to record and simulate the "centric start position" and protrusive jaw motion; that has disposable apparatus component parts; that can be used as a teaching tool; that can facilitate both traditional nonautomated and digital automated fabricating of restorative and orthodontic devices; that can help patients having extensive restorative treatments to avoid debilitating affects of bad bite and equilibration issues. Other advantages of one or more aspects will be apparent from a consideration of the drawings and ensuing description.

TERMS ACCORDING TO SOME EMBODIMENTS

Figure 1A:
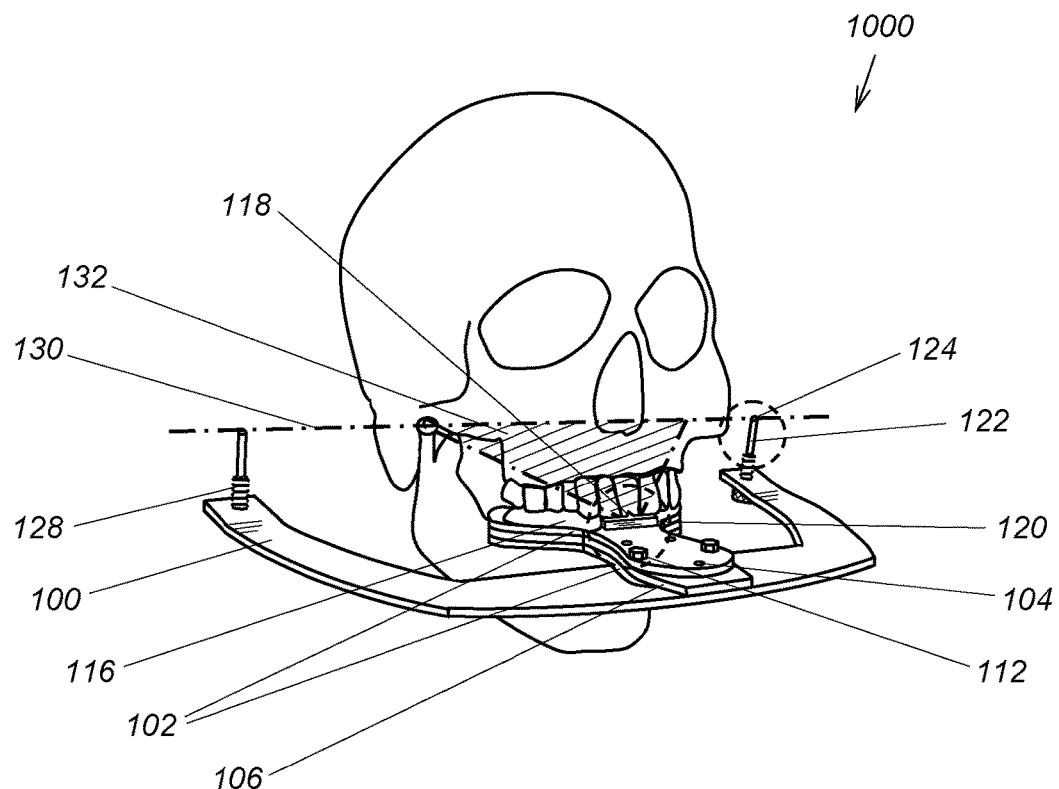
FIG. 1A is a perspective view of Dental Clutch Assembly With Bonwill-Triangle And Bonwill-Axis in accordance with some embodiments.

Arcon articulator, according to some embodiments is, an articulator having the adjustable guides or engraved analogs on the upper articulating frame and the condylar elements or guide pins on the lower articulating frame.

Articulator, according to dental definition, is a dental instrument for mounting, relating, and moving the patient's upper and lower models in relation to each other. Articulators are used for studying the occlusion of the patient, as a diagnostic aid, and for treatment planning and construction of dental restorative and orthodontic treatments. Prior art articulators have adjustable mechanical guides for more or less simulating patient-specific mandibular jaw motion. In some embodiments, the recording bows and articulator are virtual components—constructs that describe how mandibular jaw motion is captured and simulated.

Attachment, according to some embodiments, is a connector or fastener for respectively attaching apparatus component parts. Attachments are selected from the groups comprising; at least two threaded screws; one threaded screw with a stud, angle, fence, slot, or other indexing element; a snap or clip with another indexing element; and a magnetic surface with another indexing element.

Bonwill-apex, according to some embodiments, is the incisal point on the Bonwill-triangle. A point indicium or fenced with a raised pointer on the upper surface of the upper clutch. The point on which the upper incisors are aligned and impressed in the congealing material on the upper clutch.

Bonwill-axis, according to dental definition, is a theoretical and arbitrary instrument-oriented hinge-axis or mandibular jaw joint axis of rotation. According to some embodiments, the Bonwill-axis is the intersection of the coronal plane and the Camper's plane and extends from the posterior edge of the Bonwill-triangle. The Bonwill-triangle intersects with the occlusal plane on the central incisal point and it intersects with the Camper's plane on the Bonwill-axis. More particularly, the Bonwill-axis is determined by the length of the lower tip-center vectors or a distance of the 28 mm or between 23 mm and 36 mm from the occlusal plane, the occlusal plane being parallel to the Camper's plane.

Bonwill-triangle, according to dental definition, is a theoretical equilateral triangle formed by three lines; one joining the right and left side condyle centers and two others joining the condyle centers and the central incisal point. Measuring 102 millimeters on each side, this construction represents average measurements of mandibles recorded and subsequently introduced by William Bonwill in 1864. According to some embodiments, the Bonwill-triangle intersects with the occlusal plane on the central incisal point and it intersects with the Camper's plane on the hinge-axis or Bonwill-axis.

Central bearing point, according to some embodiments, is a short stud or spike attached on center of one dental arch having an opposing plate or flat surface located on center of the opposing arch on which plate the stud presses and moves during mandibular jaw motion. According to some embodiments, the central bearing point is a 1 millimeter to 6 millimeter projection permanently fixed to the upper clutch or the lower clutch for distributing the closing forces of the jaws evenly over the clutch plates and the patient's dental supporting structures during recording of right lateral, left lateral, and protrusive excursions of mandibular jaw.

Centric occlusion, according to dental definition, is the maximum intercuspation of the upper and lower dental arches, also called "acquired centric occlusion." According to some embodiments, centric relation and centric occlusion are effective "centric start positions."

Centric relation, according to dental definition, is a position of the substantially retruded lower jaw. According to some embodiments, centric relation and centric occlusion are effective "centric start positions."

Centric start position, according to some embodiments, is one of two positions of the mandibular jaw, the recording instrument, and the articulating instrument; (1) centric relation being a position of the substantially retruded lower dental arch in relation to the upper dental arch; and (2) centric occlusion being the maximum intercuspation of the upper and lower dental arches, also called "acquired centric occlusion." According to some embodiments, centric relation and centric occlusion are effective centric start positions for recording mandibular jaw motion. The centric start position is the position of the arches where engraving begins, the patient being in centric relation or centric occlusion and the upper and lower recording bows being aligned thereon, i.e., the function of the clutch assembly indexing process. The centric start position of the recording instrument, is the aligned position of the upper recording bow and the lower recording bow in the centric relation or centric occlusion. The centric start position of the articulating instrument is the aligned position of the upper articulating frame and the lower articulating frame in the centric relation or centric occlusion. When in centric start position, the tip-centers are symmetrically aligned and centered in fixed spatial relation on the Bonwill-axis and substantially equidistant from the midsagittal plane. In centric start position; (1) the right and left side rotation-center heads are both in contact with the rear wall guide; (2) and each of the right and left side guide pins are respectively in contact with the pathways in the right and left side engraved analogs. The right and left side tip-centers are in centric relation or centric occlusion when; (1) the patient's dental arches are aligned in centric start position; (2) the upper and lower clutches are attached in the clutch assembly; (3) the upper recording bow and the lower recording bow are aligned in centric start position; and (4) the upper articulating frame and the lower articulating frame are aligned in centric start position, i.e., or the right and left side rotation-center heads are in contact with the rear wall guide and the right and left side guide pins are respectively in contact with the pathways in the engraved analogs. In some embodiments, the virtual polygon mesh pathways represent condyle motion commencing from the centric start position of the pins or the tip-centers. According to some embodiments, after the upper and lower clutches have been respectively fixed to the teeth, the patient is instructed to orient their mandibular jaw in a position selected from the orientations consisting of; centric relation; and centric occlusion. Accordingly, when the patient's jaw is positioned in one of these orientations, a signal is activated to digitally record that orientation as the centric start position.

Clinician, according to some embodiments, is any licensed dental practitioner or agent of a licensed dental practitioner which agent is selected from the groups comprising; licensed dental specialists; dental fabricators or laboratory technologists; dental instrument specialists; dental hygienists; and dental assistants.

Clutch, according to some embodiments, is a device made for gripping the patient's dental arch, which arch may be dentulous or edentulous. Generally, the clutch may be the upper clutch, in which case the clutch is for rigidly attaching the upper face-bow or recording instrument whereby the instrument behaves in space relations during mandibular jaw motion as if it were an outgrowth of the upper jaw. And, the clutch may be the lower clutch, in which case the clutch is for rigidly attaching a lower face-bow or recording instrument whereby the instrument behaves in space relations during mandibular jaw motion as if it were an outgrowth of the lower jaw.

Clutch assembly, according to some embodiments, comprises; (1) the lower clutch attached to a lower recording bow; (2) the upper clutch; (3) and the clutch spacer positioned over the central bearing point and sandwiched between the upper and lower clutches; the entire assembly connected with the clutch assembly attachment. The centric start position is the position of the dental arches where engraving begins, the patient being in centric relation or centric occlusion and the upper and lower recording bows being aligned thereon, i.e., the function of the clutch assembly indexing process. The clutch assembly is for indexing the patient's upper teeth with the central incisors on the Bonwill-apex, for indexing the lower teeth in centric relation or centric occlusion, and for locating and aligning the lower recording instrument on the patient's head.

Clutch spacer, according to some embodiments, is a clutch assembly component part for maintaining a fixed spatial relation around the central bearing point. The clutch spacer is sandwiched between the upper and lower clutches during indexing of the patient's teeth. The spacer separates and holds the clutches solidly in parallel during the indexing procedure.

Computer and software, according to common definition, comprises at least one processing element, some form of memory, an LCD screen or monitor, a keyboard, a pointing input device, and machine readable instructions.

Condylar elements, according to dental definition, are the right and left side mechanical component parts on the dental articulator which parts are the equivalent of the right and left condyles on the mandible. On an arcon type articulator, the right and left condylar elements are component parts located on the lower articulating frame that respectively move against the right and left guides on the upper articulating frame for simulating the motion of the patient's mandibular jaw.

Congealing material, according to some embodiments, is a substantially soft or putty like material that sets to a substantially hard or solid material in a relatively short time frame or one to five minutes. Currently, congealing materials are selected from the dental materials groups comprising; elastomers; polysulfides; polyethers; additional silicones; condensation silicones; self-curing acrylic resins; light-curing acrylic resins; and polymers such as BLUE-MOUSSE (Parkell Inc. of Edgewood, N.Y.). The assembled upper and lower clutch surfaces are covered with congealing material that the patient can bite into and that sets to substantially hard surfaces for indexing the upper and lower teeth. The engravable analogs are substantially comprised of congealing material.

Coordinate points, according to some embodiments, are digital XYZ axis points located in fixed spatial relation to the patient's upper dental arch.

Data set, according to some embodiments, refers to the data in a collection of closely related tables. Data sets relate to information comprising; a particular patient's mandibular jaw motion, engrave pin motion, envelopes-of-motion, or pathways representing excursive movements of the jaw; the right and left side virtual engraved analogs or polygon mesh envelopes-of-motion or pathways; the physical fabricating of engraved analogs by computer numeric control (CNC) milling; CNC printing, and SLA optical-fabricating; the location of the genuine vertical centers of rotation; the articulated model motion for fabricating of restorative and orthodontic treatment devices.

Dental arch, according to some embodiments, is either an upper or a lower curved composite structure of dentition and/or soft tissue. The dental arch may be dentulous or edentulous.

Dental bridge, according to dental definition, is a conventional restorative treatment for replacing missing teeth. The dental bridge is comprised of pontics (missing tooth replacements) that are splinted via connectors to crowns which crowns are fixed to adjacent prepared natural teeth or implant abutments.

Dental restorative treatment, according to some embodiments, is any one-of-a-kind restorative treatment device comprising; fixed crown and bridge devices; removable partial arch (partial denture) and removable complete arch (full denture) devices; bite/snore/athletic guard devices; pediatric crown devices; and orthodontic devices.

Die, according to dental definition, is any article that has been fabricated for copying or representing the groups comprising; the patient's prepared natural tooth; an implant abutment; and a soft tissue pontic area.

Digital 3D scanner, according to some embodiments, is a device that captures digital information about the shape of an object with equipment that uses technologies comprising; laser; light; photo-optic; probe; or other means; to locate coordinate points in space and thereby to produce a point cloud and subsequently, a polygon mesh virtual model of the object.

Digital articulating instrument, according to some embodiments, is a dental articulator having usual and customary component parts comprising; an upper frame having a means of attaching the patient's upper dental arch model; the upper frame also having some form of upper frame interactive guidance located behind the upper model; the upper frame having an adjustable incisal pin located in front of the upper model; a lower frame having a means of attaching the patient's lower dental arch model; the lower frame also having some form of upper frame interactive guidance located behind the lower model; and the lower frame having an table for forming an incisal pin guide that imitates the proposed anterior teeth guidance. The digital articulating instrument, according to some embodiments, is a dental articulator having unique component parts comprising; the upper articulating frame having the virtually engraved right and left side analogs, which analogs are located toward or away from the articulator midsagittal plane on and within the Bonwill-axis according to data provided by the computer and software that rescaled the analogs; the lower articulating frame having the virtual right and left side guide pins, which pins are located toward or away from the articulator midsagittal plane on and within the Bonwill-axis according to data provided by the computer and software that rescaled the analogs. Accordingly, the analogs and the pins are centered on the genuine vertical rotation-centers. Being closer to the articulator midsagittal plane than the engraved analogs as formed on the physical recording instrument, the engraved analogs on the digital articulating instrument are rescaled or made proportionately smaller. The engraved analogs on the digital articulating instrument are digitally rescaled in all dimensions, with the exception of the respective pathways, which pathway dimensions are calculated to remain the same whereby the guide pins on the lower articulating frame follow the pathways in said scaled down engraved analogs. The vertical rotation-centers are located according to data provided by the computer and software that reconfigured the virtual engraved analogs. The right and left side virtual engraved analogs respectively have an anterior pathline endpoint and a posterior pathline endpoint, the connected endpoints being the right lateral vector and the left lateral vector. The right lateral vector and left lateral vector intersections with the coronal plane represent the respective right and left side vertical rotation-centers. Each vertical rotation-center is the genuine vertical center around which the right and left sides of the articulator rotate when the instrument is moved in a lateral excursion.

Digital recording system, according to some embodiments, is a system that converts the patient's real-time jaw motion, singly or in combination with static patient-generated biting surfaces, into virtual right lateral, left lateral, and protrusive mandibular jaw motion or engrave pin motion, thereby generating polygon mesh models of the envelopes-of-motion or pathways in a right and a left side engravable analog, the mesh pathways then being transformed into a right and a left side engraved analog by technologies selected from the groups comprising; a CNC milling system; a CNC printing system; and an SLA optical-fabricating system. Accordingly, the digital recording system converts pin motion capture into 3D polygon mesh models. In some embodiments, the digital recording system generates; (1) a plurality of pathlines, each of the pathlines being a 3D curvilinear line tracing produced by patient-generated motion of the virtual pin tip-centers; (2) the virtual right lateral vector intersection with the coronal plane locating the virtual right vertical rotation-center; and (3) the virtual left lateral vector intersection with the coronal plane locating the virtual left side vertical rotation-center.

Engravable analog, according to some embodiments, is a physical or virtual component part having substantially a right-cuboid-prism form or a right-trapezoid-prism form. Each of two analogs are positioned respectively on the right and left side of the patient's head and in the vicinity of the Bonwill-axis. Each analog having one engravable surface, is attached to and supported on the upper recording bow. In some embodiments, the engravable surfaces are substantially parallel to the plain of the Bonwill-triangle. In some embodiments, the engravable analogs are physically engraved, thereby capturing the patient's envelopes-of-motion or pathways in the engraved analogs. In some embodiments, the engravable analogs are containers filled with soft congealing material which material is formed by the engrave pins as they move through the material. In some embodiments, virtual engravable analogs are virtually engraved and physically formed by milling, printing, or optical-fabricating in a rapid prototyping machine. After they have been physically formed, the engraved analogs are transferred to the upper frame of the articulator where guide pins on the lower frame follow the pathways in the engraved analogs. In some embodiments, the engravable analogs are virtual engravable analogs providing areas where digital information can be introduced to generate pathways representing the patient-specific condyle motion in the vicinity of the Bonwill-axis.

Engraved analog, according to some embodiments, is a physical or virtual component part having substantially a right-cuboid-prism form or a right-trapezoid-prism form. Each of two analogs are positioned respectively on the right and left side of the patient's head and in the vicinity of the Bonwill-axis. Each analog, having one engraved surface, is attached to and supported on the upper recording bow. In some embodiments, the engraved surfaces are substantially parallel to the plain of the Bonwill-triangle. In some embodiments, the analogs are physically engraved analogs, capturing the patient's envelopes-of-motion or pathways in the analogs. In some embodiments, the engraved analogs are containers filled with substantially hard congealed material which material was formed by the engrave pins as they moved through the material when it was soft. In some embodiments, virtual engraved analogs are virtually engraved and physically formed by milling, printing, or optical-fabricating means in a rapid prototyping machine. After they have been physically formed, the engraved analogs are transferred to the upper frame of the articulator where guide pins on the lower frame follow the pathways in the engraved analogs. In some embodiments, the engraved analogs are virtual engraved analogs having pathways representing patient-specific condyle motion in the vicinity of the Bonwill-axis.

Envelope-of-motion, according to some embodiments, is the physically or digitally generated pattern of curvilinear pathways (functionally generated paths) engraved in each of the engraved analogs, which pathways represent all possible positions of the engrave pin as the patient executes right lateral, left lateral, and protrusive mandibular jaw motion.

Fixed spatial relation, according to some embodiments, is a consistent dimensional relationship involving component parts, centers, and surfaces based on the patient's upper dental arch when the patient's dental arches are aligned in centric start position, and when the upper recording bow and the lower recording bow are aligned in centric start position, and when the upper articulating frame and the lower articulating frame are aligned in centric start position.

Functional occlusion, according to dental definition, is correct tooth contact in the process of mastication, correct contact being in the absence of weak contacts, premature contacts, deflective contacts, and proprioceptive neuromuscular contacts.

Gothic arch tracing, according to some embodiments, is an inscribed pattern of mandibular jaw motion excursions produced by a device attached to the opposing dental arches. The tracing created on a horizontal plate, resembles that of an arrowhead or pointed arch. When the tracing instrument's marking point is at the apex of the pattern, the jaws are considered to be in centric relation. This method is helpful in positively identifying the patient's true centric relation.

Hinge axis, according to dental definition, is the patient-specific terminal axis of rotation of the mandible when the mandibular condyles are in their most superior position in the glenoid fossa.

Indexing retention holes, according to some embodiments, are holes in the upper and lower clutch plates. When the clutches are rigidly joined together as a part of the clutch assembly, the congealing material, as a paste, is spread on the top and bottom surfaces of the assembled clutches. The clinician positions the clutch assembly in the patient's mouth whereby the upper central incisor teeth are on the Bonwill-apex, which apex is indicium or fenced on the upper clutch, the clinician symmetrically aligning the clutch assembly on the patient's head. The patient is then instructed to lightly bite into the clutches holding the clutches between their teeth until the resin is set. The holes serve as resin retention to adhere the congealing material for indexing and griping the upper and lower dental arches thereby enabling the patient to execute right lateral, left lateral, and protrusive mandibular jaw motion for forming the right side and left side patient engraved analogs.

Inferior-Ala, according to dental definition, is the anterior point by which the theoretical the Camper's plane is constructed from the inferior boarder of the Ala or wing of the nose to the hinge-axis or Bonwill-axis. According to some embodiments, the Camper's plane is determined by the length of the lower tip-center vectors or a distance of the 28 mm or between 23 mm and 36 mm from the occlusal plane, the occlusal plane being parallel to the Camper's plane.

Jaw, according to dental definition, is either the upper maxillary or lower mandibular bones that anchor the teeth and form the structural basis of the mouth. The maxillary jaw is part of the head and is for all practical dental purposes, stationary, and the mandibular jaw moves in relation to the maxillary jaw. An articulator is an instrument that simulates mandibular jaw motion and sits on a laboratory work bench and accordingly, the upper frame of the articulator is moved in relation to the lower frame.

Lower articulating frame, according to dental definition, is for mounting a gypsum or resin model of the patient's mandibular teeth or dental arch; the lower member of the dental articulator.

Lower model, according to dental definition, is a positive replica of the mandibular teeth or dental arch and surrounding or adjacent structures used as a diagnostic aid and for treatment planning and construction of dental restorative treatments.

Lower recording bow, according to some embodiments, is an extraoral instrument attached to the lower dental arch. The lower bow has the right and left side engrave pins that are in position under and in the upper bow analog blocks for engraving patterns of mandibular jaw motion. In some embodiments, the recording bows are manufactured of rigid, light weight materials such as aluminum, polymer, and dense-molded polystyrene foam. By manufactured the recording bows inexpensively, the physical recording instrument can be distributed to students in dental schools with a view to accurately describing and teaching mandibular jaw motion. Dental students can more easily understand jaw motion while using a uncomplicated, physical recording method. The physical recording instrument comprises; (1) an upper and a lower clutch for respectively attaching the patient's upper and lower dental arches; (2) a central bearing point for separating the upper and lower clutches during execution of the patient's mandibular jaw motion; (3) an upper recording bow and a lower recording bow, the bows being respectively attachable to the clutches; (4) a right and a left side engravable analog, the analogs being attachable to the right and left underside or the interfacial plane surface of the upper recording bow, the analogs being located on the instrument-oriented Bonwill-axis; (5) a right and a left side engrave pin, the pins being respectively threaded into the lower recording bow, the pin tip-centers being extendable into the instrument-oriented Bonwill-axis; and (6) a plurality of attachments for respectively attaching the apparatus component parts.

Mechanical guide surfaces, according to dental definition, are adjustable surfaces which form the right and left side guides of a traditional dental articulator. Mechanical adjustments comprise; condylar inclination; side shift, progressive; side shift, immediate; intercondylar width (vertical axis of rotation); axis rotation; and axis inclination. Incisal guide surfaces are also adjustable or formable, but these are not related to the present invention.

Milling system, according to some embodiments, is a CNC subtractive fabricating system commonly used in dental restorative and industrial one-of-a-kind fabricating or rapid prototyping in which a computer controlled block of material is fed against a rotating cutter that engraves the block according to digital data sets.

Optical-fabricating system, according to some embodiments, is a stereolithography (SLA) additive fabricating system commonly used in dental and industrial one-of-a-kind fabricating or rapid prototyping in which computer controlled movement is used to build up the required structure, layer by layer, from a liquid polymer that hardens on contact with the light.

Pathline, according to some embodiments, is the digitally generated 3D line tracing representing the curvilinear pattern of motion of the jaw. Accordingly, the digital recording system converts the patient's real-time jaw motion, singly or in combination with static patient-generated biting surfaces, into virtual pin pathways and tip-center pathlines. In some related embodiments, the digital recording system generates; (1) a plurality of pathlines, each of the pathlines being a 3D curvilinear line tracing generated by the tip-center motion of the virtual pins; (2) the virtual right lateral vector intersection with the coronal plane locating the virtual right vertical rotation-center; and (3) the virtual left lateral vector intersection with the coronal plane locating the virtual left side rotation-center.

Pathway, according to some embodiments, is the physically or digitally generated 3D channel (functionally generated path) engraved in one of the engraved analogs representing the patient-specific curvilinear pattern of motion of an engrave pin having a spherical tip, as the patient executes right lateral, left lateral, and protrusive mandibular jaw motion.

Pantographic tracings, according to dental definition, are an inscribed set of lines on substantially flat surfaces made by styluses for the purpose of recording real-time patient-specific mandibular jaw motion. The production of pantographic linear tracings is facilitated by upper and lower members of an extraoral tracing instrument attached respectively to the patient's upper and lower teeth. The tracing instrument is used to record mandibular jaw motion made by simultaneously inscribing six plates; on the right side, one plate in a sagittal plane and one plate in a transverse plane; on the left side, one plate in a sagittal plane and one plate in a transverse plane; and on the right and left front of the face, two plates in a transverse plane.

Physical articulating instrument, according to some embodiments, comprises; (1) the upper and lower articulating frames; (2) the right and left side articulating guides or engraved analogs and respective condylar elements or guide pins; (3) the adjustable vertical centers of rotation for controlling the timing of the pins moving in the guides; (4) an adjustable incisal guide pin having engraved marks for locating the upper articulating frame to the lower articulating frame; (5) an incisal guide table; (6) and the component parts for mounting the upper and lower models respectively on the upper and lower frames.

Physical recording instrument, according to some embodiments, is for recording the patient's right lateral, left lateral, and protrusive mandibular jaw motion. The physical recording instrument comprises; (1) an upper and a lower clutch for respectively attaching the patient's upper and lower dental arches; (2) a central bearing point for separating the upper and lower clutches during execution of the patient's mandibular jaw motion; (3) an upper recording bow and a lower recording bow, the bows being respectively attachable to the clutches; (4) a right and a left side engravable analog, the analogs being attachable to the right and left underside (the interfacial plane surface) of the upper recording bow, the analogs being located in the vicinity of the instrument-oriented Bonwill-axis; (5) a right and a left side engrave pin, the pins being respectively threaded into the lower recording bow, the pin tip-centers being extendable into the instrument-oriented Bonwill-axis; and (6) a plurality of attachments for respectively attaching the apparatus component parts.

Pins, according to some embodiments, are spherical tipped elongated cylinders having base supports on the lower recording bow and the lower articulating frame, each pin having a theoretical tip-center in the spherical tip for locating the pins, planes, and fixed vectors, and for generating virtual pathlines, variable vectors, and vertical rotation-centers. The pins are selected from the groups consisting of; engrave pins; and guide pins. The lower recording bow has a right and a left side engrave pin, the pins being tools for engraving one surface of an engravable analog. In some embodiments, the vertically aligned engrave pins are located substantially perpendicular to the engravable surface, the engrave pin spherical tips being under and inside of, the engravable analogs. The lower articulating frame has two guide pins, each of the pins being located in fixed spatial relation on the right and left sides of the lower articulating frame, and each of the pins being a condylar element for following pathways in an engraved analog. In some embodiments, the engrave pins and the guide pins have matching lengths, diameters, and spherical tips. The engrave pins are an extension on a machine threaded screw base, each base being adjustably threaded into the right side and the left side of a lower recording bow. In some other embodiments, the engrave pins have matching lengths and spherical tip diameters, uniformly expanding this diameter from the spherical tip down to the screw bases, thereby producing expanded taper pathways in the engraved analogs which pathways can subsequently be faultlessly followed by each of the guide pins having uniform unexpanded diameters. The virtual engrave pins are the digitally described right and left side engrave pins generated by a computer and software for representing and performing the functions of the physical engrave pins.

Plane, Camper's, according to dental definition, the Camper's plane is the theoretical plane formed from the inferior-Ala of the nose through the lower margin of the inferior border of the right and left side external auditory meatus. According to some embodiments, the Camper's plane is the middle horizontal plane located parallel to, and between, the interface plane and the occlusal plane. More particularly, the Camper's plane is determined by the length of the lower tip-center vectors or a distance of the 28 mm or between 23 mm and 36 mm from the occlusal plane. The Camper's plane and the coronal plane intersect and are perpendicular to one another, which intersection incorporates the Bonwill-axis and accordingly, the tip-centers, and the vertical rotation-centers.

Plane, coronal, according to some embodiments, is the vertical plane, being perpendicular to the interface plane, the Camper's plane, the occlusal plane, and the midsagittal plane. The coronal plane incorporates the Bonwill-axis, the lower tip-center vectors, the upper tip-center vectors, and the vertical rotation-centers. Specific to the upper articulating frame, the coronal plane is parallel to the rear wall guide, the rear wall guide surface and the coronal plane being a fixed distance of one half of the diameter of the vertical rotation-centers. The right lateral vector and the left lateral vector represent the right and left side vector intersections with the coronal plane or the right and left side vertical rotation-centers for controlling the timing on the right and left sides of the articulating instrument when simulating mandibular jaw motion.

Plane, interfacial, according to some embodiments, is the uppermost horizontal plane representing the bottom or underside surfaces of the upper recording bow and the upper articulating frame, which underside surfaces are the mounting surfaces for the engravable analogs or the engraved analogs. More particularly, the interfacial plane is determined by the length of the upper tip-center vectors plus the lower tip-center vectors or a distance of the 51 mm or between 38 mm and 67 mm from the occlusal plane, the occlusal plane being parallel to the interfacial plane.

Plane, midsagittal, according to some embodiments, is the plane formed on the bilateral center of the present apparatus and accordingly incorporates the Bonwill-apex. The midsagittal plane, being perpendicular to the four other planes, is the planer surface obtained when the dental apparatus is separated into symmetrical right and left sides, the sides having bilateral symmetry.

Plain, occlusal, according to some embodiments, is the lowermost horizontal plane representing the indexing surface of the upper clutch or the Bonwill-apex. The occlusal plane is the plane established when the patient bites down on the coupled clutches assembled as part of the clutch assembly. Accordingly, the occlusal plane is an extension of the indexing surface or top surface of the upper clutch. The occlusal plane incorporates the Bonwill apex, the anterior Bonwill-apex vector and the right and left side posterior Bonwill-apex vectors.

Polygon mesh models, according to some embodiments, is a collection of vertices, edges and faces that defines the shape of a polyhedral object in 3D computer graphics; a wire frame model described by X, Y, and Z axis coordinate points.

Printing system, according to some embodiments, is a CNC additive fabricating system commonly used in dental restorative and industrial one-of-a-kind fabricating or rapid prototyping in which a computer controlled moving binder or sinter head is used to build up the required structure, forming layers of material according to digital data sets.

Rear wall guide, according to some embodiments, is a fixed substantially flat surface on the upper articulating frame being perpendicular to the interfacial plane and parallel to and posterior of the Bonwill-axis. The parallel distance between the rear wall guide and the Bonwill-axis is one half of the diameter of the rotation-center heads. When the rotation-center heads on the lower articulating frame engage the rear wall guide on the upper articulating frame, the articulator is positioned in centric start position. When the articulating frames are moved in right lateral excursions or left lateral excursions, one of the rotation-center heads on the lower articulating frame engages the rear wall guide on the upper articulating frame for controlling the timing of the right and left sides of the articulator.

Rotation-center attachment, according to some embodiments, is one of two attachments that fasten the right and left side rotation-center heads on independent slidable rotation-center posts in rotation-center slots, each rotation-center head being slidable toward or away from the articulator midsagittal plane, and each rotation-center head being adjustable on horizontal center with the Bonwill-axis.

Rotation-center head, according to some embodiments, is one of two independently slidable-fixable sphere-shaped parts, one right side rotation-center head and one left side rotation-center head. Each rotation-center head, being adjustably mounted on the lower articulating frame, actively functions with the rear wall guide, the guide being fixed on the upper articulating frame. The rotation-center heads and the rear wall guide are for positioning the upper and lower articulating frames in centric start position and for controlling the timing of the right and left sides of the articulator when it is moved in right lateral and left lateral excursions. Each of the right and left side rotation-center heads is supported on the lower frame by a rotation-center post, each post being attached in a rotation-center slot with an independently slidable-fixable rotation-center attachment. In centric start position, the rotation-center heads and the pins produce pure horizontal rotation within the Bonwill-axis. The vertical rotation-center heads in relation to the rear wall guide and the guide pins in the engraved analog pathways relate the upper articulating frame to the lower articulating frame in centric start position, during right lateral excursion, and during left lateral excursion. In centric start position; (1) the right and left side rotation-center heads are both in contact with the rear wall guide; (2) and each of the right and left side guide pins are respectively in contact with the pathways in the right and left side engraved analogs. During a lateral excursion; (1) the active rotating-center head remains in contact with the rear wall guide, urging the guide pins to rotate around the active head, the guide pins moving in their respective engraved analog pathways; (2) the guide pin on the side of the active head moving rearward in its pathway; and (3) the guide pin on the opposite side moving forward in its pathway. Hence, the timing on the articulator's right and left sides is simulated according to patient-specific mandibular jaw motion.

Rotation-center post, according to some embodiments, is one of two posts that respectively support the right and the left side rotation-center heads on the lower articulating frame.

Rotation-center slot, according to some embodiments, is one of two slots exactly fitting the rotation-center post whereby the rotation-center head is adjusted within the Bonwill-axis by loosening the rotation-center attachment and moving the rotation-center post in the slot toward or away from the articulator midsagittal plane and tightening the rotation-center attachment.

Screw base, according to some embodiments, is one of two adjustable machine threaded bases that respectively support the engrave pins located on the right and left sides of the lower recording bow. Beginning from the lowest position on the lower recording bow, the screw base is incrementally moved vertically from outside of, and into, the Bonwill-axis for reducing stress during engraving of the soft congealing material or soft analog material when the patient executes right lateral, left lateral, and protrusive mandibular jar motion.

Sensor, according to some embodiments, is a device that interacts with another sensor device for tracking and recording the patient's right lateral, left lateral, and protrusive mandibular jaw motion, whereby data from the sensors, as part of a computerized system, convert this motion into virtual engrave pin motion, generating polygon mesh envelopes-of-motion or pathways in virtual engravable analogs. The sensors track and record jaw motion by employing technologies selected from at least one the groups comprising; ultrasound; electromagnetic; microwave; infrared; radiography; magnetic resonance imaging; and other known and future compatible technologies. The sensors, data acquisition hardware, software, and a computer, facilitate tracking and recording of real-time motion of the right and left side virtual engrave pins having the virtual spherical tips and the virtual tip-centers. Accordingly, data sets are generated which data sets comprise; (1) the right and left side polygon mesh models of the pathways in the engraved analogs; (2) the right lateral vector intersection with the coronal plane and hence, the genuine left side vertical rotation-center; and (3) the left lateral vector intersection with the coronal plane and hence, the genuine right side vertical rotation-center.

Spacer hole, according to some embodiments, is a hole in the clutch spacer which hole fits over the central bearing point on one of the clutches. The clutch spacer being the same thickness as the height of the central bearing point, maintains the fixed spatial relation between the upper clutch and the lower clutch when the patient bites into the congealing material on the upper and lower surfaces of the clutch assembly.

Temporomandibular joint, according to dental definition, is one of few synovial joints in the human body having an articular capsule; a joint having a specialized form of articulation permitting more or less free motion, the union of the bony elements being surrounded by an articular capsule enclosing a cavity lined by synovial membrane. The TMJ, being a synovial or diarthrodial joint, is the only set of joints in the body in which the movement of one joint is always synchronous with the movement of the other. Health and function of TMJ and the mouth systems are closely related and accordingly, the TMJ has been studied by clinicians seeking to understand and reproduce its consistent complex motion for hundreds of years.

Tip-center, according to some embodiments, is the theoretic or virtual center point in the spherical tip of the pin. The right and left side tip centers are aligned on the Bonwill-axis. The right and left side tip-centers are in centric relation or centric occlusion when; (1) the patient's dental arches are aligned in centric start position; (2) the upper and lower clutches are attached in the clutch assembly; (3) the upper recording bow and the lower recording bow are aligned in centric start position; and (4) the upper articulating frame and the lower articulating frame are aligned in centric start position, i.e., the right and left side rotation-center heads are in contact with the rear wall guide and the right and left side guide pins are respectively in contact with the pathways in the engraved analogs. In some embodiments, the virtual polygon mesh pathways represent condyle motion commencing from the centric start position of the tip-centers. The virtual tip-centers are the digitally described right and left side tip-centers generated by a computer and software for representing and performing the functions of the physical tip-centers.

Upper articulating frame, according to dental definition, is for mounting a gypsum or resin model of the patient's maxillary teeth or dental arch. The upper member of the dental articulator.

Upper model, according to dental definition, is a positive replica of the maxillary teeth or dental arch and surrounding or adjacent structures used as a diagnostic aid and for treatment planning and construction of dental restorative treatments.

Upper recording bow, according to some embodiments, is an extraoral instrument attached to the upper dental arch. The upper bow has the right and left side engravable analogs that are respectively in position over the lower bow engrave pins for engraving patterns of mandibular jaw motion. In some embodiments, the recording bows are manufactured of rigid, light weight materials such as aluminum, polymer, and dense-molded polystyrene foam. By manufactured the recording bows inexpensively, the physical recording instrument can be distributed to students in dental schools with a view to accurately describing and teaching mandibular jaw motion. Dental students can more easily understand jaw motion while using a uncomplicated, physical recording method. According to some embodiments, the physical recording instrument comprises; (1) an upper and a lower clutch for respectively attaching the patient's upper and lower dental arches; (2) a central bearing point for separating the upper and lower clutches during execution of the patient's mandibular jaw motion; (3) an upper recording bow and a lower recording bow, the bows being respectively attachable to the clutches; (4) a right and a left side engravable analog, the analogs being attachable to the right and left underside or interfacial plane surface of the upper recording bow, the analogs being located in the vicinity of the instrument-oriented Bonwill-axis; (5) a right and a left side engrave pin, the pins being respectively threaded into the lower recording bow, the pin tip-centers being extendable into the instrument-oriented Bonwill-axis; and (6) a plurality of attachments for respectively attaching the apparatus component parts.

Vector, according to some embodiments, is a line connecting two specified coordinate points. There are two classes of vectors; fixed vectors; and variable vectors. A fixed vector is a line connecting two specified planer coordinate points, each fixed vector being in effect descendant from the Bonwill-apex. The anterior Bonwill-apex vector is incorporated in the intersecting occlusal plane and midsagittal plane and is perpendicular to the right and left side posterior Bonwill-apex vectors. The posterior Bonwill-apex vectors are incorporated in the intersecting occlusal plane and coronal plane and are perpendicular to the right side and left side lower tip-center vectors. The lower tip-center vectors are incorporated in the coronal plane and extend into the right and left side upper tip-center vectors. Fixed vectors enable the software program writer to generate the digital recording system for tracking and recording of mandibular jaw motion or pin and tip-center motion data in the form of polygon mesh envelopes-of-motion or pathways. A variable vector is a line that connects the anterior pathline endpoint on one virtual engraved analog and the posterior pathline endpoint on the opposite virtual engraved analog. Accordingly, the two variable vectors are the right lateral vector, and the left lateral vector. The pathlines are 3D curvilinear line tracings produced by the virtual motion of the tip-centers. The right side pathlines in the virtual pathways have the virtual right anterior pathline endpoint. The left side pathlines in the virtual pathways have a virtual left posterior pathline endpoint. These two coordinate points generate the virtual left lateral vector which vector intersection on the coronal plane produces the virtual left side vertical rotation-center. The right side pathlines in the virtual pathways have the virtual right posterior pathline endpoint. The left side pathlines in the virtual pathways have the virtual left anterior pathline endpoint. These two coordinate points generate the virtual right lateral vector which vector intersection on the coronal plane produces the virtual right side vertical rotation-center. Each vertical rotation-center is the genuine vertical center around which the upper articulating frame and lower articulating frame rotate when the instrument is moved in a lateral excursion. By identifying the variable vector that connects the anterior pathline endpoint (or XYZ axis coordinate point in one of the virtual engraved analogs) and the posterior pathline endpoint (or XYZ axis coordinate point in the opposite virtual engraved analog), the software program writer locates the intersection of the vector (or XYZ axis coordinate point) on the coronal plane and thereby locates the respective virtual vertical rotation-center for a lateral excursion of the virtual articulating instrument.

Vertical rotation-centers, according to some embodiments, are the right and left side genuine centers of rotation which centers are substantially vertical centers of rotation located between the guide pins and at the intersections of the variable vectors on the coronal plane. Each patient-produced right lateral and left lateral motion of the mandibular jaw has respectively, one right side and one left side vertical rotation-center. The vertical rotation-centers are different for each patient and are physically and virtually determined from the patient's right and left side engraved analogs. In some embodiments, the vertical rotation-centers are physically located on the physical articulating instrument having adjustable right and a left side vertical rotation-centers, which centers are located based respectively on a full right and a full left lateral positions of guide pins in the engraved analog pathways. In some embodiments, the centers are virtually located on intersections of the right lateral vector and the left lateral vector respectively on the coronal plane. In some embodiments, the vertical rotation-centers are virtual vertical rotation-centers. The virtual vertical rotation-centers are the digitally described right and left side vertical rotation-centers generated by a computer and software for representing and performing the functions of the physical vertical rotation-center. The vertical rotation-centers conveniently and effectively control the timing on the right and left sides of the articulating instrument when simulating mandibular jaw motion. Each vertical rotation-center is the genuine frontal or vertical center around which the right and left sides of the articulator rotate when the instrument is moved in a lateral excursion.

Virtual articulating instrument, according to some embodiments, is a computer simulated instrument capable of simulating patient-specific mandibular jaw motion in a productive dental CAD/CAM fabricating system. The virtual articulating instrument has the virtual vertical rotation-centers for controlling the timing of the virtual right and left side pins in the pathways of the virtual engraved analogs. The virtual articulating instrument has virtual component parts that are in spatial relation, dimension, and function the same as those comprising the physical articulating instrument. Accordingly, patient mandibular jaw motion is digitally recorded and simulated from virtual analog records of the motion and using these records with controlled right and left side timing in producing fully functional occlusions in digitally fabricated dental restorative and orthodontic treatment devices.

DRAWING REFERENCE NUMERALS 100 lower recording bow
102 clutch
104 clutch attachment
106 clutch spacer
108 central bearing point
110 spacer hole
112 clutch assembly attachment
114 indexing retention holes
116 congealing material
118 Bonwill-apex
120 raised pointer
122 pin
124 spherical tip
126 tip-center
128 screw base
130 Bonwill-axis
132 Bonwill-triangle
134 upper recording bow
136 engravable analog
138 analog attachment
140 inferior-Ala
142 model
144 clutch articulator support
146 upper articulating frame
148 lower articulating frame
150 engraved analog
152 rotation-center head
154 pathway
156 guide pin post
158 rotation-center post
160 rotation-center slot
162 rear wall guide
164 vertical rotation-center
166 rotation-center attachment
168 fixed vector
170 digital upper recording bow
172 digital lower recording bow
174 sensor
176 variable vector
178 pathline
180 mechanical guide surface
182 pantographic tracing
184 step "Attach the recording instrument on patient."
186 step "Instruct and assist the patient in moving their mandibular jaw in right lateral, left lateral, and protrusive excursions."
188 step "Record real-time motion-tracking signals as right and left side pathways of the virtual pins and right and left side pathlines of the virtual tip-centers."
190 step "Generate at least two data sets representing engraved analog polygon mesh models and tip-center pathlines."
192 step "Display the engraved analog polygon mesh models and the tip-center pathlines."
194 step "Generate the polygon mesh models, the pathline, the right lateral vector, the left lateral vector, and the intersecting coronal plane data sets."
196 step "Display the polygon mesh models, the pathlines, the right lateral vector, the left lateral vector, the intersecting coronal plane, and the numeric values for the vertical rotation-centers."
198 step "Detach the recording instrument from patient."
200 step "Generate patient-specific mandibular jaw motion data sets."
202 step "Display virtual pin motion in the pathways of the virtual engraved analogs having controlled right and left side timing."
204 step "Using known software for integrating jaw motion simulation and dental CAD, generate data sets for virtual fully functional occlusal and lingual surfaces of teeth."
206 step "Fabricate fully functional dental restorative treatments by milling or digitally forming these devices using a known dental CAD/CAM fabricating system."
208 step "All motion has a right and a left centric start position which is the aligned fixed spatial relation of the upper and lower recording bows or the upper and lower articulating frames."
210 step "All motion is recorded or recreated as a bodily shift of the lower recording bow or the lower articulating frame."
212 step "All motion is calculated from a fixed point which is the Bonwill-apex."
214 step "All bodily shifts are calculated distances from the Bonwill-apex to the right and left side tip-centers."

216 step "Distances from the Bonwill-apex to the tip-centers are the anterior Bonwill-apex vector, 85 mm, plus the posterior Bonwill-apex vector, 111 mm, plus the lower tip-center vectors, 32 mm."
218 step "All motion of the tip-centers is performed within the confines of the right and left side engravable analogs."
220 step "The engravable analogs are positioned over the tip-centers and adjacent to the interfacial plane which plane is 19 mm above the tip-centers."
222 step "All motion is classified into right lateral, left lateral, and protrusive motion."
224 step "The right lateral and left lateral motion have pathline endpoints."
226 step "The right lateral motion has a right anterior pathline endpoint and a left posterior pathline endpoint."
228 step "The right lateral motion endpoints, when connected, general a right lateral vector."
230 step "The right lateral vector intersects at a point located on the coronal plane."
232 step "The right lateral vector and the coronal plane intersect point is the left side vertical rotation-center."
234 step "The left lateral motion has a left anterior pathline endpoint and a right posterior pathline endpoint."
236 step "The left lateral motion endpoints, when connected, generate a left lateral vector."
238 step "The left lateral vector intersects at a point located on the coronal plane."
240 step "The left lateral vector and the coronal plane intersect point is the right side vertical rotation-center."
242 step "The vertical rotation-centers locate the upper and lower articulating frames in centric start position and control timing of the right and left side guide pins as the pins follow pathways in the engraved analogs."
246 buccal band
1000 clutch assembly
2000 physical recording instrument
2010 Camper's plane
2012 coronal plane
2014 midsagittal plane
2016 interfacial plane
2018 occlusal plane
2020 posterior Bonwill-apex vector
2022 lower tip-center vector
2024 upper tip-center vector
2026 anterior Bonwill-apex vector
2028 right anterior pathline endpoint
2030 right posterior pathline endpoint
2032 left anterior pathline endpoint
2034 left posterior pathline endpoint
2036 right lateral vector
2038 left lateral vector
3000 physical articulating instrument
4000 digital recording system 4100 digital recording bow system
5000 virtual articulating instrument
6000 digital articulating instrument

DETAILED DESCRIPTION OF EXEMPLARY EMBODIMENTS

In the following description of exemplary embodiments, reference is made to the accompanying drawings which form a part hereof, and in which it is shown by way of illustration, specific exemplary embodiments can be practiced. It is to be understood that other embodiments can be used and structural changes can be made without departing from the spirit and scope.

Disclosed herein are a class of motion recording and precision motion simulating apparatus which use two independently slidable-fixable vertical rotation-centers and a fixed rear wall guide to locate the upper and lower articulating frames in finding centric start position and in performing right and left lateral excursions. The embodiments have the benefits of a dental articulating instrument that can simulate precise patient mandibular jaw motion to facilitate fabrication of fully functional restorative and orthodontic treatment devices.

FIG. 1A is a front perspective view. In this illustration, a dental clutch assembly apparatus is generally designated 1000. Accordingly, the clutch assembly 1000 is for indexing the patient's upper and lower teeth in centric start position and for locating and aligning a lower recording bow 100 on the patient's head. The clutch assembly 1000 comprises a pair of clutches 102, the lower clutch 102 being attachable to the lower recording bow 100 with a clutch attachment 104. A clutch spacer 106, sandwiched between the upper and lower clutches 102, is positioned over a central bearing point 108, shown in FIG. 13B. The central bearing point 108 is a projection on one of the clutches 102 and the clutch spacer 106 is a plate having a spacer hole 110, shown in FIG. 14, the spacer hole 110 fitting over the central bearing point. During all procedures, either the central bearing point 108 or the clutch spacer 106 maintain a consistent fixed distance between the upper and lower clutch centers. The component parts of the clutch assembly 1000 comprising, the upper clutch 102, the clutch spacer 106, and the lower clutch 102 attached to the lower recording bow 100, are rigidly held together with a clutch assembly attachment 112. The upper and lower clutches 102 have a plurality of indexing retention holes 114, shown in FIG. 14. The indexing retention holes 114 are used to adhere a prepared batch of congealing material 116. The congealing material 116 is selected from the dental materials groups comprising; elastomers; polysulfides; polyethers; additional silicones; condensation silicones; self-curing acrylic resins; light-curing acrylic resins; and polymers such as BLUE-MOUSSE (Parkell Inc. of Edgewood, N.Y.). According to one of the methods, the upper and lower clutches 102 in the clutch assembly 1000 are spread with a paste of the congealing material 116 on the top and bottom surfaces of the conjoined clutches 102. Then the conjoined clutches 102, having the soft congealing material 116, are positioned in the patient's mouth with the upper incisor teeth located on a Bonwill-apex 118, the Bonwill-apex 118 being indicium or fenced with a raised pointer 120 on upper surface of the upper clutch 102. Then the lower bow 100 in the clutch assembly 1000 is symmetrically aligned on the patient's head and the patient is instructed to lightly bite into the conjoined upper and lower clutches 102, positioning their lower jaw in centric relation. The patient is then asked to hold the clutches 102 in the clutch assembly 1000 between their teeth until the congealing material 116 has set. The lower recording bow 100 comprises a right side and a left side engrave pin 122, each pin having a spherical tip 124, and each tip having a virtual tip-center 126, shown in FIG. 1B. Each engrave pin 122 has a symmetrically aligned independently adjustable screw base 128. The tip-centers 126 are, when in centric start position, symmetrically aligned and centered in fixed spatial relation on a Bonwill-axis 130, the axis 130 incorporating and extending from the posterior edge of a Bonwill-triangle 132.

Figure 1B:
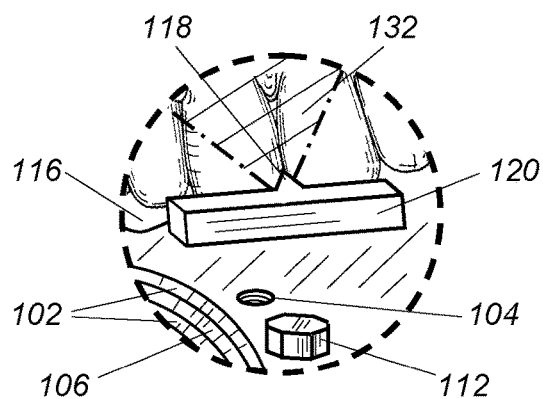
FIG. 1B is a perspective view of Detail Of Raised Pointer, Bonwill-Apex, And Clutch Assembly in accordance with some embodiments.

FIG. 1B is a detail front perspective view of the upper incisor teeth being located on the Bonwill-apex 118, which location is indicium or fenced by the raised pointer 120 on upper surface of the upper clutch 102. Also illustrated is the anterior tip of the Bonwill-triangle 132. The component parts of the clutch assembly 1000 comprising, the upper clutch 102, the clutch spacer 106, and the lower clutch 102 are rigidly held together with the clutch assembly attachment 112. Also illustrated is the congealing material 116 and the empty clutch attachment 104 hole for attaching the upper recording bow in subsequent procedures.

Figure 1C:
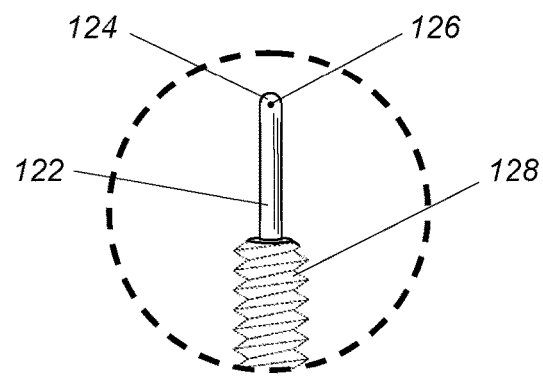
FIG. 1C is a perspective view of Detail Of Engrave Pin, Screw Base, Spherical Tip, And Tip-Center in accordance with some embodiments.

FIG. 1C is a detail front perspective view of the engrave pin 122 including the screw base 128, the spherical tip 124, and the tip-center 126.

Figure 2:
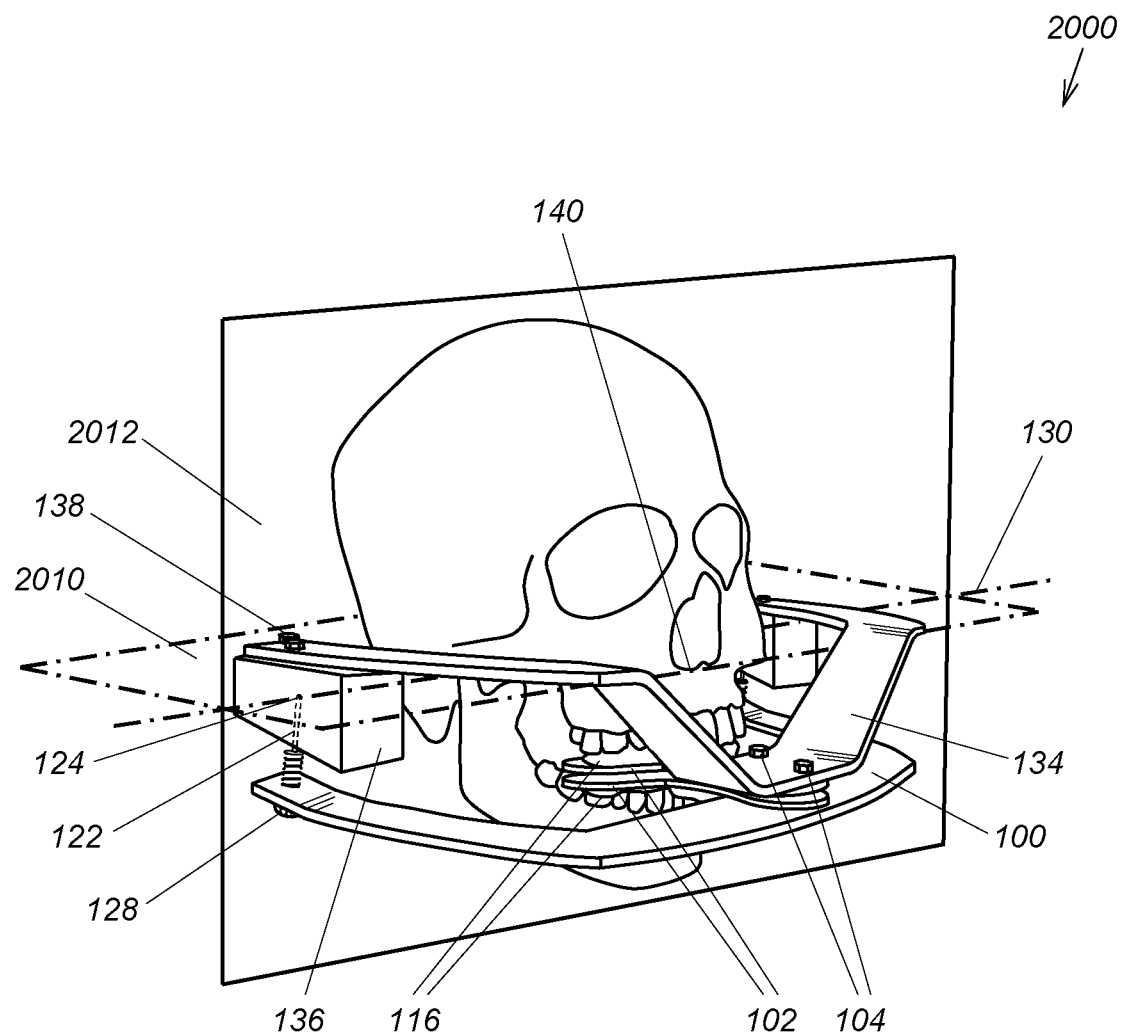
FIG. 2 is a perspective view of Aluminum Physical Recording Instrument With Camper's Plane, And Bonwill-Axis in accordance with some other embodiments.

FIG. 2 is a perspective view. In this illustration, a jaw motion physical recording instrument is generally designated 2000. Accordingly, the physical recording instrument 2000 is for recording the patient's right lateral, left lateral, and protrusive mandibular jaw motion. The physical recording instrument 2000 comprises an upper recording bow 134 and the lower recording bow 100. The upper recording bow 134 is attached to the patient's upper dental arch by the upper clutch 102. The upper clutch 102 is attached to the upper bow 134 using the clutch attachment 104. The upper bow 134 attaches a right side and a left side engravable analog 136. Each of the engravable analogs 136 is attached to the bow 134 by an analog attachment 138, one attachment affixing the right analog 136 and one attachment affixing the left analog 136. The lower recording bow 100 is attached to the patient's lower dental arch by the lower clutch 102. The lower clutch 102 is attached to the lower bow 100 using the clutch attachment 104. The lower bow 100 supports the right side and the left side engrave pins 122, each of the pins 122 having the spherical tip 124 and the adjustable screw bases 128. The clutches 102 are shown with the hardened congealing material 116. The engrave pins 122 are located substantially vertical, under, and perpendicular to the engravable surface of the engravable analog 136. The Bonwill-axis 130 is the intersection of the Bonwill-triangle 132, shown in FIG. 1A, a Camper's plane 2010 and a coronal plane 2012, the coronal plane 2012 being perpendicular to the Camper's plane and the Camper's plane 2010 being theoretically formed from the inferior-Ala 140 of the nose through the Bonwill-axis 130.

Figure 3:
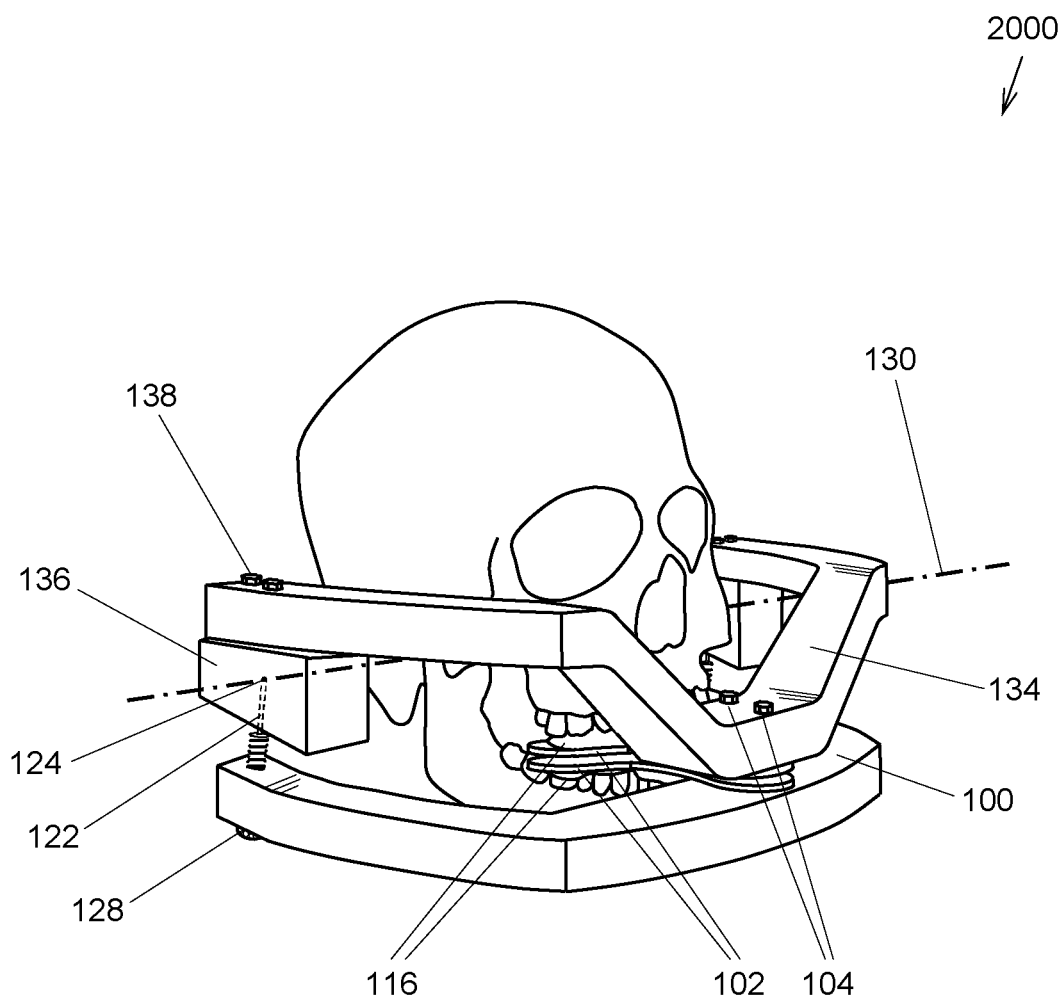
FIG. 3 is a perspective view of Dense-Molded Polystyrene Foam Physical Recording Instrument With Bonwill-Axis in accordance with some other embodiments.

FIG. 3 is a perspective view. In this illustration, the physical recording instrument is generally designated 2000. Accordingly, the physical recording instrument 2000 is for recording the patient's right lateral, left lateral, and protrusive mandibular jaw motion. In some embodiments, the physical recording instrument 2000 comprises the upper polystyrene recording bow 134 and the lower polystyrene recording bow 100, which upper bow 134 and lower bow 100 are disposable for single case use and for teaching recording of mandibular jaw motion in dental schools. The upper recording bow 134 is attached to the patient's upper dental arch by the upper clutch 102. The upper clutch 102 is attached to the upper bow 134 using the clutch attachment 104. The upper bow 134 attaches the engravable analogs 136, each of the analogs 136 being attached to the bow 134 by the analog attachment 138. The lower recording bow 100 is attached to the patient's lower dental arch by the lower clutch 102. The lower clutch 102 is attached to the lower bow 100 using the clutch attachments 104. The lower bow 100 supports the engrave pins 122, each pin 122 having the spherical tip 124, and the adjustable screw base 128. The right and the left side spherical tips 124 are each located on the Bonwill-axis 130. The clutches 102 are shown with the hardened congealing material 116.

Figure 4:
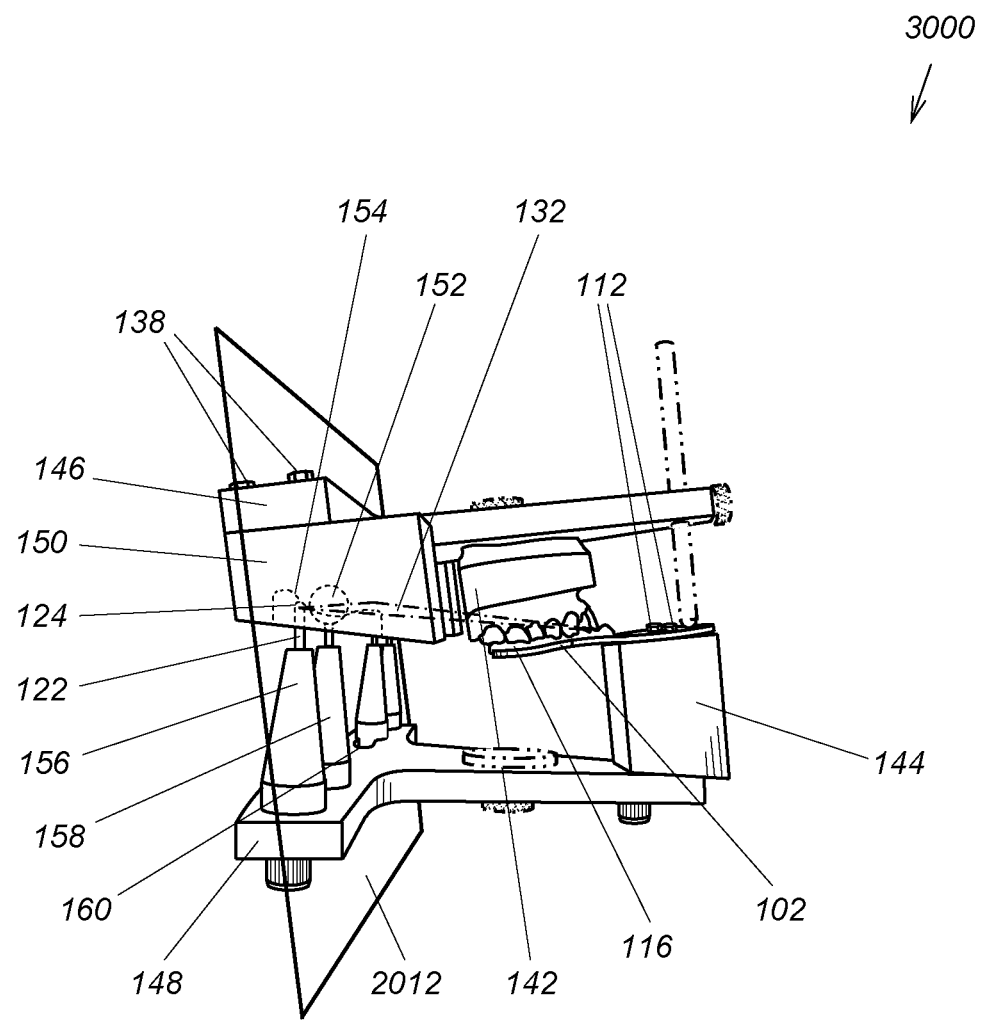
FIG. 4 is a side perspective view of Physical Articulating Instrument With Coronal Plane And Fixed Spatial Relation Model Mounting in accordance with some other embodiments.

FIG. 4 is a side perspective view. In this illustration, a physical articulating instrument is generally designated 3000. Accordingly, the physical articulating instrument 3000 is for usual and customary mounting of the patient's upper and lower dental models 142. The upper clutch 102 is attached in fixed spatial relation to a clutch articulator support 144 with the clutch assembly attachment 112 wherein the upper clutch 102 so attached, indexes and supports the patient's upper model 142 and the model 142 is then plaster mounted to an upper articulating frame 146. The upper clutch 102 is shown with the hardened congealing material 116. Subsequently, the patient's lower model 142, indexed to the upper model 142, is then plaster mounted to a lower articulating frame 148. The coronal plane 2012 is perpendicular to the upper articulating frame 146 and incorporates the Bonwill-axis 130, shown in FIG. 5. In addition to usual and customary component parts comprising incisal guide components and model 142 mounting components, the physical articulating instrument 3000 comprises the upper articulating frame 146 and the lower articulating frame 148. Illustrated is the upper articulating frame 146 attaching a right side and a left side engraved analog 150, each of the analogs 150 being attached to the upper frame 146 by the analog attachments 138. The lower articulating frame 148 supports the right and left side guide pins 122 and a right and a left side rotation-center head 152. Each of the guide pins 122 has the spherical-tip 124, the tips 124 engaging a plurality of curvilinear pathways 154 in the right and the left side engraved analogs 150. Each of the guide pins 122 is supported on the lower articulating frame 148 by a fixed guide pin post 156. Each of the rotation-center hearts 152 is supported on a right side and a left side rotation-center post 158, each post 158 being respectively retained in a right side and a left side rotation-center slot 160. Illustrated is an embodiment wherein the lower articulating frame 148 is substantially parallel to a plane formed by the Bonwill-triangle 132.

Figure 5:
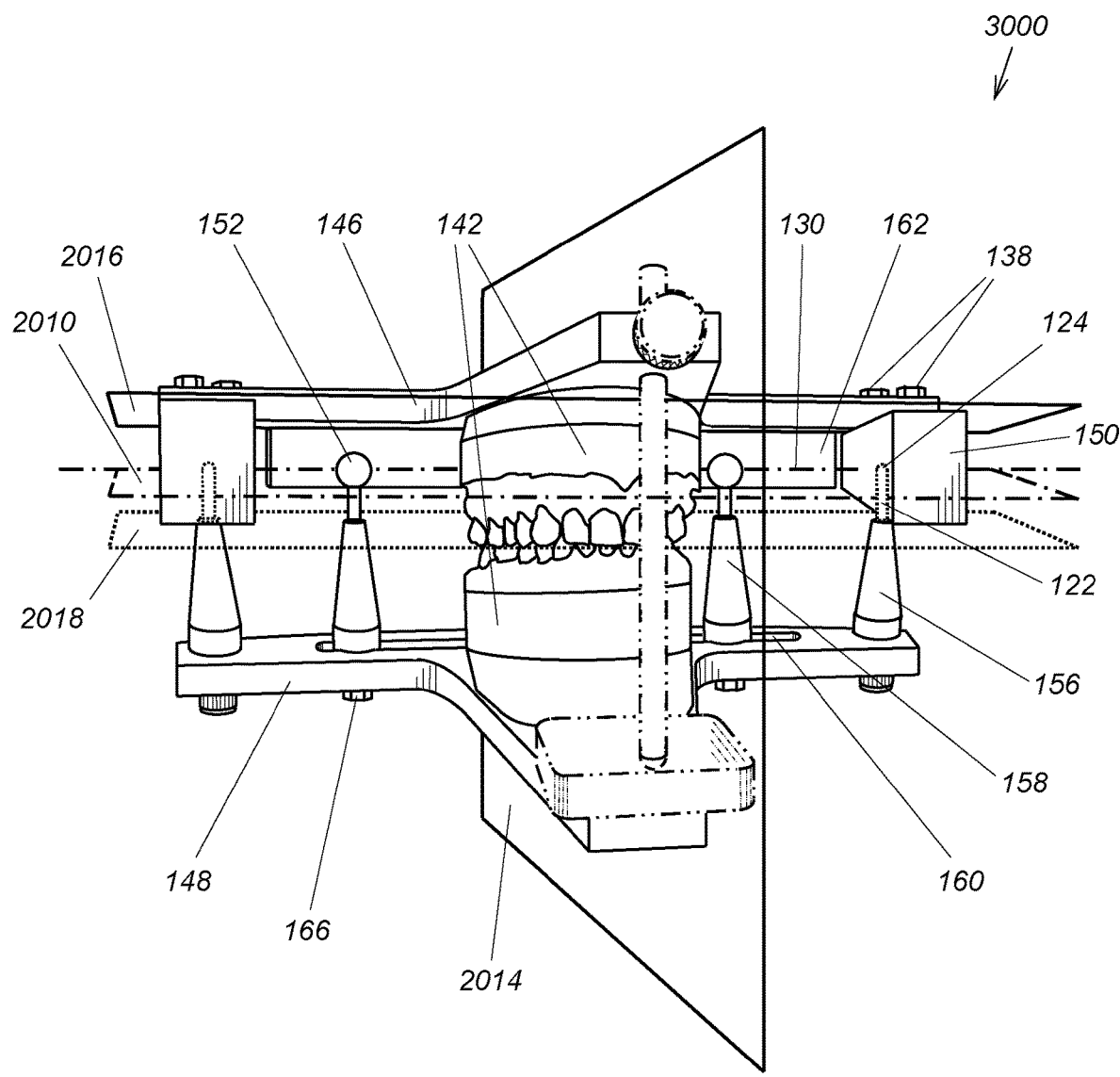
FIG. 5 is a perspective view of Physical Articulating Instrument With Midsagittal, Interfacial, Camper's, And Occlusal Planes in accordance with some other embodiments.

FIG. 5 is a perspective view. In this illustration, the physical articulating instrument is generally designated 3000. Accordingly, the physical articulating instrument 3000 is for simulating the patient's right lateral, left lateral, and protrusive mandibular jaw motion. the physical articulating instrument 3000 has the usual and customary component parts comprising; the model 142 mounting components; the incisal guide components; the upper articulating frame 146; and the lower articulating frame 148. The upper articulating frame 146 attaches the engraved analogs 150, the analog attachments 138, and a right side and a left side fixed rear wall guide 162. The lower articulating frame 148 supports the guide pins 122 and the rotation-center heads 152. Each of the guide pins 122 has the spherical tips 124. The spherical tips 124 and the rotation-center heads 152 align in centric start position on the Bonwill-axis 130. Each of the guide pins 122 are supported on the lower articulating frame 148 by the fixed guide pin post 156. The physical articulating instrument 3000 has a right side and a left side vertical rotation-center 164, shown in FIG. 14, the rotation-center 164 component parts comprising; the rotation-center heads 152; the right side the left side rotation-center post 158; the right and the left side rotation-center slot 160; a right side and a left side rotation-center attachment 166; and the rear wall guide 162. Each of the rotation-center posts 158 are adjusted by a method comprising; loosening the independently slidable-fixable rotation-center attachment 166; moving the rotation-center heads 152 toward or away from a midsagittal plane 2014, within the Bonwill-axis 130; and locating and tightening the rotation-center attachment 166. The rotation-center heads 152, in active engagement with the rear wall guide 162, are for positioning the upper articulating frame 146 and the lower articulating frame 148 in centric start position and for controlling the timing of the right and left sides of the articulating instrument 3000 when the upper articulating frame 146 and the lower articulating frame 148 are moved in right lateral and left lateral excursions. An analog interfacial plane 2016, the Camper's plane 2010, shown in FIG. 2, and an occlusal plane 2018 are all perpendicular to the midsagittal plane 2014 and are in fixed spatial relation to the patient's upper dental arch.

Figure 6:
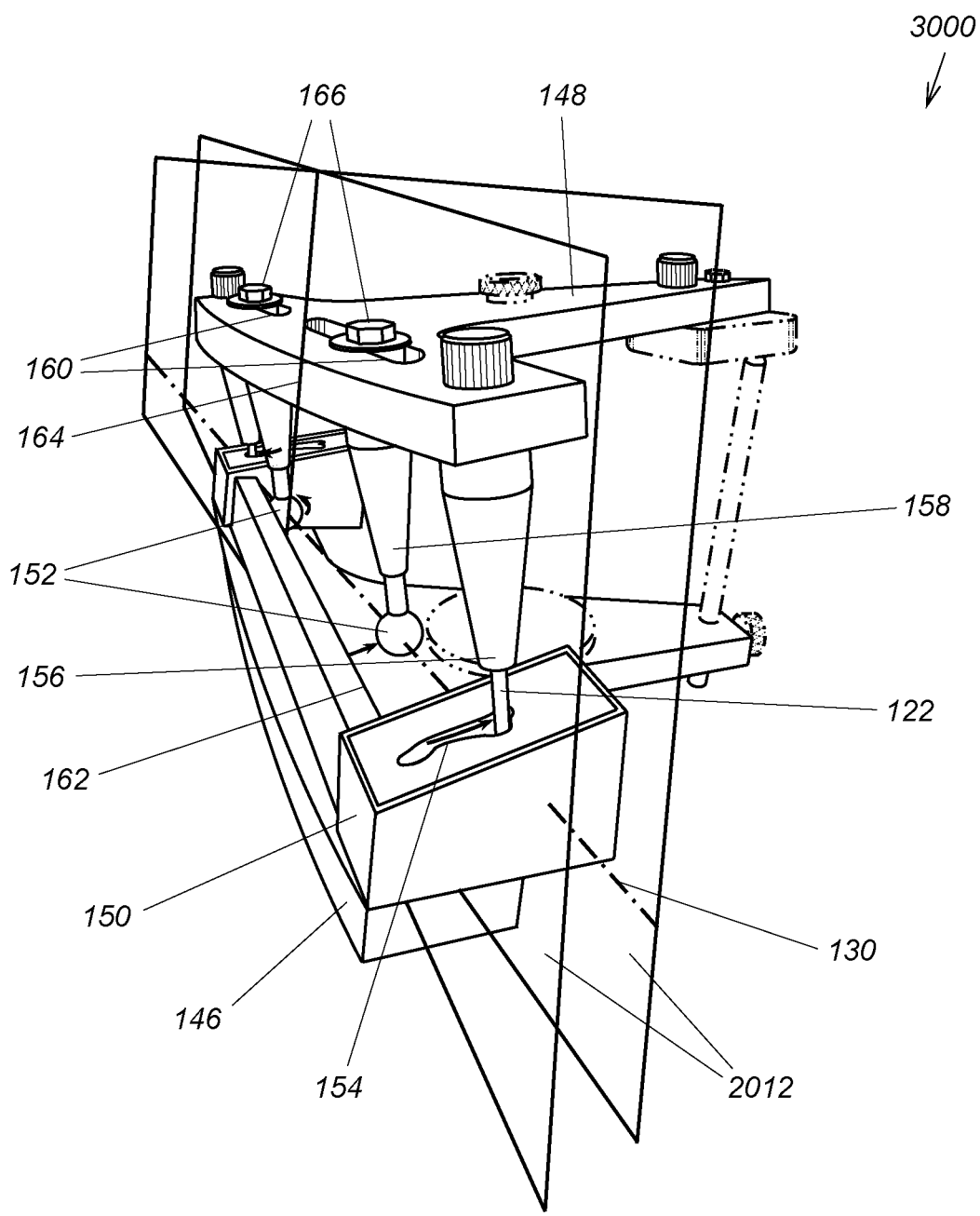
FIG. 6 is a bottom perspective view of Physical Articulating Instrument in Left Lateral Excursion with Resulting Upper and Lower Frame Coronal Plane Intersection in accordance with some other embodiments.

FIG. 6 is a bottom perspective view. In this illustration, the physical articulating instrument is generally designated 3000. Shown is the upper articulating frame 146 actively engaging the lower articulating frame 148, performing a right lateral excursion. The upper articulating frame 146 has the engraved analogs 150 and the fixed rear wall guide 162. The lower articulating frame 148 has the guide pins 122 and the rotation-center heads 152, shown in FIG. 14. Each of the guide pins 122 and the rotation-center heads 152 are aligned on the lower frame Bonwill-axis 130, the axis having shifted in accord with the right lateral excursion. Each of the guide pins 122 are supported on the lower articulating frame 148 by the fixed guide pin post 156. Each of the rotation-center heads 152 are supported on the lower articulating frame 148 by the independently slidable-fixable rotation-center post 158, each of the rotation-center posts 158 being retained and fixed in the rotation-center slot 160 with the rotation-center attachment 166. In this illustration, the upper articulating frame 146 is positioned in the patient's extreme right lateral excursion. In this lateral position, the guide pins are divergent; the left side guide pin 122 is full forward in its engraved analog 150 and the right side guide pin 122 is full rearward in its engraved analog 150. The right side rotation-center head 152 has been slowly moved from an a midsagittal position, toward the right side guide pin 122 and fixed when it contacts the rear wall guide 162. When both of the right and left side rotation-center heads 152 have been so adjusted and fixed, then the rotation-center heads 152 are in position to effectively control the timing of the right and left side guide pins 122 when the instrument 3000 is moved in right lateral and left lateral excursions. During a lateral excursion; the active rotation-center head 152 remains in contact with the rear wall guide 162, urging the guide pins 122 to rotate around the active head 152, the guide pins 122 moving in their respective engraved analog pathways 154; the guide pin 122 on the side of the active head 152 moving rearward in its pathway 154; and the guide pin 122 on the opposite side moving forward in its pathway 154. The coronal plane 2012 is perpendicular to the upper articulating frame 146 and incorporates the Bonwill-axis 130 on the lower articulating frame 148. Accordingly, when the physical articulating instrument 3000 is moved into a lateral excursion, the coronal plane 2012 on the upper articulating frame 146 intersects the coronal plane 2012 on the lower articulating frame 148 at the vertical rotation-center 164.

Figure 7:
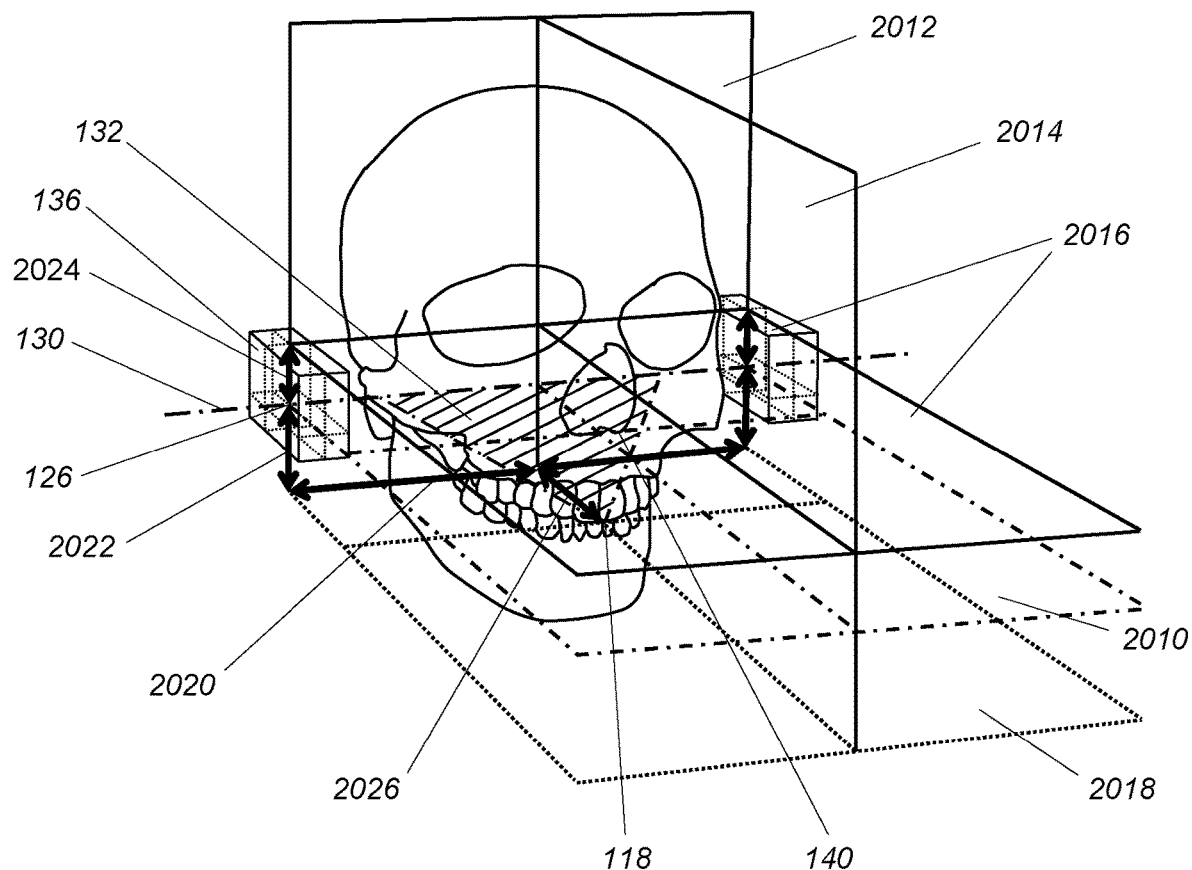
FIG. 7 is a perspective view of Real-Time Jaw Motion Related To Bonwill-Triangle, Bonwill-Axis, Planes, Vectors, And Engravable Analogs in accordance with some other embodiments.

FIG. 7 is a perspective view. In this illustration, the Bonwill-triangle 132, the Bonwill-axis 130, the associated planes, a plurality of fixed vectors 168, and the engravable analogs 136 are shown in relation to each other. The fixed vectors 168 are each separately identified, each vector 168 connecting two specified XYZ coordinate points, and each vector 168 being in effect descended from the Bonwill-apex 118. The coronal plane 2012 incorporates the Bonwill-axis 130, the tip-centers 126, a right side and a left side posterior Bonwill-apex vector 2020, and a right side and a left side lower tip-center vector 2022, and a right side and a left side upper tip-center vector 2024. The midsagittal plane 2014 incorporates the Bonwill-apex 118, an anterior Bonwill-apex vector 2026 and is perpendicular to all of the other four planes. The analog interfacial plane 2016, being the uppermost horizontal plane, incorporates the mounting surfaces of the engravable analogs 136, the mounting surfaces of the engraved analogs 150, and the opposing mounting surfaces, which surfaces are the bottom or underside surfaces of the upper recording bow 134, and respectively, the bottom or underside surfaces of upper articulating frame 146, all shown in FIG. 13A. The Camper's plane 2010, being the middle horizontal plane, is theoretically formed from the inferior-Ala 140 of the nose to the Bonwill-axis 130. The Camper's plane 2010 and the coronal plane 2012, being perpendicular to each other, incorporate the Bonwill-axis 130 and the tip-centers 126. The occlusal plane 2018, being the lowermost horizontal plane, incorporates the anterior Bonwill-apex vector 2026 and the posterior Bonwill-apex vectors 2020 and is an extension of the top surface or indexing surface of the upper clutch 102, shown in FIG. 12. With the exception of the anterior Bonwill-apex vector 2026, all fixed vectors 168 are incorporated in the coronal plane 2012. Fixed vectors 168 connect two coordinate points on the present apparatus and have fixed lengths in fixed spatial relation to the occlusal plane 2018 and the patient's upper dental arch. Fixed vectors 168 enable a software program writer to generate virtual systems. Fixed vectors 168 represent fixed spatial relations used to write the computerized program for virtual mandibular jaw motions as the motions are generated and simulated according to tip-center 126 motion in the engravable analogs 136.

Figure 8:
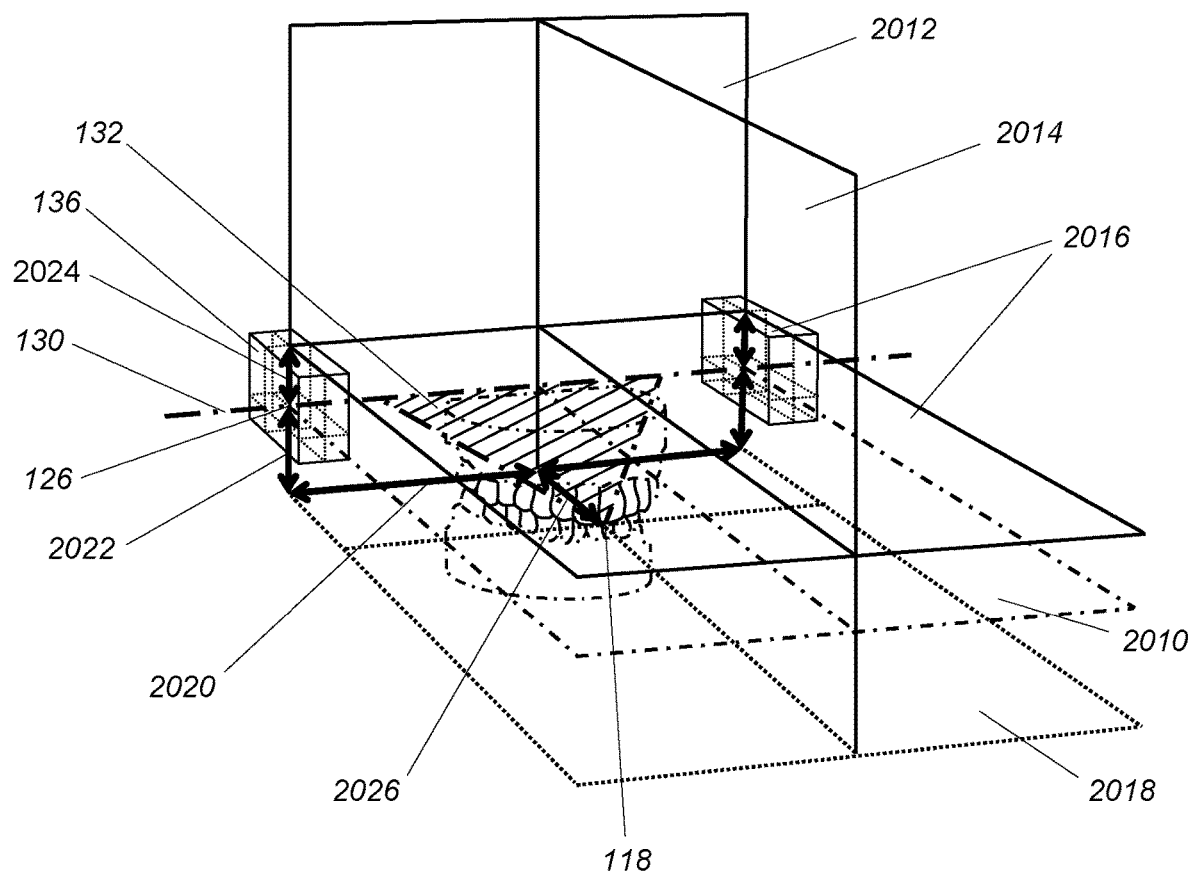
FIG. 8 is a perspective view of Static Patient Biting Surfaces Related To Bonwill-triangle, Bonwill-Axis, Planes, Vectors, and Engravable Analogs in accordance with some other embodiments.

FIG. 8 is a perspective view. In this illustration, the Bonwill-triangle 132, the Bonwill-axis 130, the associated planes, the fixed vectors, and the engravable analogs 136 are shown in relation to each other. The fixed vectors 168 are each generated by connecting two specified XYZ coordinate points and each vector 168 is, in effect, descended from the. Bonwill-apex 118. The coronal plane 2012 incorporates the Bonwill-axis 130, the tip-centers 126, the right and left side posterior Bonwill-apex vectors 2020, the right and left side lower tip-center vectors 2022, and the right and left side upper tip-center vectors 2024. The midsagittal plane 2014 incorporates the anterior Bonwill-apex vector 2026 and is perpendicular to all of the other four planes. The analog interfacial plane 2016, being the uppermost horizontal plane, incorporates the mounting surfaces of the engravable analogs 136, the mounting surfaces of the engraved analogs 150, and the opposing mounting surfaces, which surfaces are the bottom or underside surfaces of the upper recording bow 134, and respectively, the bottom or underside surfaces of upper articulating frame 146, all shown in FIG. 13A. The Camper's plane 2010, being the middle horizontal plane, is theoretically formed from the inferior-Ala 140 of the nose, shown in FIG. 7, to the Bonwill-axis 130. The Camper's plane 2010 and the coronal plane 2012, being perpendicular to each other, incorporate the Bonwill-axis 130 and the tip-centers 126. The occlusal plane 2018, being the lowermost horizontal plane, incorporates the anterior Bonwill-apex vector 2026 and the posterior Bonwill-apex vectors 2020 and is an extension of the top surface or indexing surface of the upper clutch 102, shown in FIG. 12. With the exception of the anterior Bonwill-apex vector 2026, all fixed vectors 168 are incorporated in the coronal plane 2012. Fixed vectors 168 connect two coordinate points on the present apparatus and have fixed lengths in fixed spatial relation to the occlusal plane 2018 and the patient's upper dental arch. Fixed vectors 168 enable a software program writer to generate virtual systems. Fixed vectors 168 represent fixed spatial relations used to write the computerized program for virtual mandibular jaw motions as they are generated and simulated according to tip-center 126 motion in the engravable analogs 136.

Figure 9:
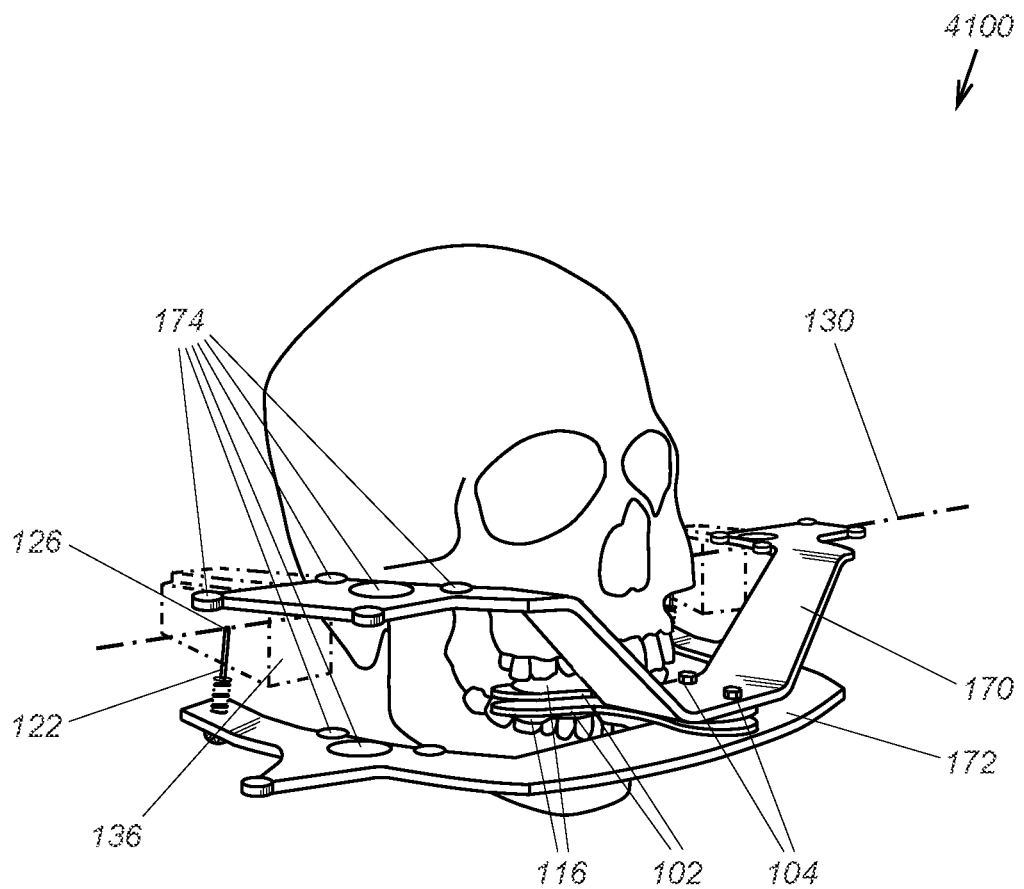
FIG. 9 is a perspective view of Digital Recording System With Sensors In Bows in accordance with some other embodiments.

FIG. 9 is a perspective view. In this illustration, the digital recording bow system is generally designated 4100.

Accordingly, the digital recording bow system 4100 is for digitally recording the patient's right lateral, left lateral, and protrusive mandibular jaw motion. In some embodiments, the digital recording bow system 4100 comprises a digital upper recording bow 170 and a digital lower recording bow 172. The digital upper recording bow 170 is attached to the patient's upper dental arch by the upper clutch 102, the clutch 102 being attached to the bow 170 using the clutch attachment 104. The digital upper bow 170 has at least two sensors 174 for recording real-time motion-tracking signals and generating polygon mesh models of the envelopes-of-motion or virtual pathways 154, the pathways 154 being shown in FIG. 14, in a right and a left side virtual engravable analog 136. The digital lower recording bow 172 is attached to the patient's lower dental arch by the lower clutch 102, the clutch 102 being attached to the bow 172 using the clutch attachment 104. The digital lower bow 172 has the sensors 174 for recording real-time motion-tracking signals represented as the right and left side virtual engrave pins 122. Each engrave pin 122 has the virtual tip-center 126. The virtual tip-centers 126 are, when in centric start position, symmetrically aligned and centered in fixed spatial relation on the Bonwill-axis 130. The clutches are respectively indexed to the patient's upper and lower dental arches with the congealing material 116. The clutch assembly 1000, shown in FIG. 1A, is symmetrically positioned on the patient's head using the engrave pin 122 locators or other indicium components. The sensors 174, computer, and software, according to some embodiments, interact with each other to track and convert real-time motion into the right and left side polygon mesh envelopes-of-motion or virtual pathways 154 in the virtual engravable analogs 136 by employing technologies selected from the groups comprising; ultrasound; electromagnetic; microwave; infrared; radiography; magnetic resonance imaging; and other known and future compatible technologies. In some embodiments, the sensors 174 are respectively attached to or are part of the upper clutch 102, the clutch 102 having the virtual upper recording bow 134 with the virtual engravable analogs 136, and the lower clutch 102 having the virtual lower recording bow 100 with the virtual engrave pins 122, each pin 122 having the virtual tip-center 126. The virtual component parts of the digital recording bow system 4100 enable the computerized program to recognize, locate, and use the virtual tip-centers 126 to digitize and otherwise form the virtual pathways 154 in the virtual engravable analogs 136. In some embodiments, after the upper and lower clutches 102 have been respectively fixed to the teeth, the patient is instructed to orient their mandibular jaw in a position selected from the orientations consisting of; centric relation; and centric occlusion. When the patient's jaw is positioned in one of these orientations, a signal is activated to digitally record that orientation as the centric start position.

Figure 10:
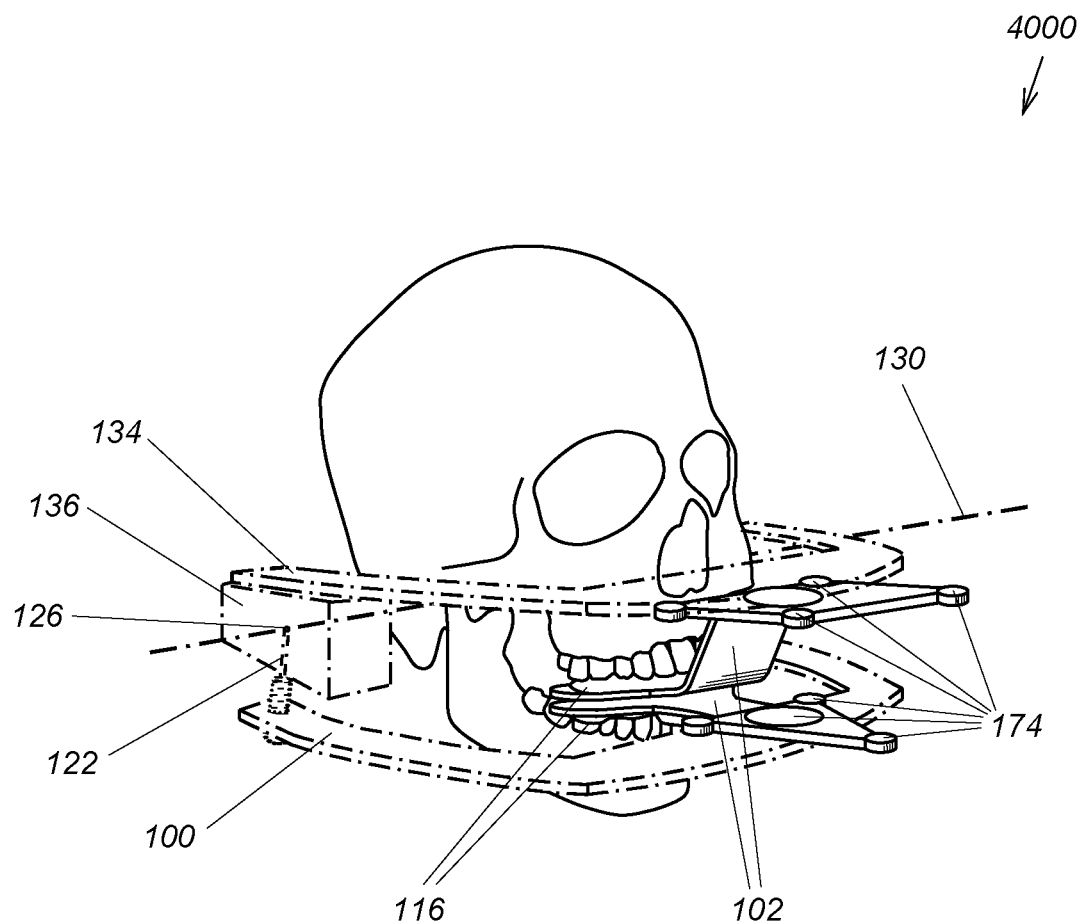
FIG. 10 is a perspective view of Digital Recording System With Sensors In Clutches in accordance with some other embodiments.

FIG. 10 is a perspective view. In this illustration, the digital recording system is generally designated 4000. Accordingly, the digital recording system 4000 is for digitally recording the patient's right lateral, left lateral, and protrusive mandibular jaw motion. In some embodiments, the digital recording system 4000 comprises the upper and lower clutches 102. The upper clutch 102 has at least one of the sensors 174 for recording real-time motion-tracking signals respectively represented as the virtual upper recording bow 134 having the right and left side virtual engravable analogs 136. The lower clutch 102 has at least one of the sensors 174 for recording real-time motion-tracking signals respectively represented as the virtual lower recording bow 100 having the right and left side virtual engrave pins 122. Each pin 122 has the virtual tip-center 126. The virtual tip-centers 126 are, when in centric start position, symmetrically aligned and centered in fixed spatial relation on the Bonwill-axis 130. The clutches 102 are indexed to the patient's dental arches with the congealing material 116. The clutch assembly 1000, shown in FIG. 1A, is symmetrically positioned on the patient's head using the engrave pin 122 locators or other indicium components. The sensors 174, computer, and software, according to some embodiments, interact with each other to track and convert real-time motion into the right and left side polygon mesh envelopes-of-motion or virtual pathways 154, the pathways 154 being shown in FIG. 14, by employing technologies selected from the groups comprising; ultrasound; electromagnetic; microwave; infrared; radiography; magnetic resonance imaging; and other known and future compatible technologies. In some embodiments, the sensors 174 are respectively attached to or are part of the upper clutch 102, the clutch 102 having the virtual upper recording bow 134 with the virtual engravable analogs 136, and the lower clutch 102 having the virtual lower recording bow 100 with the virtual engrave pins 122, each pin 122 having the virtual tip-center 126. The virtual component parts of the digital recording system 4000 enable the computerized program to recognize, locate, and use the virtual tip-centers 126 to digitize and otherwise form the virtual pathways 154 in the virtual engravable analogs 136. In some embodiments, after the upper and lower clutches 102 have been respectively fixed to the teeth, the patient is instructed to orient their mandibular jaw in a position selected from the orientations consisting of; centric relation; and centric occlusion. When the patient's jaw is positioned in one of these orientations, a signal is activated to digitally record that orientation as the centric start position.

Figure 11A:
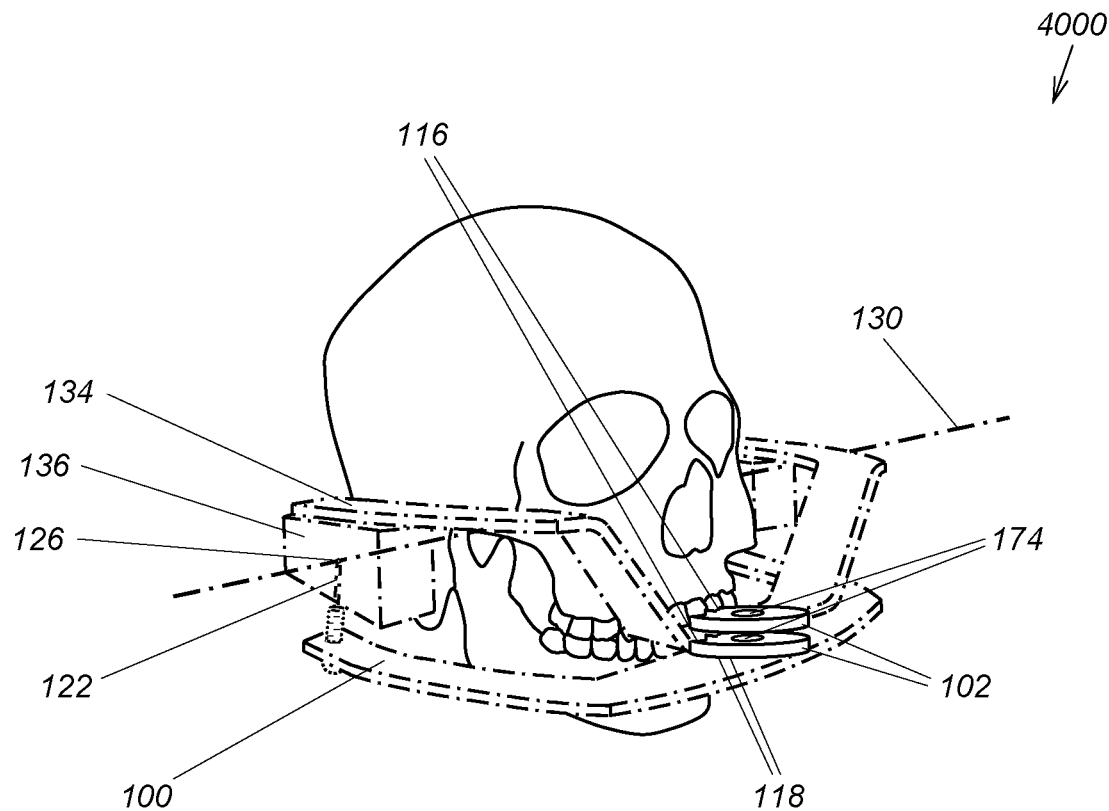
FIG. 11A is a perspective view of Digital Recording System With Anterior Teeth Facial Surface Adhered Sensors In Clutches in accordance with some other embodiments.

FIG. 11A is a perspective view. In this illustration, the digital recording system is generally designated 4000. Accordingly, the digital recording system 4000 is for digitally recording the patient's right lateral, left lateral, and protrusive mandibular jaw motion. In these embodiments, the digital recording system 4000 comprises; an upper component having at least one of the sensors 174 for recording real-time motion-tracking signals respectively represented as the virtual upper recording bow 134, the bow 134 having the right and left side virtual engravable analogs 136; and a lower component having at least one of the sensors 174 for recording real-time motion-tracking signals respectively represented as the virtual lower recording bow 100, the bow 100 having the right and left side virtual engrave pins 122. Each pin 122 has the virtual tip-center 126. The virtual tip-centers 126 are, when in centric start position, symmetrically aligned and centered in fixed spatial relation on the Bonwill-axis 130. The upper and lower sensor 174 components are, or are embedded in, the clutches 102. The upper and lower sensor 174 components are provisionally adhered to the facial surfaces of the patient's anterior teeth with the congealing material 116. In some embodiments, the clutch assembly 1000, shown in FIG. 1A, is symmetrically positioned on the patient's head using the attached engrave pin 122 locators. Then the conjoined clutches 102, having the soft congealing material 116, are positioned on the facial surfaces of the patient's teeth, the upper incisor teeth being located on the Bonwill-apex 118 indicium. This positioning is done with the patient maintaining their teeth in centric occlusion or centric relation. When the congealing material has set, the sensor components are separated and the patient is instructed to execute right lateral, left lateral, and protrusive excursions. The sensors 174, computer, and software, interact with each other to track and convert real-time motion into the right and left side polygon mesh envelopes-of-motion or virtual pathways 154, the pathways 154 being shown in FIG. 14. The sensors 174, computer, and software, interact employing technologies selected from the groups comprising; ultrasound; electromagnetic; microwave; infrared; radiography; magnetic resonance imaging; and other known and future compatible technologies. The virtual component parts of the digital recording system 4000 enable the computerized program to recognize, locate, and use the virtual tip-centers 126 to digitize and otherwise form the virtual pathways 154 in the virtual engravable analogs 136.

Figure 11B:
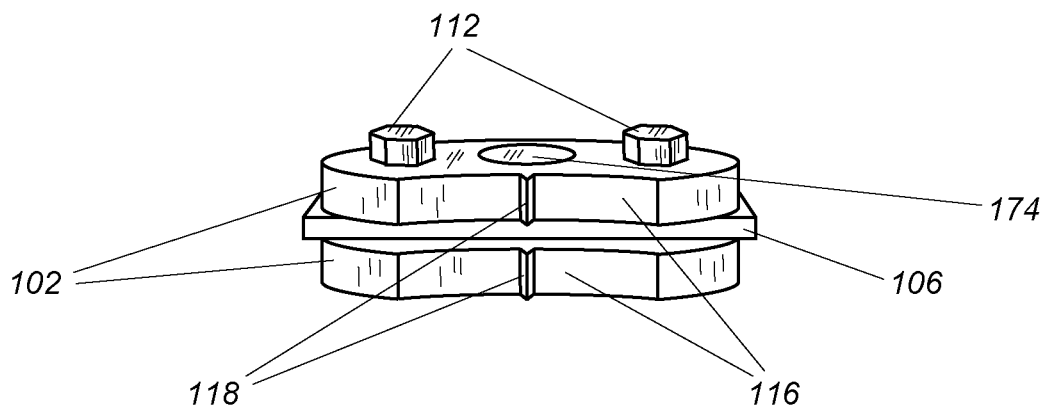
FIG. 11B is a perspective view of Digital Recording System With Adhering Mini Sensors in accordance with some other embodiments.

FIG. 11B is a detail front perspective view of the digital recording system 4000 comprising; the upper component having at least one of the sensors 174 for recording real-time motion-tracking signals; and the lower component having at least one of the sensors 174 for recording real-time motion-tracking signals. In these embodiments, the upper and lower sensor 174 components are, or are embedded in, the clutches 102, which sensor 174 components are provisionally adhered to the facial surfaces of the patient's anterior teeth with the congealing material 116. In some embodiments, the clutch assembly 1000, shown in FIG. 1A, is symmetrically positioned on the patient's head using the attached engrave pin 122 locators. Then the conjoined clutches 102, having the soft congealing material 116, are positioned on the facial surfaces of the patient's teeth, the upper incisor teeth being located on the Bonwill-apex 118 indicium. This positioning is done with the patient maintaining their teeth in centric occlusion or centric relation. When the congealing material has set, the clutch assembly attachment 112 and the clutch spacer 106 are removed. The sensor components being now separated, the patient is instructed to execute excursions of the jaw. In some other embodiments, after the upper and lower clutches 102 have been respectively fixed to the facial surfaces of the teeth, the patient is instructed to orient their mandibular jaw in a position selected from the orientations consisting of; centric relation; and centric occlusion. When the patient's jaw is positioned in one of these orientations, a signal is activated to digitally record that orientation as the centric start position.

Figure 12:
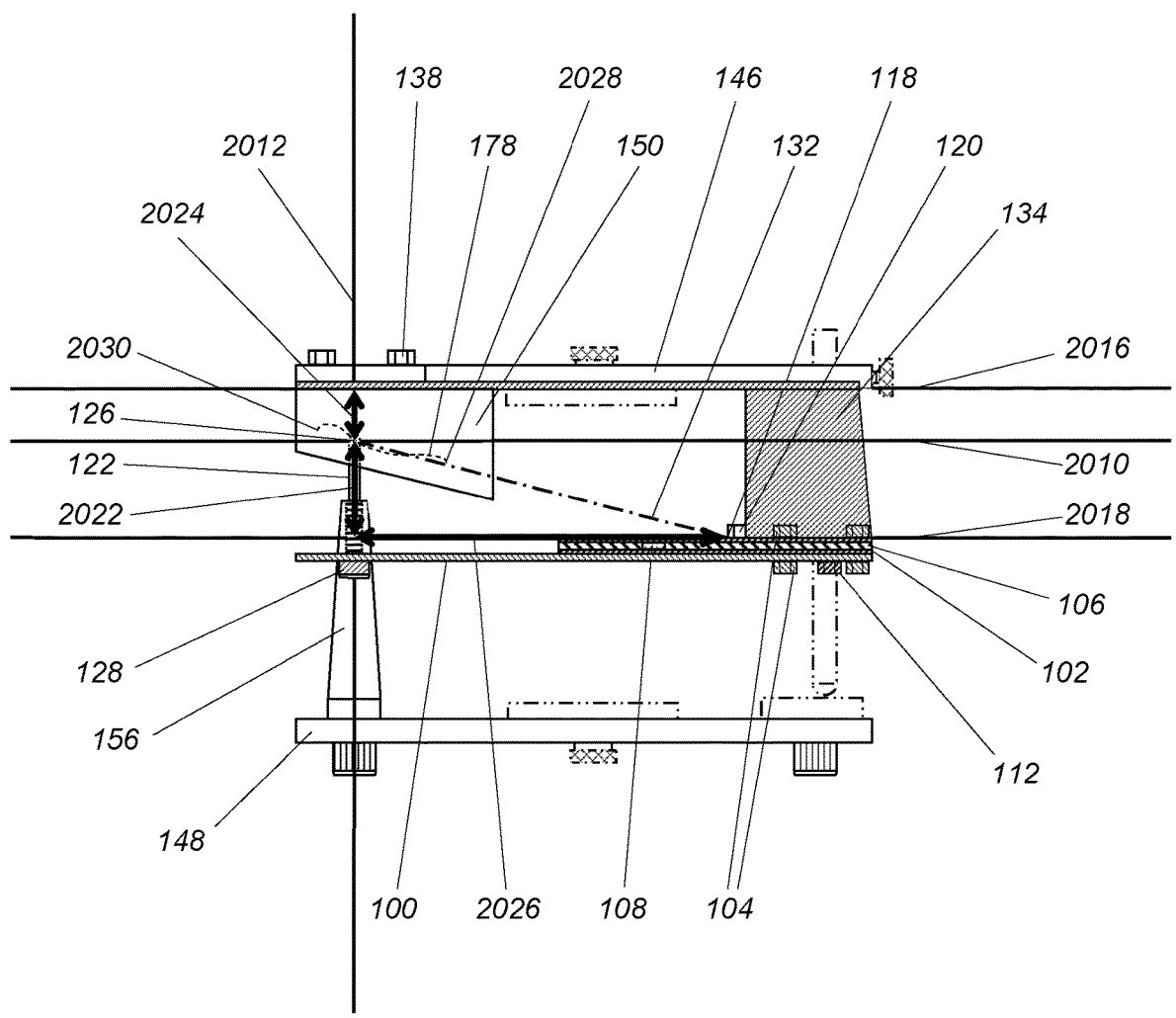
FIG. 12 is a schematic of a combined apparatus illustrating Side Plan View Of Superimposed Clutches, Recording Bows, Articulator, Bonwill-Triangle, Bonwill-Apex, Planes, and Vectors in accordance with some other embodiments.

FIG. 12 is a side schematic plan view of the clutch assembly 1000, the physical recording instrument 2000, and the physical articulating instrument 3000, wherein the devices and some component parts are superimposed. To identify and differentiate clutch assembly 1000 and physical recording instrument 2000 component parts, these are shown in various hash marks. In this illustration, the component parts, the Bonwill-triangle 132, the Bonwill-apex 118, four of the planes, and three of the vectors are shown in fixed spatial relation to one another. The Bonwill-apex 118 is fenced with the raised pointer 120 on upper surface of the upper clutch 102. Illustrated are the clutches 102, the upper recording bow 134, the lower recording bow 100, the clutch attachments 104, the central bearing point 108, the clutch spacer 106, and the clutch assembly attachment 112. The upper articulating frame 146 has a pair of the analog attachments 138, each attachment 138 for attaching the right and left side engraved analogs 150. The lower articulating frame 148 has the right side and left side guide pins 122, each pin 122 having the tip-center 126. The guide pins 122 are supported on the lower articulating frame 148 by the fixed guide pin post 156. The physical recording instrument 2000 comprises; the upper recording bow 134; and the lower recording bow 100. The upper recording bow 134 is attached to the patient's upper dental arch by the upper clutch 102. The upper clutch 102 is attached to the upper recording bow 134 using the clutch attachment 104. The upper recording bow 134 has the right and left side engravable analogs 136, shown in FIG. 2, each of the analogs 136 being attached to the bow 134 by the analog attachment 138. The engravable surfaces of the engravable analogs 136 are substantially parallel to the plain of the Bonwill-triangle 132. The lower recording bow 100 is attached to patient's lower dental arch by the lower clutch 102. The lower clutch 102 is attachable to the lower recording bow 100 using the clutch attachment 104. The lower recording bow 100 has the right and left side engrave pins 122, each of the pins 122 having the tip-center 126 and the adjustable screw base 128. The interfacial plane 2016, the Camper's plane 2010, and the occlusal plane 2018 are all perpendicular to the midsagittal plane 2014, shown in FIG. 7, and are all in fixed spatial relation to the patient's upper dental arch. Also illustrated are some fixed vectors 168. A vector is a line connecting two specified XYZ coordinate points having a particular length and direction. Vectors are divided into two groups; the seven fixed vectors 168; and a pair of variable vectors 176, shown in FIG. 14, each variable vector 176 being separately identified. The fixed vectors 168 and the variable vectors 176 enable software program writers to generate the digital recording system 4000, shown in FIG. 10, which system 4000 is for converting real-time digital motion-tracking and static patient-generated biting surfaces data into mandibular jaw motion data, as well as for generating a virtual articulating instrument 5000, same as shown in FIG. 6 in a virtual environment, for simulating virtual mandibular jaw motion in a dental CAD/CAM restorative or orthodontic treatment device fabricating system.

Fixed vectors 168 connect two coordinate points that are on or related to the present apparatus and therefore fixed vectors 168 have fixed lengths and directions. Illustrated fixed vectors 168 are; the anterior Bonwill-apex vector 2026 having a fixed length of 85 millimeters or between 76 and 111 millimeters; the right and left side lower tip-center vectors 2022 having a fixed length of 28 millimeters or between 23 and 36 millimeters; and the right and left side upper tip-center vectors 2024 having a fixed length of 16 millimeters or between 15 and 31 millimeters. The right and left side posterior Bonwill-apex vectors 2020, shown in FIG. 13A, have fixed lengths of 111 millimeters or between 100 and 122 millimeters. The left side fixed vectors 168 are symmetrical with the right side fixed vectors 168. Fixed vectors 168 represent fixed spatial relations in a physical and a virtual environment.

The variable vectors 176 connect two coordinate points determined by the patient's mandibular jaw motion and therefore variable vectors 176 have different starting points, ending points, and directions. To locate variable vectors, a plurality of pathlines 178 is digitally generated from the curvilinear pattern of motion of the right and left side tip-centers 126 as the patient executes right lateral and left lateral mandibular jaw motion or tip-center 126 motion. A variable vector 176 connects the anterior pathline endpoint in one virtual engraved analog 150 and the posterior pathline endpoint in the opposite side virtual engraved analog 150. Illustrated selected pathlines in the right side engraved analog are a right anterior pathline endpoint 2028 and a right posterior pathline endpoint 2030. Accordingly, selected pathlines in the left side engraved analog are a left anterior pathline endpoint 2032 and left posterior pathline endpoint 2034, both shown in FIG. 14. By identifying the variable vector 176 that connects the anterior pathline endpoint or XYZ axis coordinate point in one of the virtual engraved analogs 150 and the posterior pathline endpoint or XYZ axis coordinate point in the opposite virtual engraved analog 150, the software program writer locates the intersection of the vector or XYZ axis coordinate point on the coronal plane 2012 and thereby locates the respective vertical rotation-center 164, shown in FIG. 14.

Figure 13A:
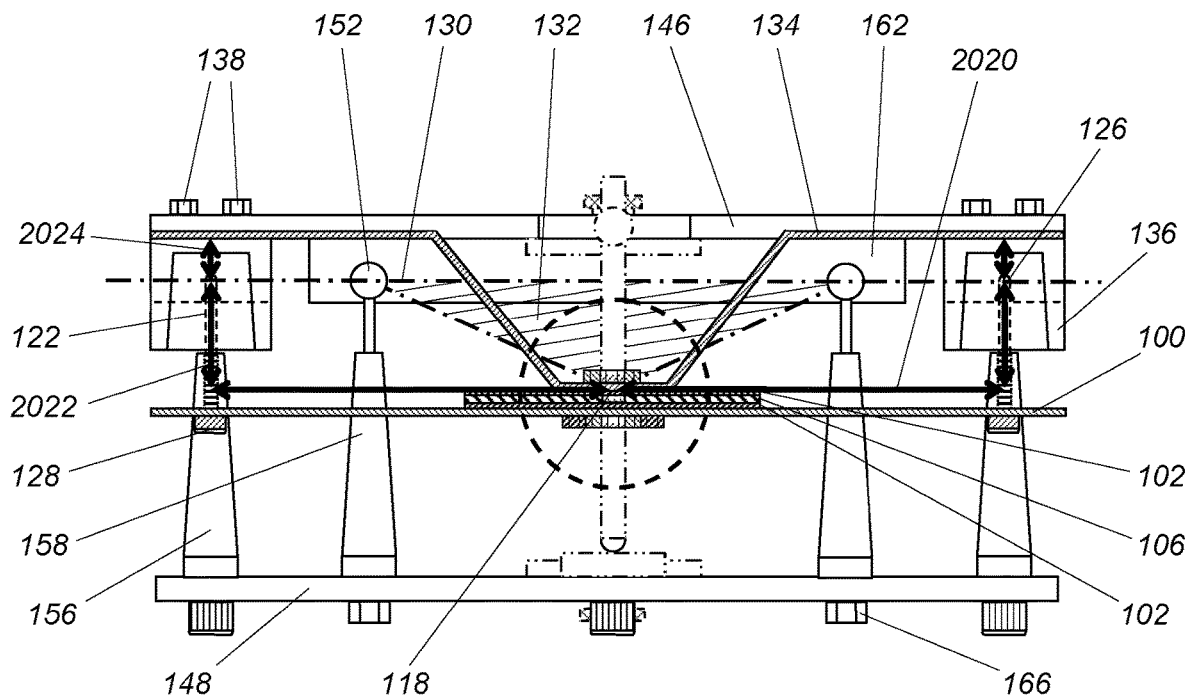
FIG. 13A is a schematic of a combined apparatus illustrating Front Plan View Of Superimposed Clutches, Recording Bows, Articulator, Bonwill-Triangle, Bonwill-Apex, Planes, and Vectors in accordance with some other embodiments.

FIG. 13A is a front schematic plan view of the clutch assembly 1000, the physical recording instrument 2000, and the physical articulating instrument 3000, wherein the devices and some component parts are superimposed. To identify and differentiate clutch assembly 1000 and physical recording instrument 2000 component parts, these are shown in various hash marks. In this illustration, the component parts, the Bonwill-triangle 132, the Bonwill-apex 118, the Bonwill-axis 130, and six of the vectors are shown in fixed spatial relation to one another and the patient's upper dental arch or the indexing surface of the upper clutch 102. The upper articulating frame 146 has a pair of the analog attachments 138, each attachment 138 for attaching the right and left side engraved analogs 150, shown in FIG. 6. The lower articulating frame 148 has the right side and left side guide pins 122, each pin 122 having the tip-center 126, each tip-center 126 being located on the Bonwill-axis 130. The guide pins 122 are supported on the lower articulating frame 148 by the fixed guide pin post 156. The rotation-center heads 152 in combination with the rear wall guide 162 are for positioning the upper articulating frame 146 and lower articulating frame 148 in centric start position and for controlling the timing of the right and left sides of the physical articulating instrument 2000 when it is moved in right lateral and left lateral excursions. Each of the right and left side rotation-center heads 152 is supported on the lower frame by a rotation-center post 158, each post 158 being attached with an independently slidable-fixable rotation-center attachment 166. The physical recording instrument 2000 comprises; the upper recording bow 134; and the lower recording bow 100. The upper recording bow 134 is attached to the patient's upper dental arch by the upper clutch 102. The upper clutch 102 is attached to the upper recording bow 134 using the clutch attachment 104 shown in FIG. 13B and FIG. 14. The upper recording bow 134 has the right and left side engravable analogs 136, each of the analogs 136 being attached to the bow 134 by the analog attachment 138. The engravable surfaces of the engravable analogs 136 are substantially parallel to the plain of the Bonwill-triangle 132. The clutch spacer 106 is sandwiched between the upper and lower clutches 102. The lower recording bow 100 is attached to patient's lower dental arch by the lower clutch 102. The lower clutch 102 is attachable to the lower recording bow 100 using the clutch attachment 104. The lower recording bow 100 has the right and left side engrave pins 122, each of the pins 122 having the tip-center 126 and the adjustable screw base 128. Also illustrated are some vectors. A vector, according to some embodiments, is a line connecting two specified coordinate points having a particular length and direction. Illustrated fixed vectors 168 are; the right and left side posterior Bonwill-apex vectors 2020; the right and left side lower tip-center vectors 2022; and the right and left side upper tip-center vectors 2024. Also illustrated is the Bonwill-triangle 132 and the Bonwill-axis 130.

Figure 13B:
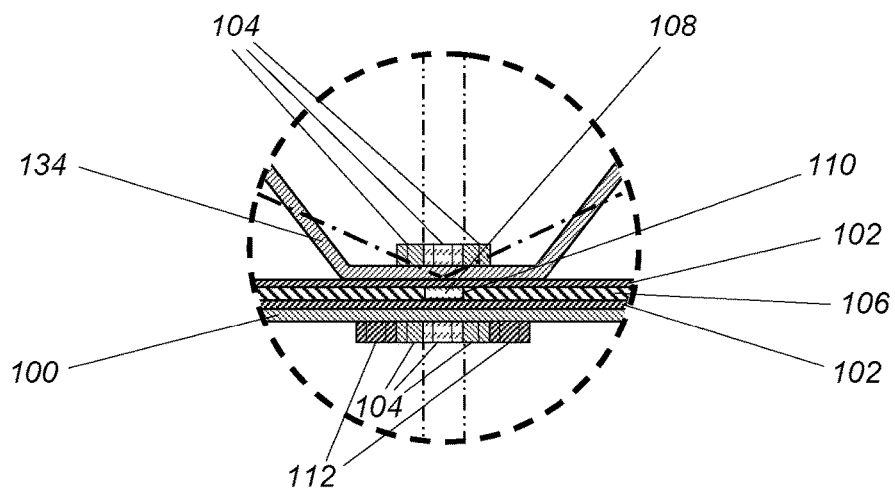
FIG. 13B is a schematic of a combined apparatus illustrating Detail Of Front Plan View Of Superimposed Clutches, Recording Bows, And Articulator in accordance with the foregoing embodiments.

FIG. 13B is a detail front schematic plan view of the clutch assembly 1000, the physical recording instrument 2000, and the physical articulating instrument 3000, wherein the component parts are superimposed. Illustrated is an enlarged segment view of the upper recording bow 134, the lower recording bow 100, and some of the interrelated component parts in fixed spatial relation to one another. To identify and differentiate clutch assembly 1000 and physical recording instrument 2000 component parts, these are shown in various hash marks. In this illustration, the component parts are numbered. The clutch assembly 1000 comprises the upper and lower clutches 102. In some embodiments, the lower clutch 102 is attachable to the lower recording bow 100 using the clutch attachment 104. The clutch spacer 106 is positioned over the central bearing point 108 on one of the clutches 102, the central bearing point 108 projection fitting the spacer hole 110 in the clutch spacer 106. The clutch spacer 106 is sandwiched between the upper and lower clutches 102. The upper clutch 102, the clutch spacer 106, and the lower clutch 102 attached to the lower recording bow 100, are all rigidly joined together with the clutch assembly attachment 112.

Figure 14:
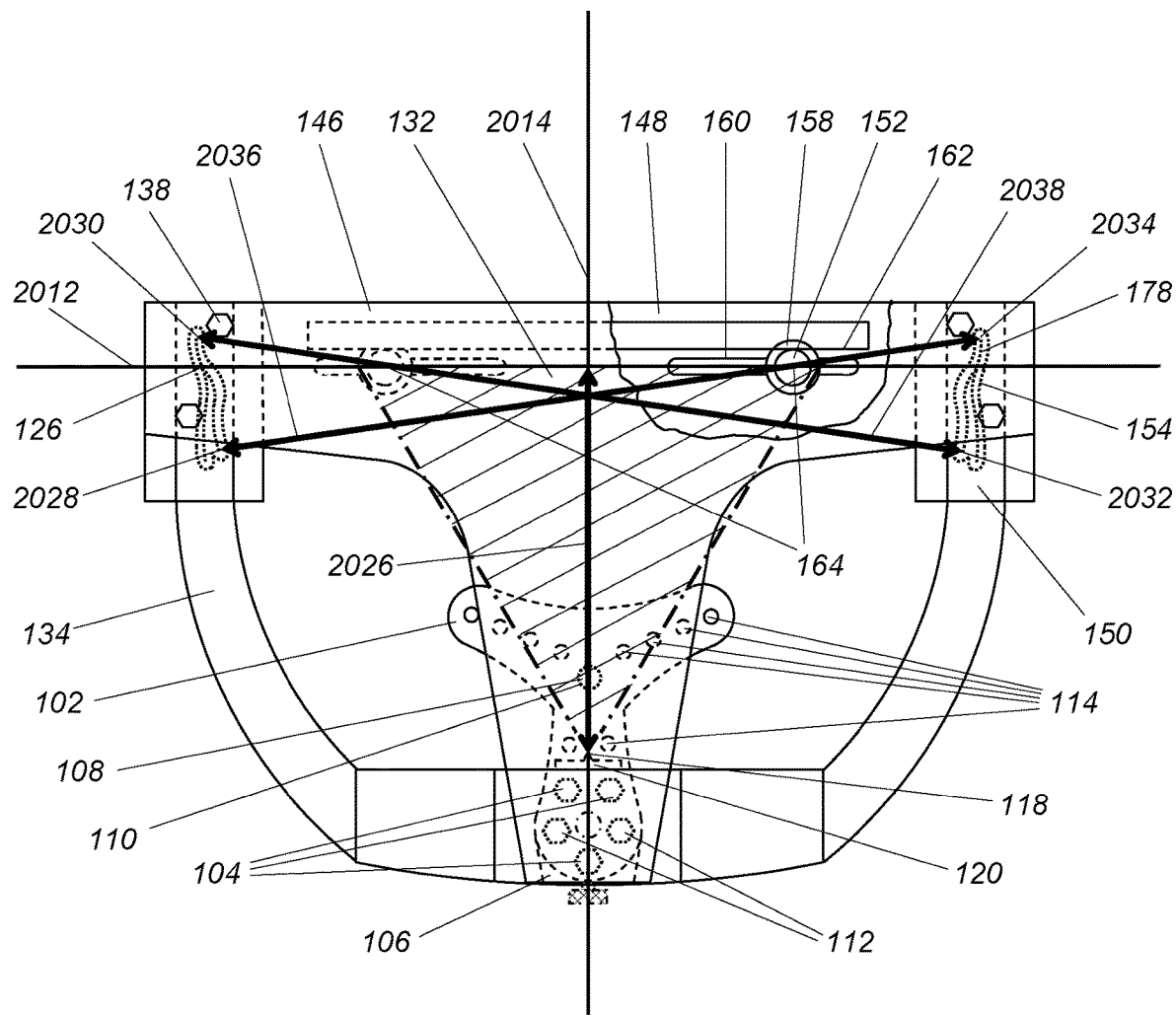
FIG. 14 is a schematic of a combined apparatus illustrating Top Plan View Of Superimposed Clutches, Recording Bows, Virtual Components, Articulator, Bonwill-Triangle, Bonwill-Apex, Planes, And Vectors in accordance with some other embodiments.

FIG. 14 is a top schematic plan view of the physical articulating instrument 3000 and the physical recording system 2000, wherein the devices and some component parts are superimposed. Illustrated are; the superimposed upper and lower clutches 102 having the clutch attachments 104 and the clutch assembly attachment 112; the superimposed upper recording bow 134 and lower recording bow 100 shown in FIG. 13A; and the superimposed upper articulating frame 146 and lower articulating frame 148. The Bonwill-triangle is shown in hash marks. In this illustration, the component parts, the Bonwill-triangle 132, the Bonwill-apex 118, the planes, and the vectors are shown in fixed spatial relation to one another. The Bonwill-apex 118 is fenced with the raised pointer 120 on upper surface of the upper clutch 102. In some embodiments, the virtual upper recording bow 134, attached to the patient's upper dental arch by the upper clutch 102, has the right and left side virtual engravable analogs 136, shown in FIG. 9, each of the analogs 136 being attached to the bow 134 by the analog attachment 138. Shown are some of the clutch 102 features comprising; the indexing retention holes 114 for indexing the dental arch; and the central bearing point 108. Also shown is the clutch spacer 106 having the spacer hole 110. The physical articulating instrument 3000 has a right side and a left side vertical rotation-center 164, the rotation-center 164 component parts comprising; the rotation-center heads 152; and a fixed rear wall guide 162. The upper articulating frame 146 has the right and left side engraved analogs 150 having the curvilinear pathways 154, the analog attachments 138, and the fixed rear wall guide 162, the guide 162 being a fixed substantially flat surface located parallel to and posterior of the coronal plane 2012 by a distance value of one half of the diameter of the rotation-center heads 152. A cut away view shows part of the lower articulating frame 148, the frame 148 having the right and left side rotation-center heads 152 and being supported on the frame 148 by the independently slidable-fixable rotation-center posts 158. Each of the rotation-center posts 158 are retained and fixed in the rotation-center slot 160. Each of the rotation-center posts 158 are adjusted by a method comprising; loosening the independently slidable-fixable rotation-center attachment 166, shown in FIG. 6; moving the rotation-center heads 152 toward or away from the midsagittal plane 2014, within the Bonwill-axis 130, also shown in FIG. 6; and tightening the rotation-center attachment 166. The midsagittal plane 2014 incorporates the anterior Bonwill-apex vector 2026 and is perpendicular to all of the other four planes.

Variable vectors 176 connect two coordinate endpoints on the pathlines 178. Since the pathlines 178 are determined by the patient's own mandibular jaw motion, variable vectors 176 have different starting points, ending points, and directions. More specifically, variable vectors 176 connect the anterior pathline endpoint on one virtual engraved analog 150 and the posterior pathline endpoint on the opposite side virtual engraved analog 150. Accordingly, the two variable vectors 176 are a right lateral vector 2036, and a left lateral vector 2038. The digital recording system 4000, shown in FIG. 10, converts the patient's real-time jaw motion, singly or in combination with static patient-generated biting surfaces, into virtual right lateral, left lateral, and protrusive mandibular jaw motion or tip-center 126 motion, thereby generating a plurality of the pathlines 178. The pathlines 178 are XYZ axis 3D curvilinear line tracings produced by the virtual motion of the tip-centers 126. The right side pathlines 178 in the virtual pathways 154 have the virtual right anterior pathline endpoint 2028 and the left side pathlines 178 in the virtual pathways 154 have the virtual left posterior pathline endpoint 2034. These two coordinate points generate the virtual left lateral vector 2038 which vector 2038 intersection on the coronal plane 2012 produces the virtual left side vertical rotation-center 164. The right side pathlines 178 in the virtual pathways 154 have the virtual right posterior pathline endpoint 2030 and the left side pathlines 178 in the virtual pathways 154 have the virtual left anterior pathline endpoint 2032. These two coordinate points generate the virtual right lateral vector 2036 which vector 2036 intersection on the coronal plane 2012 produces the virtual right side vertical rotation-center 164. Each vertical rotation-center 164 is the genuine frontal or vertical center around which the upper articulating frame 146 and lower articulating frame 148 rotate when the physical articulating instrument 3000, shown in FIG. 6, is moved in a lateral excursion. By identifying the variable vector 176 that connects the anterior pathline endpoint and the posterior pathline endpoint, the software program writer locates the intersection of the vector on the coronal plane 2012 and thereby locates the respective virtual vertical rotation-center 164 for a lateral excursion of the articulating instrument 5000.

Figure 15:
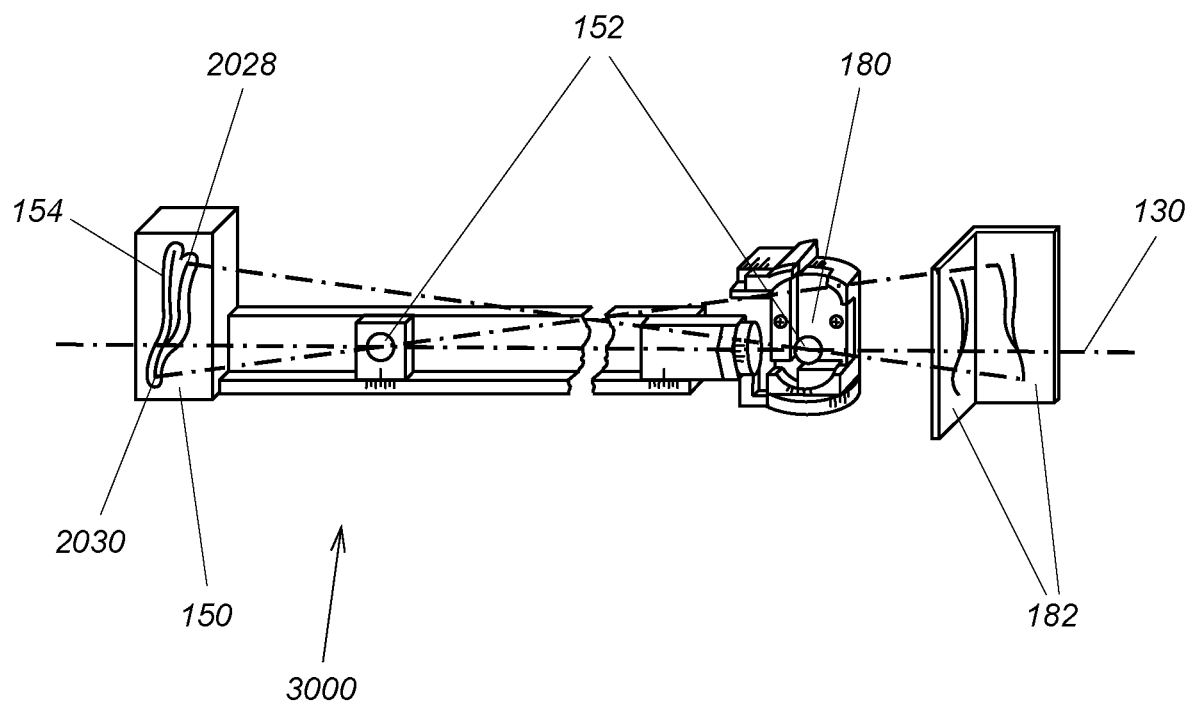
FIG. 15 is a schematic of a combined apparatus illustrating Bottom Perspective View Of A Present Embodiment Articulator And A Prior Art Fully Adjustable Mechanical Articulator And Linear Tracings in accordance with some other embodiments.
Figure 20:
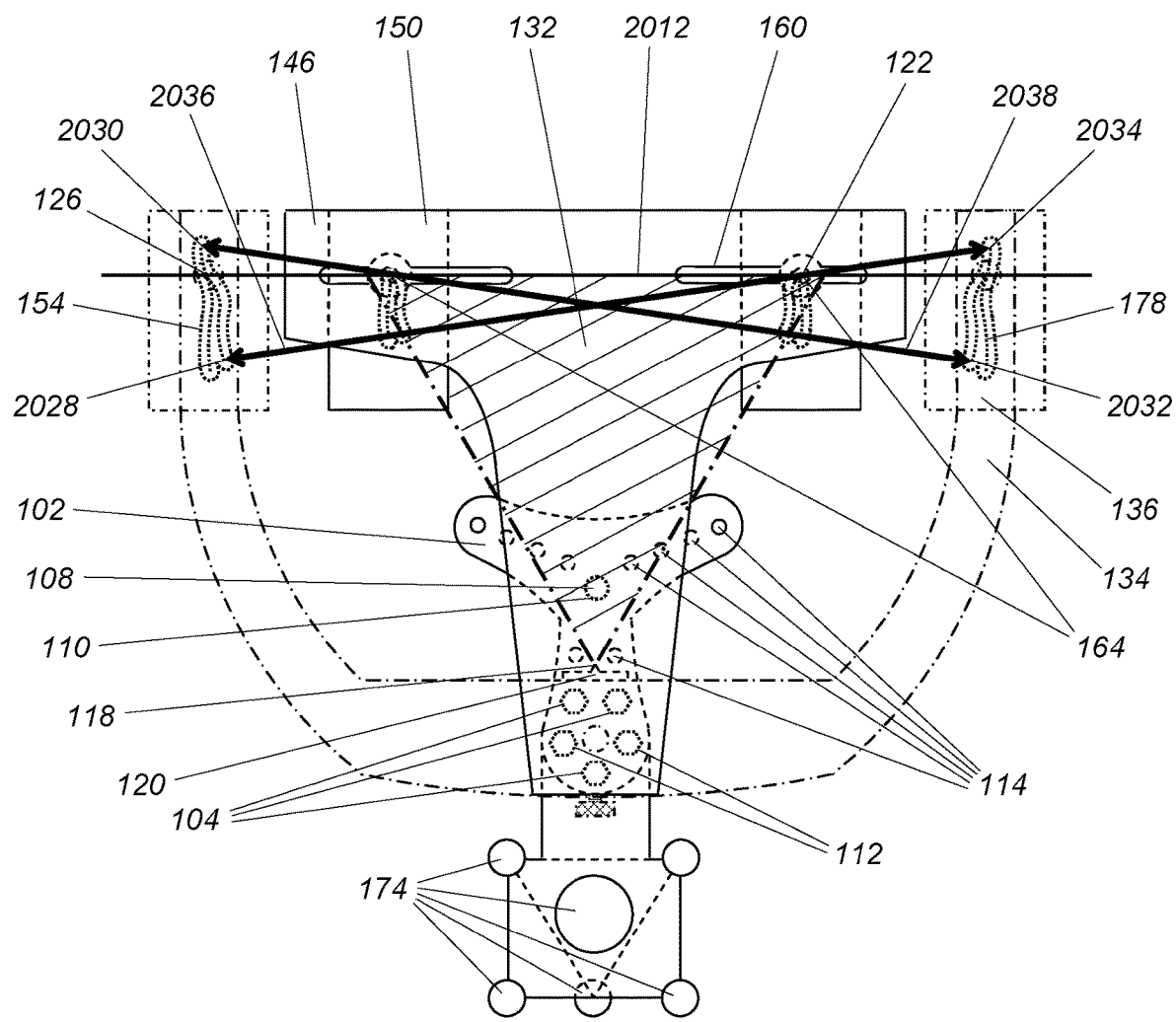
FIG. 20 is a schematic of a combined apparatus illustrating Top Plan View Of Superimposed Digital Clutches, Virtual Recording Bows, Virtual Components, Digital Articulator, Bonwill-triangle, And Bonwill-apex in accordance with some other embodiments.

FIG. 15 is a schematic bottom perspective view of an engraved analog 150 guided, genuine vertical rotation-center 164, shown in FIG. 20, controlled, articulating system in comparison to a typical fully adjustable articulating system. In this illustration, the physical articulating instrument is generally designated 3000. The engraved analog 150 having the 3D curvilinear pathways 154 is shown in relation to a prior art articulator mechanical guide surface 180. Illustrated selected pathlines in the right side engraved analog are the right anterior pathline endpoint 2028 and the right posterior pathline endpoint 2030. The 3D curvilinear pathways 154 in the engraved analog 150 are shown as they relate to a prior art linear pantographic tracing 182. Accordingly, the respective rotation-center heads 152 are shown in relation to the Bonwill-axis 130, the 3D curvilinear pathways 154 of the engraved analog 150, and the 2D pantographic tracings 182. Illustrated are two of six pantographic tracings 182 produced by a prior art recording instrument, the tracings 182 being simultaneously inscribed in 2D images, each image comprising a set of lines on a substantially flat surface made by a stylus for the purpose of recording patient-specific mandibular jaw motion. Also illustrated are left side mechanical guide surfaces 180 representing a prior art dental articulating instrument, each guide surface comprising up to six independently adjustable surfaces to be adjusted so that each stylus follows each line during right lateral, left lateral, and protrusive excursions of the articulating instrument.

Figure 16A:
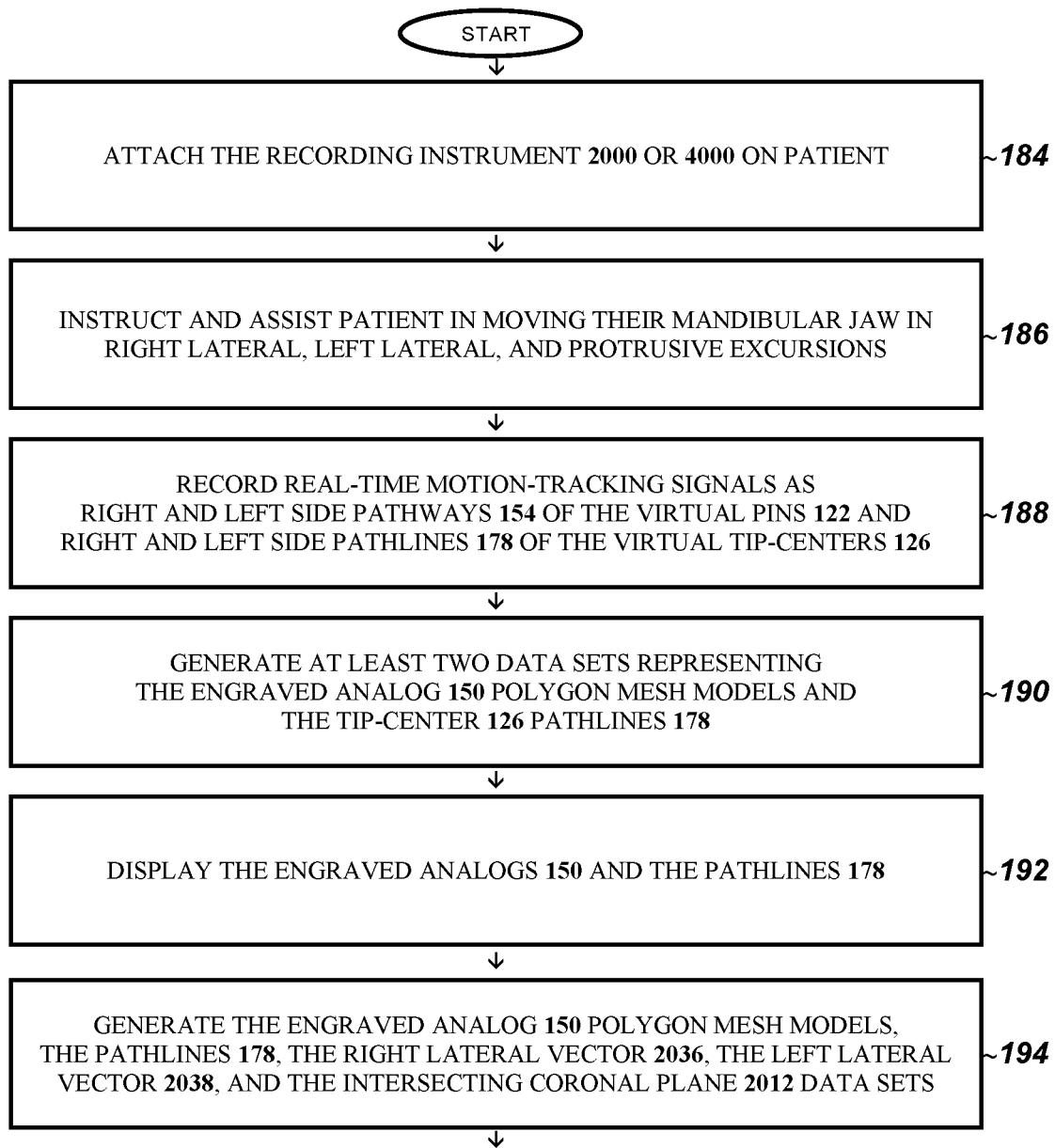
FIGS. 16A and 16B and a flow diagram of Exemplary Process For Generating Virtual Mandibular Jaw Motion And For Fabricating Fully Functional Restorative Treatments in accordance with some other embodiments.
Figure 16B:
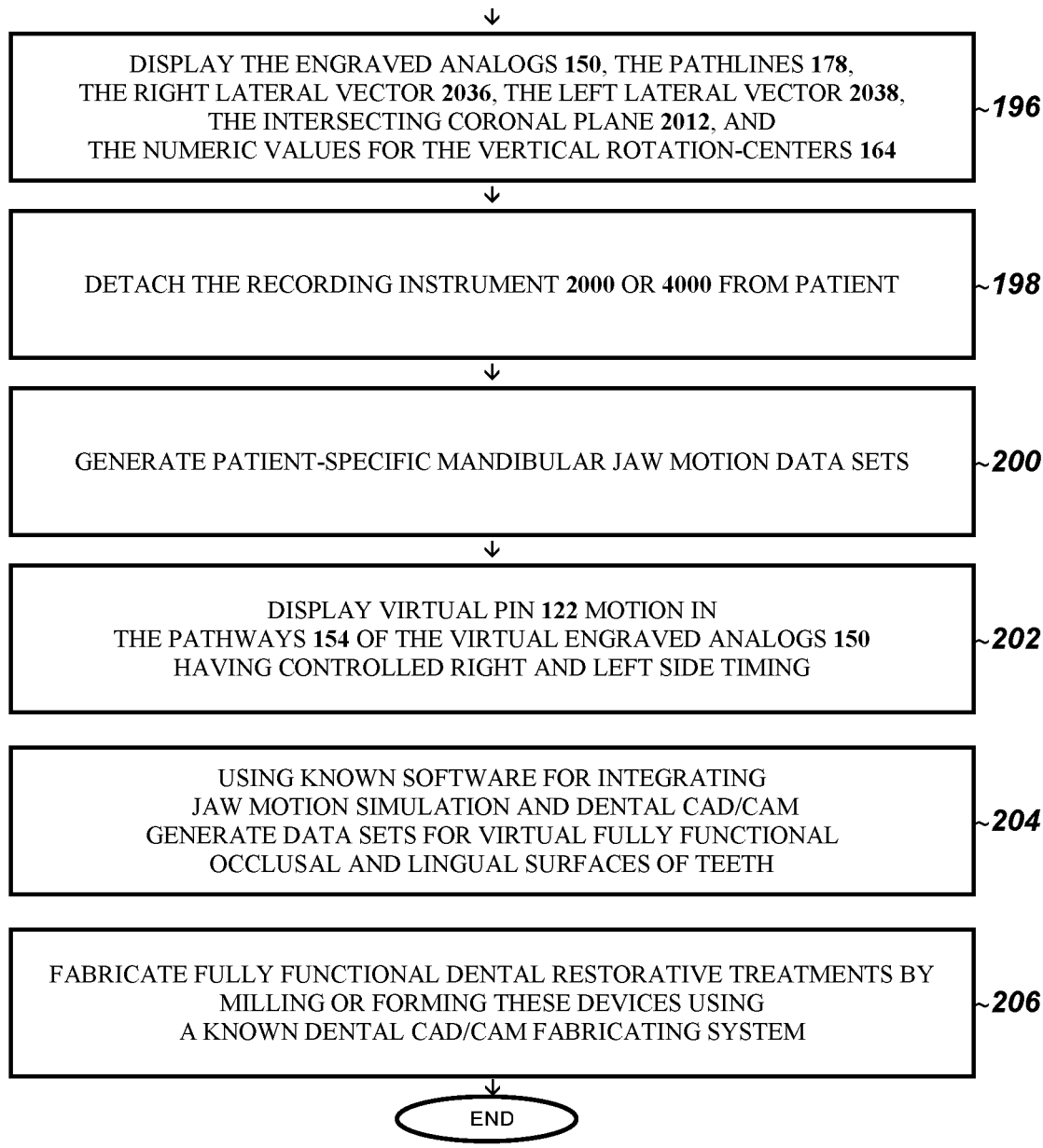

FIGS. 16A and 16B are a flow diagram. In this illustration an exemplary process for generating virtual mandibular jaw motion is represented. At step 184 the physical recording instrument 2000, shown in FIG. 2, or the digital recording system 4000, shown in FIG. 10, is attached on the patient. The digital recording system 4000 needs to be of sufficient size, shape, and position as to enable mandibular jaw motion tracking sensors 174 to record patient-specific mandibular jaw motion. At step 186 the patient is instructed and assisted in moving their mandibular jaw in excursive movements. At step 188 real-time motion-tracking signals are recorded as pathways 154 of the virtual pins 122 and pathlines 178 of the virtual tip-centers 126. At step 190 at least two data sets representing engraved analog 150 polygon mesh models and virtual tip-center 126 pathlines 178 are generated. In all respects the virtual engraved analogs 150 are so sized, shaped and positioned as to be virtual replicas of analogs that are physically engraved analogs 150. At step 192 the engraved analog 150 polygon mesh models and tip-center 126 pathlines 178 are displayed. The clinician can evaluate the pathlines 178, confirming that right lateral, left lateral, and protrusive excursions are complete. At step 194 the polygon mesh models, the pathline 178, the right lateral vector 2036, the left lateral vector 2038, and the intersecting coronal plane 2012 data sets are generated. At step 196 the polygon mesh models, the pathlines 178, the right lateral vector 2036, the left lateral vector 2038, the intersecting coronal plane 2012, and the numeric values for the vertical rotation-centers 164 are displayed. At step 198 the physical recording instrument 2000 or the digital recording system 4000 is detached from the patient. At step 200 the patient-specific mandibular jaw motion data sets are generated. At step 202 virtual pin 122 motion in the pathways 154 of the virtual engraved analogs 150, having controlled right and left side timing, are displayed. The clinician can confirm that patient-specific mandibular jaw motion, including right lateral, left lateral, and protrusive excursions, has been recorded. At step 204 known software for integrating jaw motion simulation and dental CAD/CAM, generates data sets for virtual fully functional occlusal and lingual surfaces of teeth. At step 206 fully functional dental restorative treatments are fabricated by milling or digitally forming these devices using a known dental CAD/CAM fabricating system.

Figure 17A:
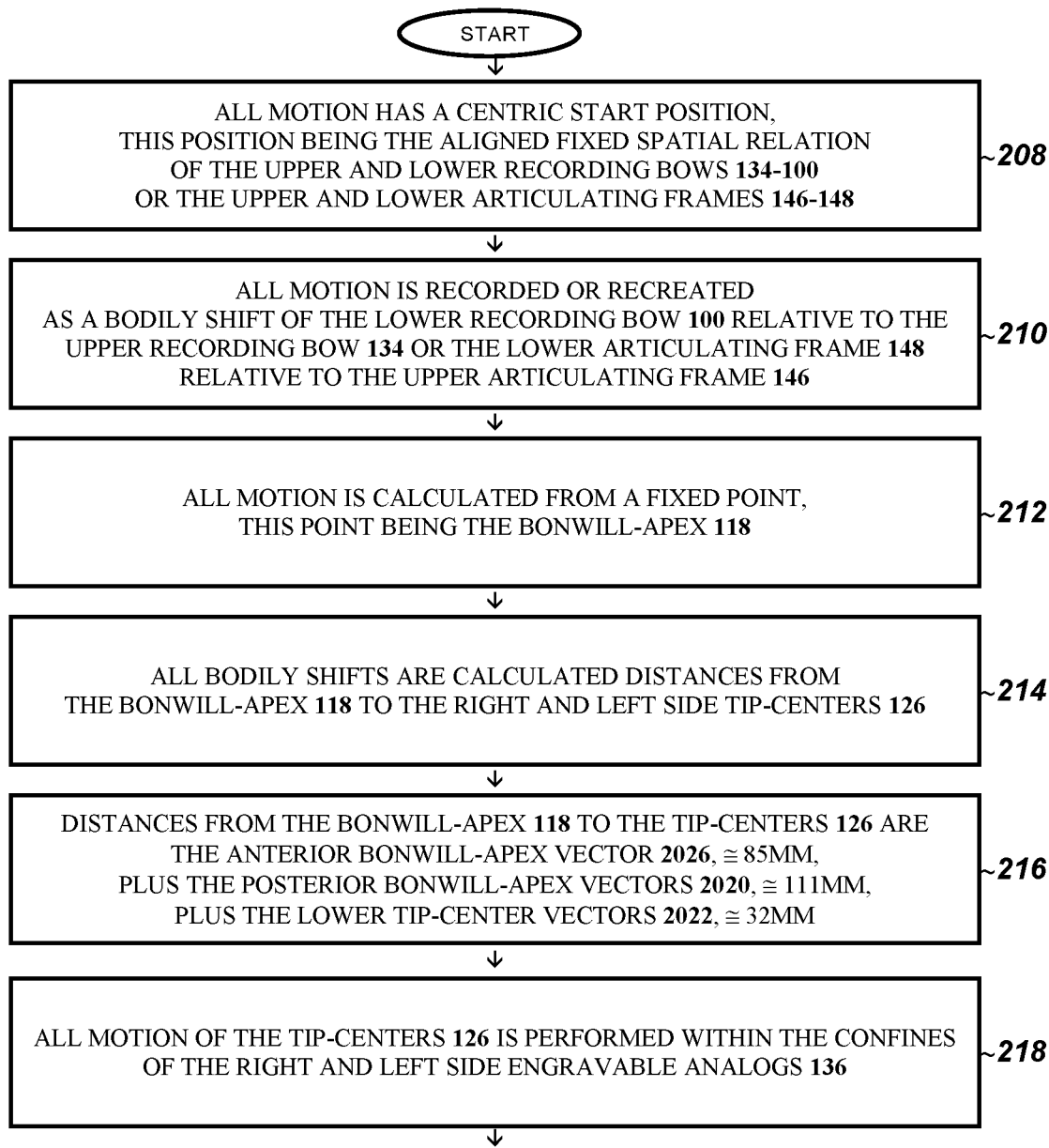
FIGS. 17A, 17B, and 17C is a flow diagram of Exemplary Algorithm For A Program To Record Mandibular Jaw Motion, Generate Engraved Analogs, And Locate Vertical Rotation-Centers in accordance with some other embodiments.
Figure 17B:
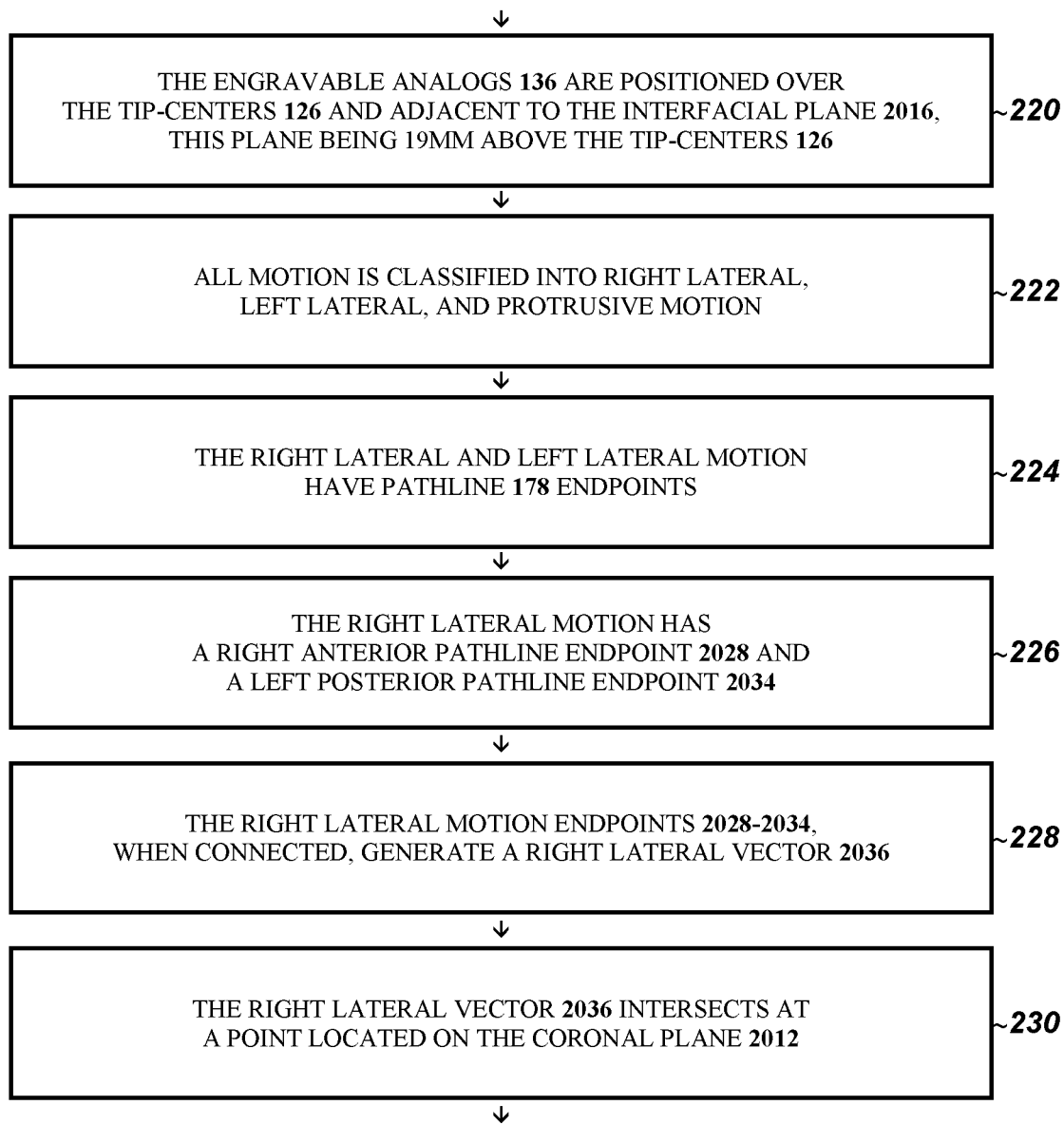
Figure 17C:
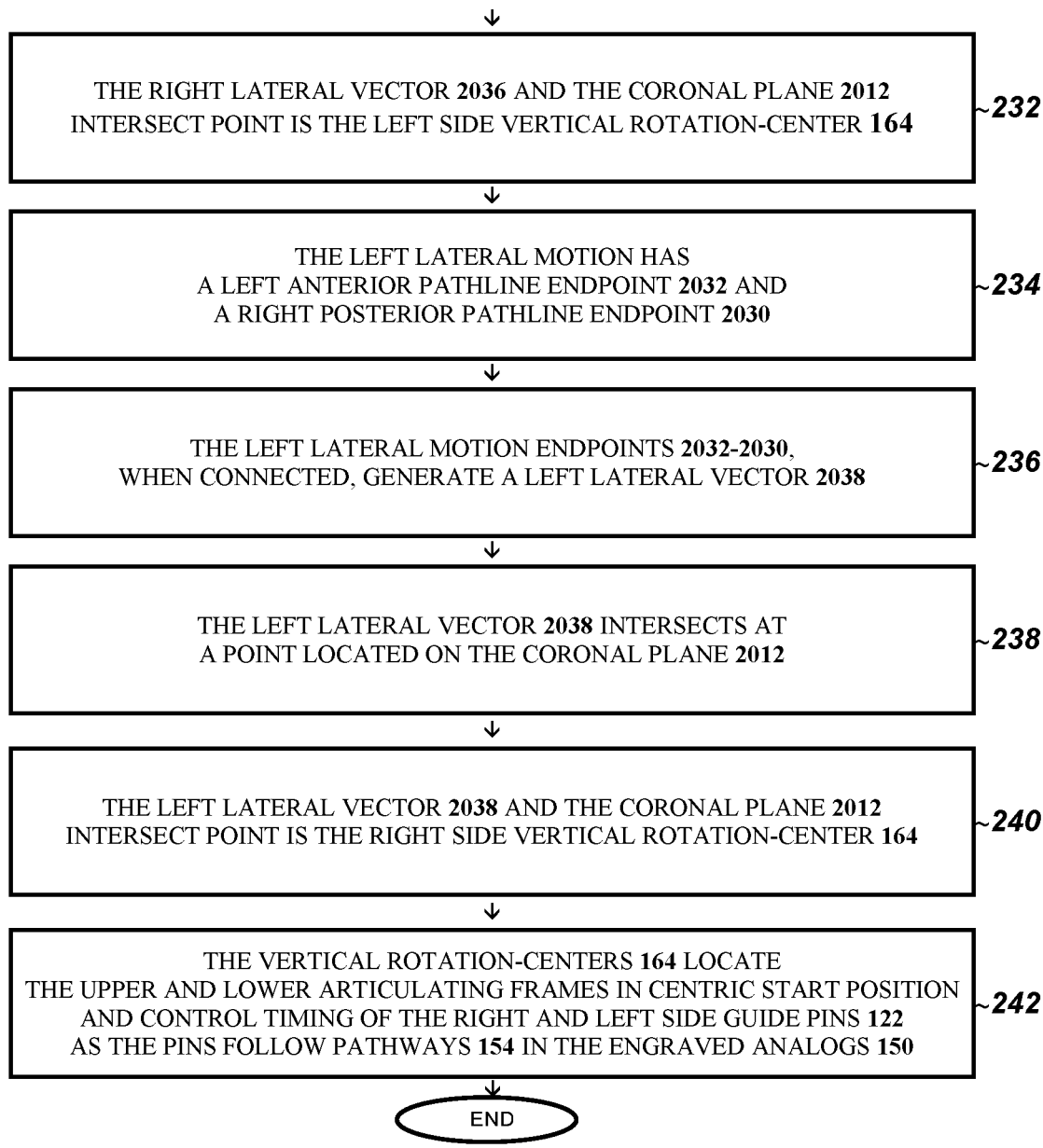

FIGS. 17A, 17B, and 17C are a flow diagram. Represented in this illustration is an exemplary algorithm for a program to record mandibular jaw motion, generate engraved analogs, and locate the centers of rotation. Step 208 specifies that mandibular jaw motion have a centric start position which is the aligned fixed spatial relation of the upper recording bows 134 and the lower recording bow 100 or the upper articulating frame 146 and lower articulating frame 148. Step 210 specifies that mandibular jaw motion is recorded or recreated as a bodily shift of the lower recording bow 100 or the lower articulating frame 148. Step 212 specifies that mandibular jaw motion is calculated from a fixed point which is the Bonwill-apex 118. Step 214 specifies that all bodily shifts are calculated distances from the Bonwill-apex 118 to the right and left side tip-centers 126. Step 216 specifies that distances from the Bonwill-apex 118 to the tip-centers 126 are the anterior Bonwill-apex vector 2026, 85 mm, plus the posterior Bonwill-apex vectors 2020, 111 mm, plus the lower tip-center vectors 2022, 32 mm. Step 218 specifies that all motion of the tip-centers is performed within the confines of the right and left side engravable analogs 136. Step 220 specifies that the engravable analogs 136 are positioned over the tip-centers 126 and adjacent to the interfacial plane 2016 which plane 2016 is 19 mm above the tip-centers 126. Step 222 specifies that all motion is classified into right lateral, left lateral, and protrusive motion. Step 224 specifies that the right lateral and left lateral motion have pathline 178 endpoints. Step 226 specifies that the right lateral motion has a right anterior pathline endpoint 2028 and a left posterior pathline endpoint 2034. Step 228 specifies that the right lateral motion endpoints 2028-2034, when connected, generate a right lateral vector 2036. Step 230 specifies that the right lateral vector 2036 intersects at a point located on the coronal plane 2012. Step 232 specifies that the right lateral vector 2036 and the coronal plane 2012 intersect point is the left side vertical rotation-center 164. Step 234 specifies that the left lateral motion has a left anterior pathline endpoint 2024 and a right posterior pathline endpoint 2030. Step 236 specifies that the left lateral motion endpoints 2032-2030, when connected, generate a left lateral vector 2038. Step 238 specifies that the left lateral vector 2038 intersects at a point located on the coronal plane 2012. Step 240 specifies that the left lateral vector 2038 and the coronal plane 2012 intersect point is the right side vertical rotation-center 164. Step 242 specifies that the vertical rotation-centers 164 locate the upper and lower articulating frames in centric start position and control timing of the right and left side guide pins 122 as the pins 122 follow pathways 154 in the engraved analogs 150.

Operation

FIGS. 1A, 2, and 14 illustrate the method of assembling and using the clutch assembly 1000 to index the patient's upper and lower dental arches in centric start position comprises; restructuring the physical recording instrument 2000 to make the clutch assembly 1000; detaching the upper clutch 102 from the upper recording bow 134, the upper bow 134 being set aside; stacking the upper clutch 102, the clutch spacer 106 having the spacer hole 110, the hole 110 being over the central bearing point 108, and the lower clutch 112 having the attached lower recording bow 100; attaching the upper clutch 102, the clutch spacer 106, and the lower clutch 102 having the attached lower recording bow 100, the clutch assembly attachment 112 being used to join the clutch assembly 1000 component parts and features thereof; applying the congealing material 116 to the upper and lower surfaces of the attached clutches as a substantially soft material, the clutches 102 having the indexing retention holes 114 for adhering the congealing material 116; positioning the clutches 102 in the patient's mouth with the upper central incisor teeth located on the Bonwill-apex 118 which apex 118 is indicium or fenced on the upper clutch 102; aligning the attached lower recording bow 100 symmetrically on the patient's head; instructing the patient to lightly bite into the assembled clutches 102 in centric relation, the patient thereby holding the clutches 102 between their teeth until the congealing material 116 has set to a substantially hard material; removing the clutch assembly 1000 from the patient's mouth when the congealing material 116 has set; removing the clutch assembly attachment 112, the upper clutch 102 and the clutch spacer 106 being removed from the clutch 102 attached lower recording bow 100; and attaching the upper clutch 102 to the upper recording bow 134, thereby reconstituting the physical recording instrument 2000.

FIG. 1A illustrates the fixed spatial relation clutch assembly 1000 for capturing the "centric relation" or "centric occlusion" jaw positions which positions are effective "centric start positions" for recording mandibular jaw motion. The centric start position is the position of the arches where engraving begins, the patient being in centric relation or centric occlusion and the upper recording bows 134 and the lower recording bows 100 being aligned thereon, i.e., the function of the clutch assembly 1000 indexing process.

Centric occlusion jaw start position is indexed on the upper and lower clutches by utilizing the clutch assembly and following laboratory and clinical procedures. Initially, in the laboratory; forming substantially soft congealing material 116 on small central incisor areas of the joined clutches 102 in the clutch assembly 1000; positioning the assembled clutches 102 between the upper and lower models 142 whereby the models 142 have been provisionally mounted in centric occlusion on any rigid hinge dental articulator; locating the upper central incisor teeth on the Bonwill-apex 118, the Bonwill-apex 118 being indicium or fenced on the upper clutch 102; aligning the attached lower recording bow 100 on the physical articulating instrument 3000; and causing the articulated models 142 to bite into the soft congealing material 116 until the material 116 has set to form substantially hard central incisor indexing surfaces. Subsequently, in the clinic; adding more soft congealing material 116 to the remaining upper and lower surfaces of the joined clutches 102 in the clutch assembly 1000; instructing the patient to index their incisors into the laboratory-made hard material 116 indexed areas, holding the clutch assembly between their teeth until the soft material 116 is set to form substantially hard indexing surfaces, thereby forming the indexed upper and lower clutches 102 in the centric occlusion start position.

Centric relation jaw start position is indexed on the upper and lower clutches by utilizing the clutch assembly and following laboratory and clinical procedures comprising; the clinician teaching the patient and coaching them to position their mandibular jaw in centric relation; forming substantially soft congealing material 116 on the upper and lower surfaces of the joined clutches 102 in the clutch assembly 1000; positioning the clutches 102 in the patient's mouth, the upper central incisor teeth being located on the Bonwill-apex; aligning the attached lower recording bow 100 on the patient's head; instructing the patient to lightly bite into the assembled clutches 102 in the centric relation jaw position, holding the clutches between their teeth until the soft material 116 is set to form substantially hard indexing surfaces, thereby forming the indexed clutches 102 in the centric relation start position.

FIGS. 2, 3, and 14 illustrate the physical recording instrument 2000 wherein the engravable analogs 150 are engraved in accord with clinical procedures comprising; loading the right and left side engravable analogs 136 or containers thereof, with the substantially soft congealing material 116; inserting and indexing the clutches 102 to the upper and lower dental arches in the patient's mouth, the upper clutch 102 being attached to the upper recording bow 134, the upper bow 134 having the attached engravable analogs 136, and the lower clutch 102 being attached to the lower recording bow 100, the lower bow 100 having the engrave pins 122; instructing the patient to bite down on the indexed clutches 102, and accordingly engaging the central bearing point 108, moving their jaw around on the bearing point 108; instructing the patient to move their jaw in excursive movements; turning the adjustable screw bases 128 and accordingly, the engrave pins 122 incrementally upward, the spherical tips 124 moving from outside of and into alignment with the Bonwill-axis 130; enabling the patient to form the envelopes-of-motion or pathways 154 in each of the engravable analogs 136 as right lateral, left lateral, and protrusive mandibular jaw motions are executed, the patient thereby forming the engraved analogs 150 as the congealing material 116 sets to a substantially hard material 116.

FIGS. 2, 4, and 12 illustrate the physical recording instrument 2000 and the physical articulating instrument 3000 wherein the engraved analogs 150 are detached from the physical recording instrument 2000 and attached to the physical articulating instrument 3000, the engraved analogs 150 being in the same fixed spatial relation to the occlusal plane 2018 and the Bonwill-apex 118 that the analogs 150 were in when they were formed on the patient. The physical articulating instrument 3000 is for usual and customary mounting of the patient's upper and lower dental models 142. In some embodiments, the mounting procedure comprises; attaching the clutch articulator support 144 to the lower articulating frame; setting the incisal pin to the normal instrument opening for model 142 mounting; attaching the upper clutch 102 to the clutch articulator support 144 with the clutch assembly attachment 112; indexing the upper model 142 to the upper clutch 102; mounting the upper model 142 to the upper articulating frame 146 with gypsum, and when the plaster is set; detaching and removing the upper clutch 102 to the clutch articulator support 144; extending the incisal pin to the normal instrument opening for model mounting; indexing the lower model 142 to the mounted upper model 142; mounting the lower model 142 to the lower articulating frame 146 with gypsum.

FIGS. 5 and 6 illustrate physical articulating instrument wherein the rotation-center heads 152 engaging the rear wall guide 162 control the timing on the right and left sides of the physical articulating instrument 3000 when simulating mandibular jaw motion. Each rotation-center head 152 becomes the genuine vertical center around which the right and left sides of the upper articulating frame 146 and the lower articulating frame 148 rotate when the physical articulating instrument 3000 is moved in a lateral excursion. The rotation-center heads 152 are horizontally centered on and adjustable within the Bonwill-axis 130, each head being vertically supported, slidably adjusted, and fixed on the lower articulating frame 148. The rear wall guide 162 a fixed substantially flat surface on the upper articulating frame 146, located parallel to and posterior of the coronal plane 2012 by a distance value of one half of the diameter of the sphere-shaped rotation-center heads 152. Laboratory procedures for locating the rotation-center heads 152 comprise; positioning the upper articulating frame 146 and the lower articulating frame 148 in a full lateral position, whereby the guide pins 122 are respectively oriented, one all of the way forward in its engraved analog 150 pathway 154, and the other all of the way rearward in its engraved analog 150 pathway 154; adjusting and fixing the slidable rotation-center head 152 on the rearward side and in passive contact with the rear wall guide 162; repeating the foregoing procedure for the rotation-center head 152 on the opposite side of the physical articulating instrument 3000.

FIGS. 9, 10, 11A, 11B, 14, 16A, and 16B illustrate an exemplary process for generating virtual mandibular jaw motion for fabricating fully functional restorative treatments in accord with some embodiments; attaching the digital recording instrument 4000 on patient; instructing and assisting patient in moving their mandibular jaw in excursive movements; recording real-time motion-tracking signals as right and left side pathways 154 of the virtual pins 122 and right and left side pathlines 178 of the virtual tip-centers 126; generating at least two data sets representing the engraved analog 150 polygon mesh models and the tip center 126 pathlines 178; displaying the engraved analogs 150 and the pathlines 178; generating the engraved analogs 150 polygon mesh models, the pathlines 178, the right lateral vector 2036, the left lateral vector 2038, and the intersecting coronal plane 2012 data sets; displaying the engraved analogs 150, the pathlines 178, the right lateral vector 2036, the left lateral vector 2038, the intersecting coronal plane 2012, and the numeric values for the vertical rotation-centers 164; detaching the recording instrument 2000 or 4000 from patient; generating patient-specific mandibular jaw motion data sets; displaying virtual pin 122 motion in the pathways 154 of the virtual engraved analogs 150 having controlled right and left side timing; using known software for integrating jaw motion simulation and dental CAD/CAM generate data sets for virtual fully functional occlusal and lingual surfaces of teeth; fabricating fully functional dental restorative treatments by milling or forming these devices using a known dental CAD/CAM fabricating system. In some embodiments, after the upper and lower clutches 102 have been respectively fixed to the facial surfaces of the teeth, the patient is instructed to orient their mandibular jaw in a position selected from the orientations consisting of; centric relation; and centric occlusion. When the patient's jaw is positioned in one of these orientations, a signal is activated to digitally record that orientation as the centric start position.

Figure 18:
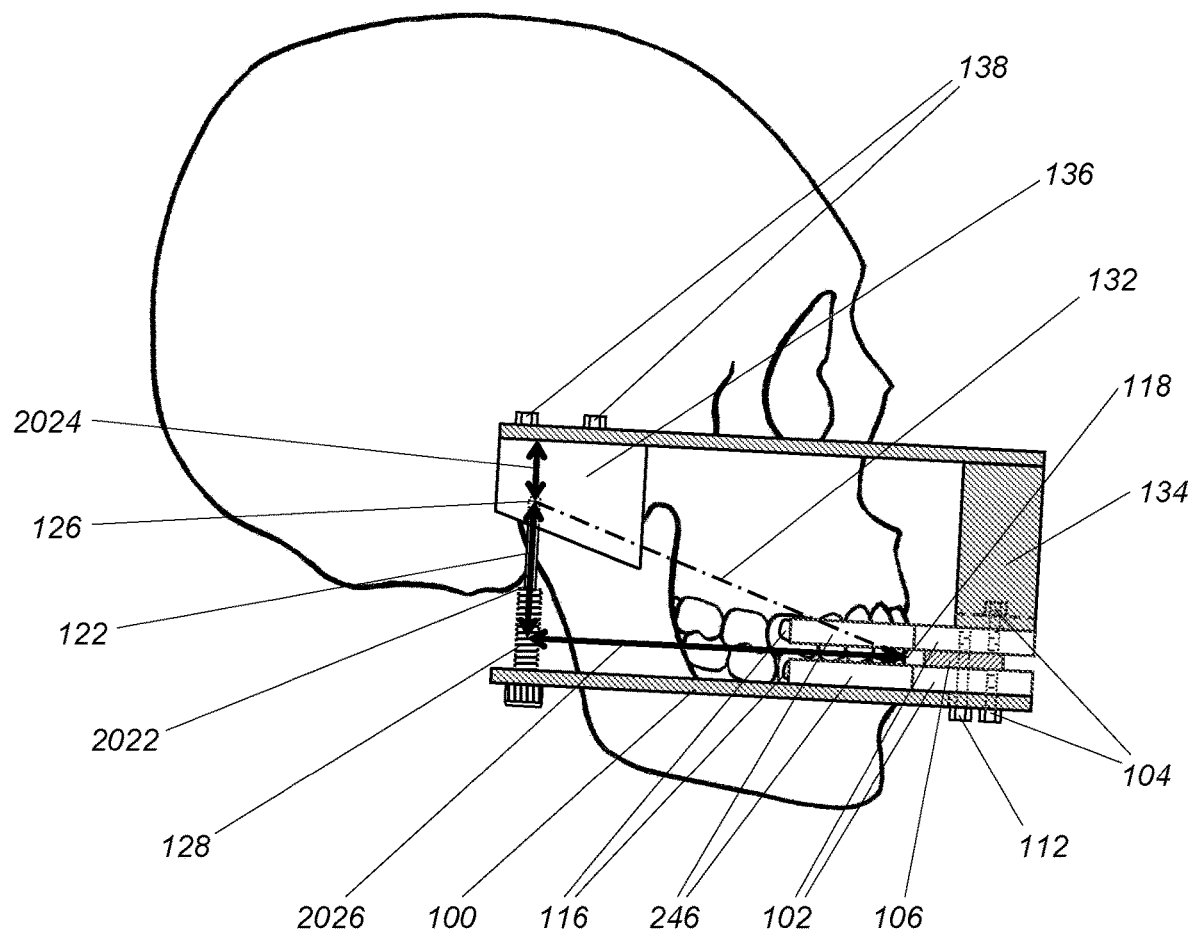
FIG. 18 is a schematic of a combined apparatus illustrating Side Plan View Of Superimposed Alternative Facial Surface Adhered Dental Clutch Assembly, Recording Bows, Bonwill-Triangle, Bonwill-Apex, and Vectors in accordance with some other embodiments.

FIG. 18 illustrates some other embodiments wherein the clutch assembly 1000 is utilized to capture the "centric occlusion" jaw position which position is the effective "centric start position" for recording mandibular jaw motion. The centric start position is the position of the dental arches where engraving begins, the patient being in centric occlusion and the upper recording bow 134 and the lower recording bow 100 being aligned thereon, i.e., the position captured by the clutch assembly 1000 indexing process. The component parts of the clutch assembly 1000, being rigidly connected during the upper and lower dental arch indexing process, provide the basis for establishing and maintaining the fixed spatial relation between parts, wherein the Bonwill triangle 132, the Bonwill-apex 118, the anterior Bonwill apex vector 2026, the lower tip-center vector 2022, the upper tip-center vector 2024, and the other vectors are used to draw plans and write computerized programs.

A preliminary index of the centric occlusion start position is formed on an upper and a lower buccal band 246, the bands 246 being respectively on the upper and lower clutches 102, by means of utilizing the clutch assembly 1000 and by following laboratory procedures comprising; aligning the clutch assembly 1000, having the attached lower recording bow 100 and buccal bands 246, on the patient's mounted models 142, shown in FIG. 5, the models 142 having been provisionally mounted in centric occlusion; forming the buccal bands 246 to fit passively on the buccal surfaces of the upper and lower dental arches; sealing and blocking-out undercuts to produce a passive anterior-to-posterior line-of-draw on the buccal surfaces of the models 142; forming a thin coat of the substantially soft congealing material 116 on the buccal bands 246 and holding the bands 246 against the buccal surfaces of the mounted models 142, the models 116 being positioned in centric occlusion; removing the clutch assembly 1000 from the mounted models when the soft material 116 is set to form substantially hard indexing surfaces; trimming the indexing surface on the buccal bands 246 to produce a passive anterior-to-posterior line-of-draw.

The clutches 102 are provisionally cemented to the buccal surfaces of the patient's teeth by utilizing the clutch assembly 1000 and following clinical procedures comprising; instructing the patient to hold their teeth in tight closed centric occlusion; trying in the clutch assembly 1000, the assembly 1000 having the assembly attachment 112, the attached lower recording bow 100, the engrave pins 122, the tip-center 126, the screw bases 128, the clutches 102, the clutch attachments 104, the indexed clutch spacer 106, and lab-indexed buccal bands 246; teaching the patient to hold their teeth in closed centric occlusion for the time required for the soft congealing material 116 or provisional dental cement to form substantially hard cement attachment; forming provisional cement on the on the buccal bands 246; instructing the patient to hold their teeth in tight closed centric occlusion and inserting the clutch assembly 1000, the assembly 1000 having the attached lower recording bow 100 and lab-indexed buccal bands 246; removing the clutch assembly attachment 112 when the soft material 116 is set, thereby allowing the patient to open their mouth and the indexed clutch spacer 106 to drop out. Accordingly, the upper recording bow 134 is then attached to the upper clutch 102 and the process of engraving the engravable analogs 136 commences, the analogs being attached to the upper bow 134 by the analog attachments 138.

Additional Embodiments

Additional embodiments are shown in FIGS. 3, 9, 10, 17, and 18.

FIG. 3 illustrates the physical recording instrument 2000, here shown as a polystyrene foam "disposable" instrument, is actually part of the primary embodiments above described.

FIGS. 9, 10, and 11 illustrate the digital recording system 4000, here shown according to some digital embodiments, is also part of the primary embodiments above described.

Figure 19:
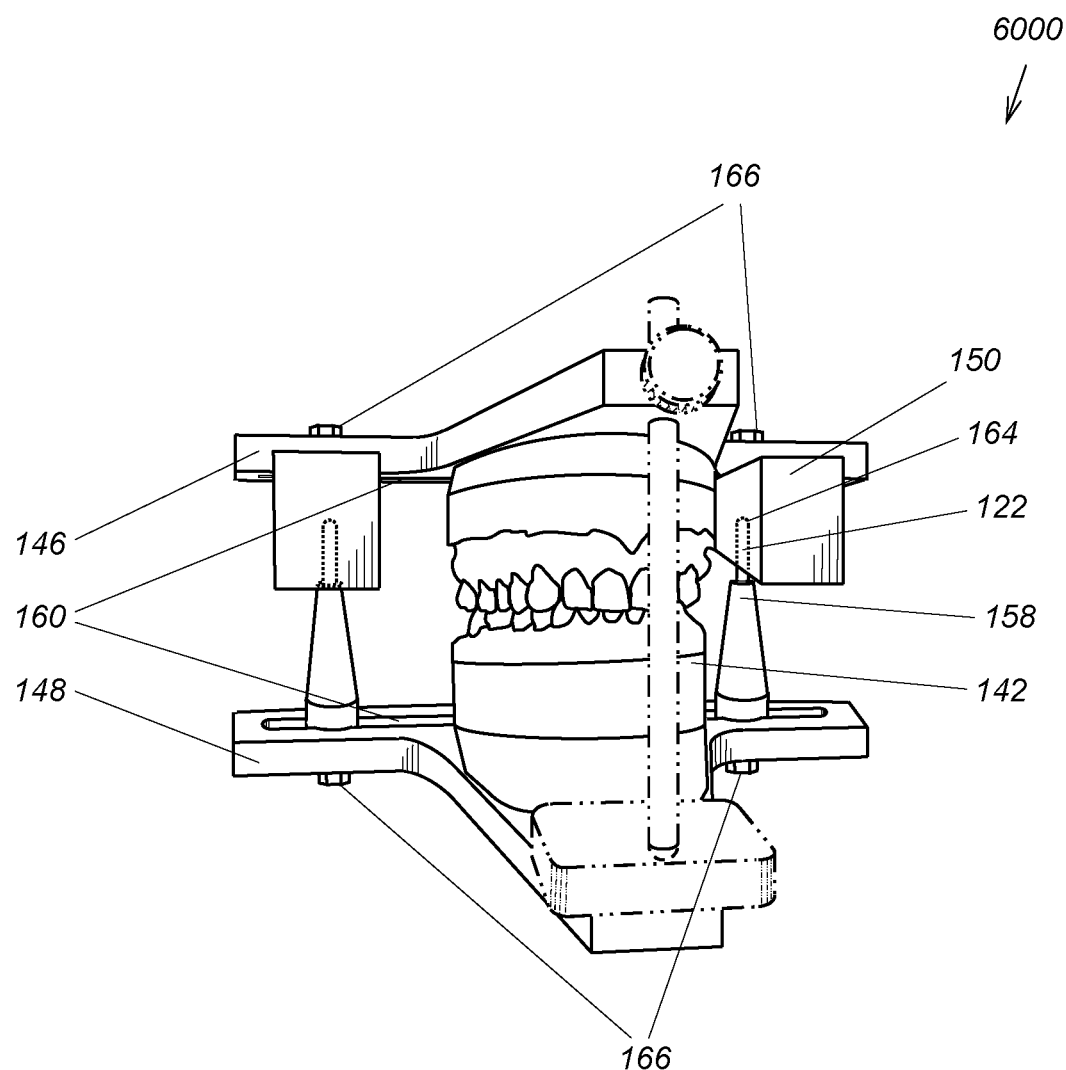
FIG. 19 is a perspective view of Digital Articulating Instrument in accordance with some other embodiments.

FIGS. 18, 19, and 20 illustrate the virtual articulating instrument 6000, here shown according to some virtual embodiments, is also part of the primary embodiments above described.

Alternative Embodiments

There are various possibilities with regard to the location of the pins 122 for engraving and guiding. In some embodiments, the pins 122 for engraving and guiding are vertically positioned with the spherical tips 124 and tip centers 126 located on a horizontal axis selected from; the Bonwill-axis 130; and the patient-specific hinge axis. In some other embodiments, the pins 122 for engraving and guiding are located on a horizontal axis selected from; the Bonwill-axis 130; and the patient-specific hinge axis. In these embodiments the engravable analogs 136 and the engraved analogs 150 are located relative to the spherical tip 124 and tip center 126 locations which locations are selected from; inside of the pins 122; and outside of the pins 122.

There are various possibilities with regard to the clutch assembly 1000 and the physical articulating instrument 3000. In some embodiments, the physical articulating instrument 3000 is dimensionally narrowed in width by generating scaled down right and left side engraved analogs 150 and by locating the rescaled analogs 150 and the respective guide pins 122 on the vertical rotation-centers 164. The resulting more narrow physical articulating instrument 3000 is a digital articulating instrument and is generally designated 6000.

FIG. 18 illustrates some other embodiments wherein the clutch assembly 1000 is utilized to capture the "centric occlusion" jaw position which position is the effective "centric start position" for recording mandibular jaw motion. The centric start position is the position of the dental arches where engraving begins, the patient being in centric occlusion and the upper recording bow 134 and the lower recording bow 100 being aligned thereon, i.e., the position captured by the clutch assembly 1000 indexing process. The component parts of the clutch assembly 1000, being rigidly connected during the upper and lower dental arch indexing process, provide the basis for establishing and maintaining the fixed spatial relation between parts, wherein the Bonwill triangle 132, the Bonwill-apex 118, the anterior Bonwill apex vector 2026, the lower tip-center vector 2022, the upper tip-center vector 2024, and the other vectors are used to draw plans and write computerized programs.

A preliminary index of the centric occlusion start position is formed on the buccal bands 246, the bands 246 being on the upper and lower clutches 102, by means of utilizing the clutch assembly 1000 and by following laboratory procedures comprising; aligning the clutch assembly 1000, having the attached lower recording bow 100 and buccal bands 246, on the patient's mounted models 142, shown in FIG. 5, the models 142 having been provisionally mounted in centric occlusion; forming the buccal bands 246 to fit passively on the buccal surfaces of the upper and lower dental arches; sealing and blocking-out undercuts to produce a passive anterior-to-posterior line-of-draw on the buccal surfaces of the models 142; forming a thin coat of the substantially soft congealing material 116 on the buccal bands 246 and holding the bands 246 against the buccal surfaces of the mounted models 142, the models 116 being positioned in centric occlusion; removing the clutch assembly 1000 from the mounted models when the soft material 116 is set to form substantially hard indexing surfaces; trimming the indexing surface on the buccal bands 246 to produce a passive anterior-to-posterior line-of-draw.

The clutches 102 are provisionally cemented to the buccal surfaces of the patient's teeth by utilizing the clutch assembly 1000 and following clinical procedures comprising; instructing the patient to hold their teeth in tight closed centric occlusion; trying in the clutch assembly 1000, the assembly 1000 having the assembly attachment 112, the attached lower recording bow 100, the engrave pins 122, the tip-center 126, the screw bases 128, the clutches 102, the clutch attachments 104, the indexed clutch spacer 106, and lab-indexed buccal bands 246; teaching the patient to hold their teeth in closed centric occlusion for the time required for the soft congealing material 116 or provisional dental cement to form substantially hard cement attachment; forming provisional cement on the on the buccal bands 246; instructing the patient to hold their teeth in tight closed centric occlusion and inserting the clutch assembly 1000, the assembly 1000 having the attached lower recording bow 100 and lab-indexed buccal bands 246; removing the clutch assembly attachment 112 when the soft material 116 is set, thereby allowing the patient to open their mouth and the indexed clutch spacer 106 to drop out. Accordingly, the upper recording bow 134 is then attached to the upper clutch 102 and the process of engraving the engravable analogs 136 commences, the analogs being attached to the upper bow 134 by the analog attachments 138.

FIG. 19 is a perspective view. In this illustration, the digital articulating instrument is generally designated 6000. Accordingly, the digital articulating instrument 6000 is for simulating the patient's right lateral, left lateral, and protrusive mandibular jaw motion using the digitally engraved analogs 150. In addition to usual and customary component parts comprising incisal guide components and mounting components for the patient's upper and lower models 142, the digital articulating instrument 6000 comprises the upper articulating frame 146 and the lower articulating frame 148. The upper articulating frame 146 has the right and left side rotation-center slots 160. Each slot 160 has the rotation-center attachment 166 for attaching and independently adjusting the right and left side engraved analogs 150. The analogs 150 are respectively centered on the right and left side vertical rotation-centers 164. The lower articulating frame 148 has the right and left side rotation-center slots 160. Each slot 160 has the rotation-center attachment 166 for attaching and independently adjusting the right and left side guide pins 122. The guide pins 122 are each respectively centered on the right and the left side vertical rotation-centers 164. The guide pins 122 are supported on the lower articulator frame 148 by the rotation-center posts 158 in the rotation-center slots 160, and the engraved analogs 150, attached to the upper articulator frame 146 in the rotation-center slots 160, are each adjusted and fixed respectively by loosening, sliding, and tightening the rotation-center attachments 166. By moving the guide pins 122 and the engraved analogs 150 toward or away from the midsagittal plane 2014, shown in FIG. 7, the guide pins 122 and the engraved analogs 150 are respectively positioned on center with the patient-specific right and left side vertical rotation-centers 164. Accordingly, data provided by the CNC program that was used for fabricating the engraved analogs 150, includes numeric settings for the right and left side guide pins 122 and engraved analog 150 positions. The engraved analogs 150 are formed using the digital data sets obtained from the digital recording system 4000, shown in FIG. 10, CAD/CAM systems, and computer numeric control systems selected from the groups comprising; a CNC milling system; a CNC printing system; an SLA optical-fabricating system; or other rapid prototyping system.

FIG. 20 is a top schematic plan view of the digital recording system 4000 and the digital articulating instrument 6000, wherein the devices and some component parts are superimposed. Illustrated are the upper and lower clutches 102 having the clutch attachments 104 and the clutch assembly attachment 112, the virtual upper recording bow 134, and the upper articulating frame 146 according to some embodiments. The Bonwill-triangle 132 is shown in hash marks. In this illustration, the component parts, the Bonwill-triangle 132, and the Bonwill-apex 118 are shown in fixed spatial relation to one another. The Bonwill-apex 118 is fenced with the raised pointer 120 on upper surface of the upper clutch 102. The digital recording system 4000 is shown as the superimposed upper and lower clutches 102 attaching or having the sensors 174, the clutch attachments 104, the clutch assembly attachment 112, and the virtual upper recording bow 134, having the attached virtual engravable analogs 136, shown in FIG. 10. Other clutch 102 features comprise; the indexing retention holes 114 for adhering the congealing material 116, shown in FIG. 1A, thereby indexing the patient's upper and lower dental arches; the central bearing point 108; and the spacer hole 110. The digital articulating instrument 6000 embodiments are distinctly different from other embodiments, vis-à-vis, the locations of the guide pins 122 and the engraved analog 150 locations, the locations being centered on the vertical rotation-centers 164. Having one and the same locations on the digital articulating instrument 6000, the guide pins 122 and the virtual engraved analogs 150 are here illustrated superimposed one upon the other. The digital articulating instrument 6000 is a dental articulator having usual and customary component parts in addition to present embodiment component parts comprising the upper articulating frame 146 and the lower articulating frame 148, shown in FIG. 19. The upper articulating frame 146 has rotation-center slots 160 and independently slidable-fixable rotation-center attachments 166, shown in FIG. 19, for respectively attaching and independently adjusting the right and left side digitally engraved analogs 150. The engraved analogs 150 are adjusted toward or away from the articulator midsagittal plane 2014 on and within the Bonwill-axis 130 according to data provided by the computer and software that rescaled the engraved analogs 150, the midsagittal plane 2014 and the Bonwill-axis 130 being shown in FIG. 7. Accordingly, the engraved analogs 150 are respectively located on the right and left side vertical rotation-centers 164. The lower articulating frame 148 has rotation-center slots 160 and independently slidable-fixable rotation-center attachments 166 for respectively attaching and independently adjusting the right and left side guide pins 122. The guide pins 122 are adjusted toward or away from the articulator midsagittal plane 2014 on and within the Bonwill-axis 130 according to data provided by the computer and software that rescaled the virtual engraved analogs 150. Accordingly, the guide pins 122 are respectively located on the right and left side vertical rotation-centers 164. Being centered on the vertical rotation-centers 164, the engraved analogs 150 are closer to the articulator midsagittal plane 2014 than the recorded virtual engraved analogs 150, and, to produce the same articulated motion in that location, the engraved analogs 150 are rescaled or made proportionally smaller than the recorded virtual engraved analogs 150. Accordingly the virtual engraved analogs 150 are digitally rescaled in all dimensions, with the exception of the respective pathways 154 in the engraved analogs 150, the dimensions of the pathways 154 being calculated to remain the same and accordingly, the standard guide pins 122 on the lower articulating frame 148 can follow the scaled down pathways 154. In some embodiments, the vertical rotation-centers 164 are located according to data provided by the computer and software that reconfigured the virtual engraved analogs 150.

Variable vectors 176 connect the anterior pathline endpoint on one virtual engraved analog 150 and the posterior pathline endpoint on the opposite virtual engraved analog 150. Accordingly, the two variable vectors 176 are the right lateral vector 2036, and the left lateral vector 2038. The digital recording system 4000, shown in FIG. 10, converts the patient's real-time jaw motion, singly or in combination with static patient-generated biting surfaces, into virtual right lateral, left lateral, and protrusive mandibular jaw motion or guide pin 122 and tip-center 126 motion, thereby generating a plurality of the pathlines 178. The pathlines 178 are XYZ axis 3D curvilinear line tracings produced by the virtual motion of the tip-centers 126. The right side pathlines 178 in the virtual pathways 154 locate the right anterior pathline endpoint 2028 and the left side pathlines 178 in the virtual pathways 154 locate the left posterior pathline endpoint 2034. When joined, these two coordinate points produce the left lateral vector 2038. The left lateral vector 2038 intersection on the coronal plane 2012 locates the virtual left side vertical rotation-center 164. The right side pathlines 178 in the virtual pathways 154 locate the right posterior pathline endpoint 2030 and the left side pathlines 178 in the virtual pathways 154 locate the left anterior pathline endpoint 2032. When joined, these two coordinate points produce the right lateral vector 2036. The right lateral vector 2036 intersection on the coronal plane 2012 locates the virtual right side vertical rotation-center 164. Each vertical rotation-center 164 is the genuine frontal or vertical center around which the upper articulating frame 146 and lower articulating frame 148 rotate when the physical articulating instrument 3000, shown in FIG. 6, is moved in a lateral excursion. By identifying the variable vector 176 that connects the anterior pathline endpoint and the posterior pathline endpoint, the software program writer locates the intersection of the vector on the coronal plane 2012 and thereby locates the respective virtual vertical rotation-center 164 for a lateral excursion of the virtual articulating instrument 5000. In some embodiments, the clutches 102 are respectively attached to the virtual upper recording bow 134 and the virtual lower recording bow 100 shown in FIG. 10. Accordingly, the virtual upper recording bow 134 has the right and left side physical or virtual engravable analogs 136. Each of the vertical rotation-centers and the virtual tip centers 126 are centered on the intersection of the coronal plane 2012 and on the posterior edge of the Bonwill-triangle 132 or the Bonwill-axis 130.

Advantages

Accordingly several advantages of one or more aspects are as follows:

To provide recording instruments that can be rapidly and easily attached to the patient's upper and lower dental arches.

To provide recording instruments in fixed spatial relation to the patient's upper dental arch, and accordingly, to provide recording instruments having substantially no adjustments.

To provide physical and virtual systems that are in fixed spatial relation to the upper dental arch.

To provide physical recording instruments that enable the patient to engrave engravable analogs and thereby to capture right and left side envelopes motion in the vicinity of the hinge axis.

To provide digital recording systems that facilitate generation of virtual right and left side curvilinear engraved analogs.

To provide digital recording instruments that enable the patient to virtually engrave engravable analogs and thereby to capture right and left side virtual envelopes of motion in the vicinity of the hinge axis.

To facilitate rapid prototyping systems that mill or digitally form right and left side 3D curvilinear engraved analog records of patient-specific dental motion, the analogs being directly attached to a physical articulating instrument in the same position or fixed spatial relation that the virtual analogs were when they were virtually formed on the patient.

To provide a practical physical articulating instrument that can attach right and left side 3D curvilinear engraved analogs and the patient's upper and lower models, the analogs, and the models attached or mounted in fixed spatial relation to the patient's upper dental arch when patient-specific jaw motion records were made.

To provide fully functional, patient-specific, physical articulating instruments having right and left side functionally generated, engraved analog guides and condylar elements or guide pins, the guides and pins being located and controlled from the "centric start position" by genuine vertical rotation-center adjustments, the adjustments being easily and rapidly adjusted and set in the laboratory.

To provide digital recording and physical articulating systems that facilitate generation of virtual 3D curvilinear engraved analogs and subsequent production of milled or digitally formed 3D curvilinear engraved analogs in a rapid prototyping machine, the analogs then being directly attached to a dental articulator in the same fixed spatial relation to the patient's upper dental arch that the analogs were when they were captured in virtual reality on the patient.

To provide physical and virtual systems that can be used to record and simulate the "centric start position" and protrusive jaw motion.

To provide practical, easy to understand, articulating instruments having guide pins that follow right and left side engraved analog pathways in accord with right and left side vertical rotation-center adjustments, the rotation-centers being easily and rapidly located in the laboratory, according to right and left side lateral excursion endpoints.

To provide physical and virtual systems that can be used to produce precision right and left side 3D curvilinear guides having a "centric start position" and "controlled timing" for simulating protrusive, right lateral, and left lateral jaw motion.

To provide easy to understand and effective systems for recording and simulating patient-specific mandibular jaw motion.

To provide physical and virtual systems that can be rapidly and conveniently used at chaff side.

To provide virtual articulating instruments that facilitate simulation of patient-specific mandibular jaw motion or pin motion by virtual engraved analogs serving as virtual articulator guides and virtual centers of rotation to control right and left side timing of virtual guide pins as they follow virtual pathways in the virtual engraved analogs.

To provide virtual articulating systems that facilitate the generation of virtual dental restorative treatments having fully functional virtual occlusions wherein the virtual restorative treatments can be milled or digitally fabricated in a dental CAD/CAM fabricating system.

To provide disposable systems whereby right and left side engraved analogs can be economically produced and effectively used as timing controlled guides in a physical dental articulating instrument.

To provide physical and virtual systems that have disposable apparatus component parts; that can be used as a teaching tool.

To provide affordable teaching instruments, the physical instruments being constructed of rigid, light weight aluminum, polymer, and dense-molded polystyrene foam materials, whereby students in dental schools can study and learn theory and practice of genuine curvilinear mandibular jaw motion.

To provide physical and virtual systems that can facilitate both traditional nonautomated and digital automated fabricating of restorative and orthodontic devices.

To provide physical and virtual systems that can help patients having extensive restorative treatments to avoid debilitating affects of bad bite and equilibration issues.

Other advantages of one or more aspects will be apparent from a consideration of the drawings and foregoing description.

CONCLUSIONS, RAMIFICATIONS, AND SCOPE

Accordingly, the reader will see that 3D curvilinear engraved analogs can be generated by the engrave pins as the pins move through and form the soft congealing material; that the engraved analogs can be attached to the physical articulating instrument where they serve as guides for the guide pins; that the vertical rotation-centers can control the timing of the guide pins as the pins move in the engraved analogs; that the physical process can be converted to the digital process using the same fixed spatial relations and sensor and scanner generated data. In addition, the physical recording instruments can be molded, milled, or otherwise rapidly formed polystyrene foam, thereby producing a low cost "disposable" system. Also the physical articulating instrument can have a low profile by reducing the height of the guide pin posts and the rotation-center posts, thereby producing an articulator having a sloping incisal-to-analog height (shown in FIG. 4 comparing FIG. 11). Furthermore, the apparatus and method has the additional advantages:

- It allows clinicians to conveniently and effectively record and simulate patient-specific mandibular jaw motion at reduced costs for the system, training, and chairtime.
- It allows laboratories to fabricate on a physical articulating instrument that is easy to understand and use.
- It facilitates the conversion of physical engraved analogs and genuine rotation-centers into a virtual articulating instrument whereby fully functional orthodontic and restorative dental devices can be fabricated in a dental CAD/CAM system.
- It allows laboratories to fabricate in a dental CAD/CAM system and confirm and refine the digitally produced endproduct on a physical articulating instrument.
- It provides a digital recording system for rapidly converting acquired data into a virtual articulating instrument whereby fully functional restorative and orthodontic dental devices can be fabricated in a dental CAD/CAM system.
- It provides the patient with trouble free dental treatment devices thereby significantly reducing the risk of short term and long term pain, dysfunction, and disease.

Although the description above contains many specifications, these should not be construed as limiting the scope of the embodiments but as merely providing illustrations of some of several embodiments. For example; the digital recording system or digital recording instrument can be substantially intraoral; the engravable analogs can be foiled covered, molded polymer containers filled with light cured resin; the engrave pins can be expanded at the base so that the guide pins can move freely against the pathways; the recording and articulating instruments can have other shapes and designs to improve aesthetics or ease of use, etc.

While various embodiments have been described above, it should be understood that they have been presented by way of example only, and not by way of limitation. Likewise, the various illustrations may depict an example design or other configuration for the disclosure, which illustrations are done to aid in understanding the features and functionality that can be included in the disclosure. The disclosure is not restricted to the illustrated example designs or configurations, but can be implemented using a variety of alternative designs and configurations. Additionally, although the disclosure is described above in terms of various exemplary embodiments and implementations, it should be understood that the various features and functionality described in one or more of the individual embodiments are not limited in their applicability to the particular embodiment with which they are described. They instead can, be applied, alone or in some combination, to one or more of the other embodiments of the disclosure, whether or not such embodiments are described, and whether or not such features are presented as being a part of a described embodiment. Thus the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known," and terms of similar meaning, should not be construed as limiting the item described to a given time period, or to an item available as of a given time. But instead these terms should be read to encompass conventional, traditional, normal, or standard technologies that may be available, known now, or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to," or other like phrases in some instances shall not be read to mean that the narrower case is intended or required in instances where such broadening phrases may be absent.

What is claimed is:

1. A system for recording, converting data, and simulating patient-specific jaw motion comprising;
   a digital recording system (4000) which has the capacity for converting a patient's real-time generated jaw motion into digital data for a virtual environment, the digital recording system (4000) comprising;
   d) an upper and lower clutch (102) having the capacity to be respectively attached to a patient's upper and lower dental arches;
   e) further comprising at least one sensor (174) on the upper and lower clutches (102) having the capacity for recording and converting sensor motion into digital data to include motion of a virtual left and right side recording pin (122) starting from a patient's hinge axis, the virtual left and right side recording pins (122) having the capacity to move within a virtual left and right side engravable analogs (136);
   f) the virtual left and right side recording pins (122) digitizing a plurality of the virtual pathways (154) caused by virtual motion of the virtual left and right side recording pins (122), said digitizing resulting in a digital polygon mesh model of a virtual left and right side engraved analog (150) with the virtual pathways (154) engraved therein; and
   a prototyping system which has the capacity for converting the digital polygon mesh models of the virtual left and right side engraved analogs (150) with the virtual pathways (154) into a physical left and right side engraved analog (150) with the physical pathways (154) engraved therein; and a physical articulating instrument (3000) comprising;
  e) a lower (148) and upper (146) articulating frame;
  f) the lower articulating frame (148) having a left and right side articulating pin (122) aligned with a left and right side rotation-center head (152) on a coronal plane (2012), the rotation-center heads (152) interposed between the left and right side articulating pins (122) and having the capacity to be adjustably located at respective intersections of the coronal plane (2021), a left lateral vector (2038), and a right lateral vector (2036);
  g) the upper articulating frame (146) having the physical left and right side engraved analogs (150) attached thereto, the upper articulating frame (146) also having a rear wall guide (162) interposed between the engraved analogs (150), the rear wall guide (162) having the capacity to interact with the left and right side rotation-center heads (152) to align the upper and lower articulating frames on the patient's hinge axis and to control the timing of the left and right side articulating pins (122) as they are moved in the pathways (154);
  h) the physical articulating instrument (3000) having the physical left and right side engraved analogs (150) with the physical pathways (154) having the capacity to cooperate with the left and right side articulating pins (122), the physical articulating instrument (3000) also having the left and right side rotation-center heads (152) having the capacity to cooperate with the rear wall guide (162) to simulate the jaw motion recorded from the digital recording system (4000).

2. The system of claim 1 wherein the virtual left and right side recording pins (122) and the left and right side articulating pins (122) have the same shape and end in a spherical tip (124).

3. The system of claim 1 wherein the digital recording system (4000) further comprises; a computer having a processor, memory, and graphics adapter; and software for recording motion of the virtual left and right side recording, pins (122) via the digital data from the sensors (174).

4. The system of claim 3 wherein the digital recording system (4000) and the physical articulating instrument (3000) have identical spatial geometries capable of maintaining the relationship with the patient's upper and lower dental arches.

5. The system of claim 1 wherein the prototyping system includes a virtual articulating instrument (5000), the virtual articulating instrument (5000) is a virtual model of the physical articulating instrument (3000), the virtual articulating instrument (5000) having the capacity for facilitating CAD/CAM fabrication of dental treatment devices.

* * * * *

UNITED STATES PATENT AND TRADEMARK OFFICE
CERTIFICATE OF CORRECTION

PATENT NO. : 11,432,919 B2
APPLICATION NO. : 15/675627
DATED : September 6, 2022
INVENTOR(S) : John P. Stipek, Sr. and John P. Stipek, Jr.

It is certified that error appears in the above-identified patent and that said Letters Patent is hereby corrected as shown below:

In the Specification

Column 7, Line 67, after "free" delete "," and insert --.--
Column 9, Line 20, after "Facial" delete line break and continue line with "Surface"
Column 31, Line 5, after "designated 4100." delete paragraph break and continue sentence with "Accordingly,"

In the Claims

Column 50, Line 43, delete "d)" and insert --a)--
Column 50, Line 46, delete "e)" and insert --b)--
Column 50, Line 53, delete "analogs" and insert --analog--
Column 50, Line 55, delete "f)" and insert --c)--
Column 51, Line 2, delete "e)" and insert --a)--
Column 51, Line 3, delete "f)" and insert --b)--
Column 51, Line 12, delete "g)" and insert --c)--
Column 51, Line 23, delete "h)" and insert --d)--

Signed and Sealed this
Eighth Day of November, 2022

Katherine Kelly Vidal
*Director of the United States Patent and Trademark Office*